(12) United States Patent
Lee et al.

(10) Patent No.: US 9,001,768 B2
(45) Date of Patent: Apr. 7, 2015

(54) METHOD AND DEVICE FOR TRANSMITTING CONTROL INFORMATION IN WIRELESS COMMUNICATION SYSTEM

(75) Inventors: Hyunwoo Lee, Anyang (KR); Seunghee Han, Anyang (KR); Jaehoon Chung, Anyang (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 13/823,705

(22) PCT Filed: Sep. 16, 2011

(86) PCT No.: PCT/KR2011/006848
§ 371 (c)(1),
(2), (4) Date: Mar. 14, 2013

(87) PCT Pub. No.: WO2012/036502
PCT Pub. Date: Mar. 22, 2012

(65) Prior Publication Data
US 2013/0182676 A1    Jul. 18, 2013

Related U.S. Application Data

(60) Provisional application No. 61/383,347, filed on Sep. 16, 2010.

(51) Int. Cl.
*H04W 72/04* (2009.01)
*H04L 1/00* (2006.01)
(Continued)

(52) U.S. Cl.
CPC ......... *H04W 72/0413* (2013.01); *H04L 1/0027* (2013.01); *H04L 1/0029* (2013.01); *H04L 1/1671* (2013.01); *H04L 5/0007* (2013.01); *H04L 5/001* (2013.01); *H04L 5/0053* (2013.01); *H04L 5/0055* (2013.01); *H04L 5/0094* (2013.01)

(58) Field of Classification Search
None
See application file for complete search history.

(56) References Cited

U.S. PATENT DOCUMENTS 8,345,605 B2 *  1/2013  Shen et al. ............. 370/329
2008/0212514 A1 *  9/2008  Chen .................... 370/315
(Continued)

OTHER PUBLICATIONS

PCT International Application No. PCT/KR2011/006848, Written Opinion of the International Searching Authority dated Feb. 24, 2012, 17 pages.
(Continued)

*Primary Examiner* — Alex Skripnikov
(74) *Attorney, Agent, or Firm* — Lee, Hong, Degerman, Kang & Waimey

(57) ABSTRACT

The present invention relates to a wireless communication system supporting carrier aggregation (CA). The present invention provides a method for allowing a terminal to transmit control information to a base station in a wireless communication system, and the method comprises receiving from said base station at least one physical downlink control channel (PDCCH) and one physical downlink shared channel (PDSCH) through at least one serving cell that is configured in said terminal; and transmitting to said base station first control information which has bundled at least a portion of the control information for said PDCCH reception or the PDSCH reception that is indicated by said PDCCHs, wherein said first control information is transmitted using a physical uplink control channel (PUCCH) resource corresponding to a second control information, and said second control information can be related to a PDCCH which was last detected by said terminal among said received PDCCHs.

19 Claims, 37 Drawing Sheets

(51) Int. Cl.
*H04L 1/16* (2006.01)
*H04L 5/00* (2006.01)

(56) References Cited

U.S. PATENT DOCUMENTS

2011/0243066 A1* 10/2011 Nayeb Nazar et al. ....... 370/328
2012/0044871 A1* 2/2012 Li et al. ......................... 370/328

OTHER PUBLICATIONS

Samsung, "PUCCH HARQ-ACK Resource Mapping for DL CA", R1-103637, 3GPP TSG RAN WG1 #61bis, Jun. 2010, 3 pages.
Nokia, et al., "PUCCH Format 1a/1b Resource Allocation in LTE-A TDD", R1-104432, 3GPP TSG RAN WG1 Meeting #62, Aug. 2010, 5 pages.
Samsung, "Discussion on ACK/NACK bundling method for LTE-A TDD", R1-104579, 3GPP TSG RAN WG1 meeting #62, Aug. 2010, 6 pages.
Pantech, "UL PUCCH A/N resource allocation for CA", R1-104632, 3GPP TSG RAN1 #62, Aug. 2010, 4 pages.
PCT International Application No. PCT/KR2011/006848, Written Opinion of the International Searching Authority dated Feb. 24, 2012, 9 pages.

* cited by examiner (a)

(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | | n' = 0 | | |
| 2 | 1 | | 6 | 12 | | 6 | 12 |
| 3 | 2 | 1 | | | 1 | | |
| 4 | 3 | | 7 | 13 | | 7 | 13 |
| 5 | 4 | 2 | | | 2 | | |
| 6 | 5 | | 8 | 14 | | 8 | 14 |
| 7 | 6 | 3 | | | 3 | | |
| 8 | 7 | | 9 | 15 | | 9 | 15 |
| 9 | 8 | 4 | | | 4 | | |
| 10 | 9 | | 10 | 16 | | 10 | 16 |
| 11 | 10 | 5 | | | 5 | | |
| 0 | 11 | | 11 | 17 | | 11 | 17 |

$\Delta_{shift}^{PUCCH} \in \{1,2,3\}$ for normal cyclic prefix
$\{1,2,3\}$ for extended cyclic prefix $\delta_{offset}^{PUCCH} \in \{0,1,...,\Delta_{shift}^{PUCCH} - 1\}$ Cell specific cyclic shift offset $n_{OC}$  Orthogonal sequence index for ACK/NACK
$\bar{n}_{OC}$  Orthogonal sequence index for RS
$n_{CS}$  Cyclic shift value of a CAZAC sequence
n'  ACK/NACK resource index used for the channelization in a RB

FIG. 33
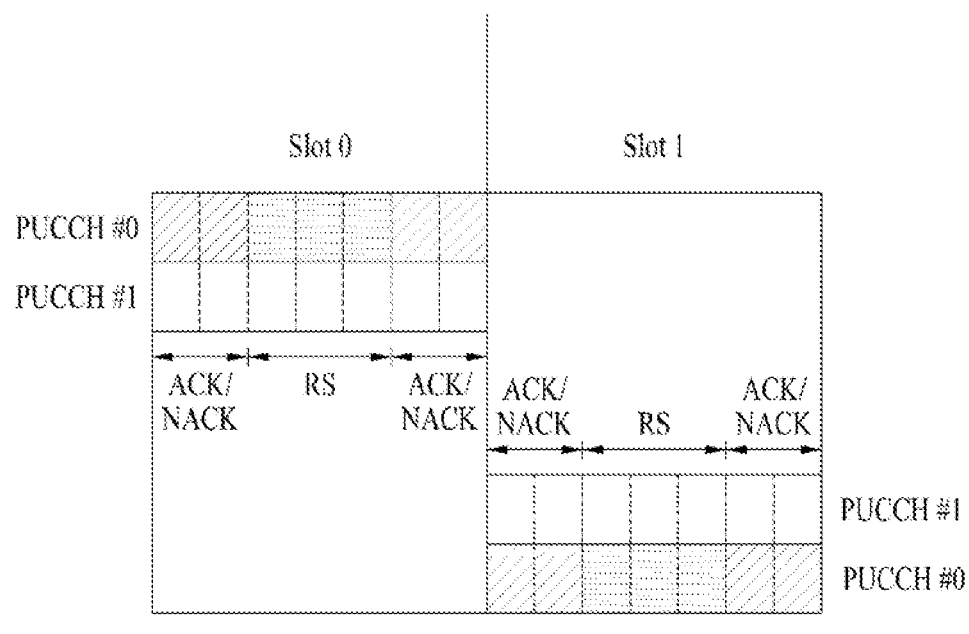
(a)
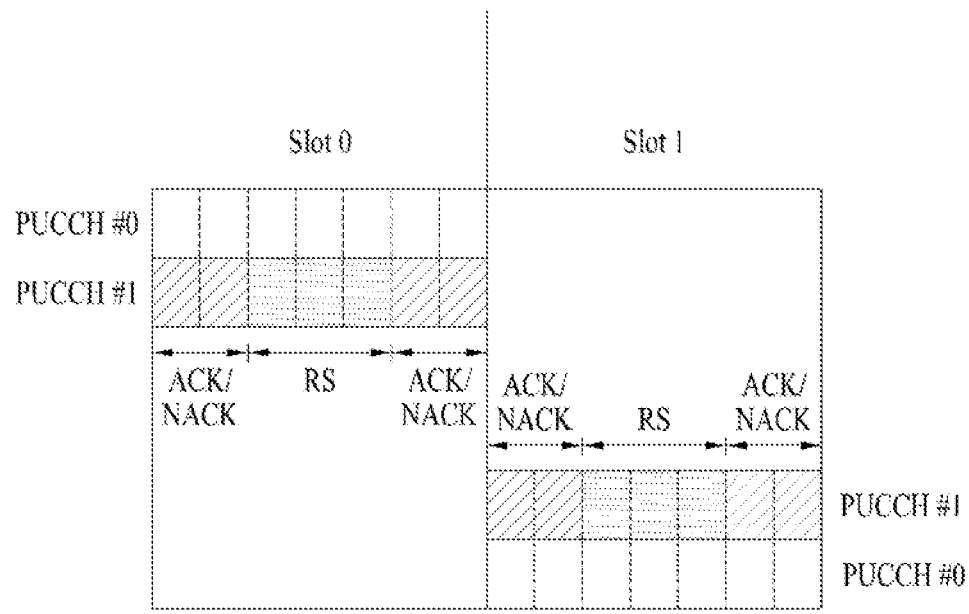
(b)

FIG. 41
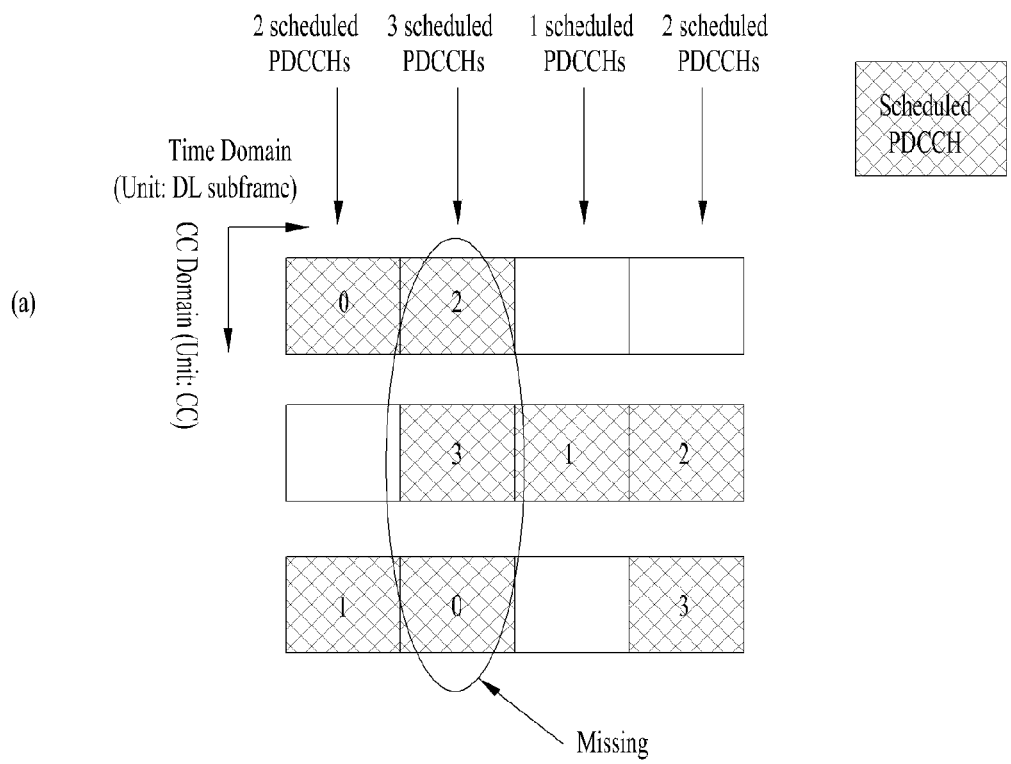
(a)
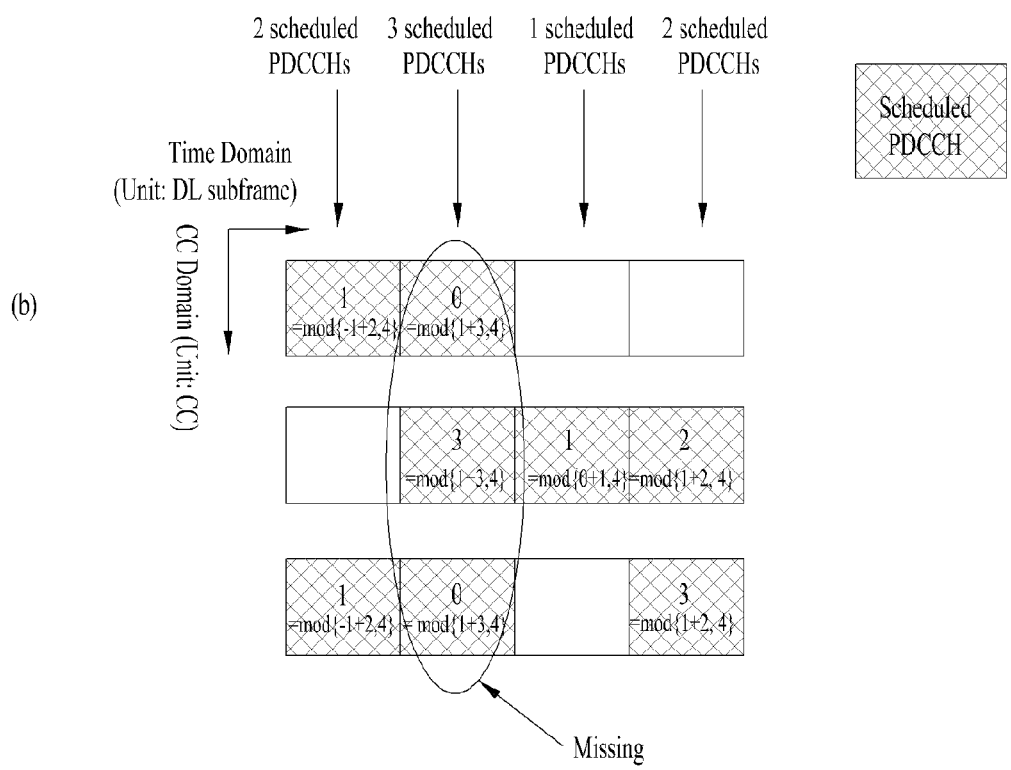
(b)

FIG. 42
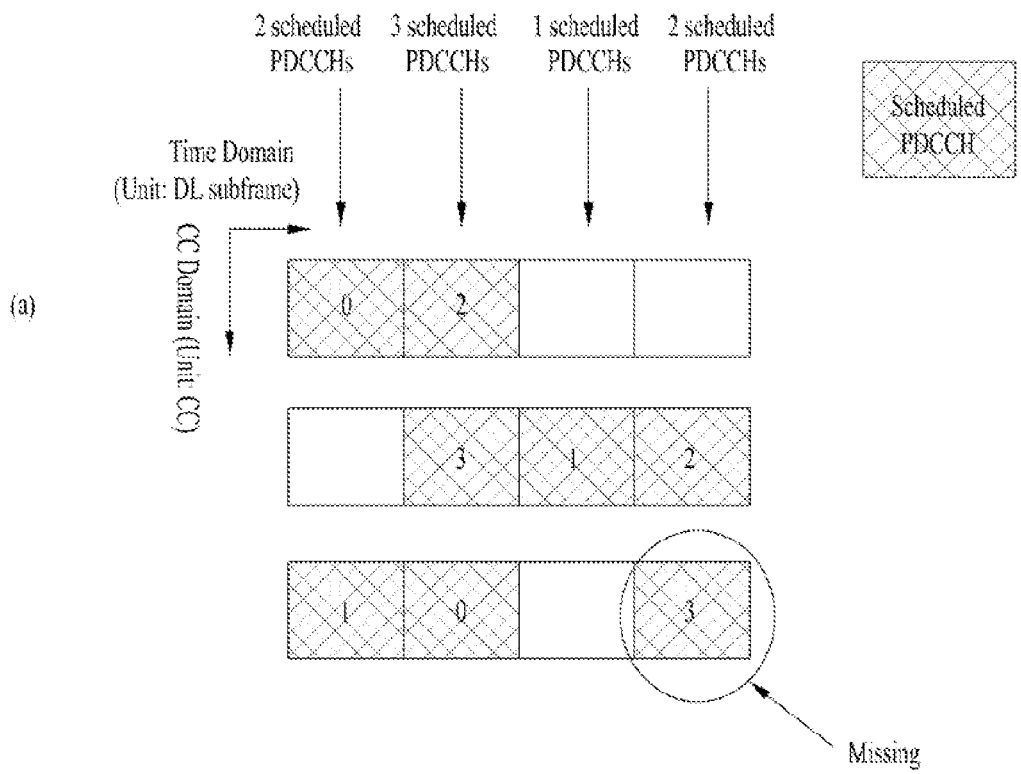
(a)
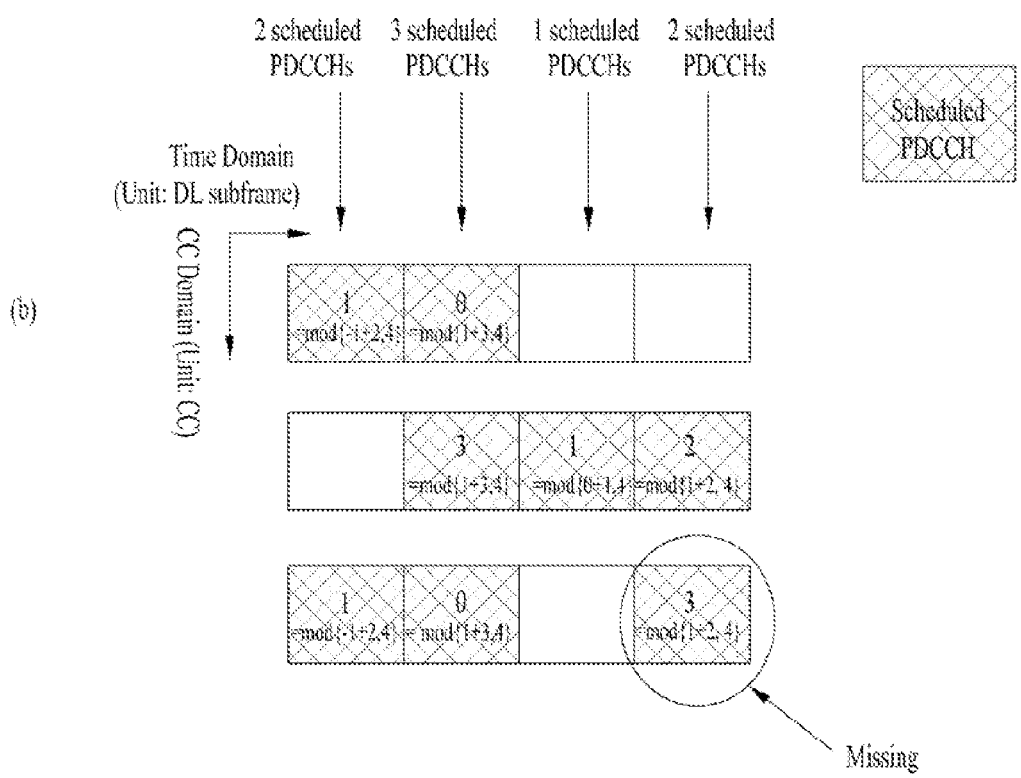
(b)

METHOD AND DEVICE FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2011/006848, filed on Sep. 16, 2011, which claims the benefit of U.S. Provisional Application Ser. No. 61/383,347, filed on Sep. 16, 2010, the contents of which are all hereby incorporated by reference herein in their entirety.

TECHNICAL FIELD

The present invention relates to a wireless communication system, and more particularly, to a method and device for transmitting control information. The wireless communication system may support carrier aggregation (CA).

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention is to provide a method and device for efficiently transmitting control information in a wireless communication system. Another object of the present invention is to provide a channel format for efficiently transmitting control information, signal processing and a device therefor. Another object of the present invention is to provide a method and device for efficiently assigning resources for transmitting control information.

The technical problems solved by the present invention are not limited to the above technical problems and other technical problems which are not described herein will become apparent to those skilled in the art from the following description.

Technical Solution

The object of the present invention can be achieved by providing a method of transmitting control information from a terminal to a base station in a wireless communication system supporting a plurality of serving cells, including receiving at least one of physical downlink control channel (PDCCH) and physical downlink shared channel (PDSCH) through at least one serving cell configured in the terminal from the base station, and transmitting, to the base station, first control information resulting from performing a bundling on at least a portion of control information on reception of PDCCH or reception of PDSCH reception indicated by the PDCCH, wherein the first control information is transmitted using physical uplink control channel (PUCCH) resources corresponding to second control information according to a predetermined rule, and wherein the second control information is associated with a PDCCH last detected by the terminal among the received PDCCHs.

The first control information may be acknowledgement (ACK) or negative acknowledgement (NACK) information and the second control information may be downlink assignment index (DAI) information last detected by the terminal from at least one DAI information transmitted through the PDCCH, and the at least one DAI information may indicate an assignment order of at least one of the received PDCCH and the received PDSCH.

If the PDCCH last detected by the terminal is included in a primary cell (PCell) of the at least one serving cell, PUCCH resource corresponding to the second control information may be determined using at least one control channel element (CCE) index configuring the PDCCH last detected by the terminal.

If the PDCCH last detected by the terminal is included in a secondary cell (SCell) of the at least one serving cell, the PUCCH resource corresponding to the second control information may be determined using assignment resource indicator (ARI) information received from the base station.

The ARI information may include PUCCH resource information corresponding to the second control information, parameter information for determining the PUCCH resource corresponding to the second control information, or offset information of the parameter.

If the PDCCH last detected by the terminal is included in a secondary cell (SCell) of the at least one serving cell, the PUCCH resource corresponding to the second control information may be configured by the base station in advance through RRC signaling.

Information about the PUCCH resource corresponding to the second control information may be configured by the base station in advance through RRC signaling.

The bundling may be full bundling.

The PDCCH may carry one or more transport blocks or indicate a PDSCH carrying one or more transport blocks, and the first control information and the second control information may include information about one or more transport blocks included in the PDCCH or the PDSCH indicated by the PDCCH.

The first control information may include information about a maximum number of transport blocks carried by the PDCCH or the PDSCH indicated by the PDCCH, and, if the number of transport blocks carried by the PDCCH or the PDSCH indicated by the PDCCH is less than the maximum number of transport blocks, the first control information of transport blocks excluding the transport blocks actually carried by the PDCCH or the PDSCH indicated by the PDCCH among the maximum number of transport blocks carried by the PDCCH or the PDSCH indicated by the PDCCH may be negative acknowledgement (NACK) information.

The first control information may include information about a maximum number of transport blocks carried by the PDCCH or the PDSCH indicated by the PDCCH, and, if the number of transport blocks carried by the PDCCH or the PDSCH indicated by the PDCCH is less than the maximum number of transport blocks, the first control information of transport blocks excluding the transport blocks actually carried by the PDCCH or the PDSCH indicated by the PDCCH among the maximum number of transport blocks carried by the PDCCH or the PDSCH indicated by the PDCCH may be equal to the first control information of the actually carried transport blocks.

In another aspect of the present invention, there is provided a method of, at a base station, receiving control information from a terminal in a wireless communication system supporting a plurality of serving cells, including transmitting, to the terminal, at least one of physical downlink control channel (PDCCH) and physical downlink shared channel (PDSCH) through at least one serving cell configured in the terminal, and receiving first control information resulting from performing a bundling on at least a portion of control information on transmission of PDCCH or transmission of PDSCH indicated by the PDCCH, wherein the first control information is received using physical uplink control channel (PUCCH) resource corresponding to second control information according to a predetermined rule, and wherein the second control information is associated with a PDCCH last detected by the terminal among the received PDCCH.

The first control information may be acknowledgement (ACK) or negative acknowledgement (NACK) information, and the second control information may be downlink assignment index (DAI) information last detected by the terminal from at least one DAI information transmitted through the PDCCH, and the at least one DAI information may indicate an assignment order of at least one of the received PDCCH and the received PDSCH.

In another aspect of the present invention, there is provided a terminal for transmitting control information to a base station in a wireless communication system supporting a plurality of serving cells, including a receiver for receiving at least one of physical downlink control channel (PDCCH) and physical downlink shared channel (PDSCH) through at least one serving cell configured in the terminal from the base station, a transmitter for transmitting, to the base station, first control information resulting from performing a bundling on at least a portion of control information on reception of PDCCH or reception of PDSCH indicated by the PDCCH, and a processor for controlling transmission of the first control information to the base station using physical uplink control channel (PUCCH) resource corresponding to second control information according to a predetermined rule, wherein the second control information is associated with a PDCCH last detected by the terminal among the received PDCCH.

The first control information may be acknowledgement (ACK) or negative acknowledgement (NACK) information, and the second control information may be downlink assignment index (DAI) information last detected by the terminal from at least one DAI information transmitted through the PDCCH, and the at least one DAI information may indicate an assignment order of at least one of the received PDCCH and the received PDSCH.

If the PDCCH last detected by the terminal is included in a primary cell (PCell) of the at least one serving cell, PUCCH resource corresponding to the second control information may be determined using at least one control channel element (CCE) index configuring the PDCCH which detected by the terminal.

If the PDCCH last detected by the terminal is included in a secondary cell (SCell) of the at least one serving cell, the PUCCH resource corresponding to the second control information may be determined using assignment resource indicator (ARI) information received from the base station.

If the PDCCH last detected by the terminal is included in a secondary cell (SCell) of the at least one serving cell, the PUCCH resource corresponding to the second control information may be configured by the base station in advance through RRC signaling.

Information about the PUCCH resource corresponding to the second control information may be configured by the base station in advance through RRC signaling.

In another aspect of the present invention, there is provided a base station for receiving control information from a terminal in a wireless communication system supporting a plurality of serving cells, including a transmitter for transmitting, to the terminal, at least one of physical downlink control channel (PDCCH) and physical downlink shared channel (PDSCH) through at least one serving cell configured in the terminal, a receiver for receiving first control information resulting from performing a bundling on at least a portion of control information on reception of PDCCH or reception of PDSCH indicated by the PDCCH, and a processor for controlling transmission of the first control information to the base station using physical uplink control channel (PUCCH) resource corresponding to second control information according to a predetermined rule, wherein the second control information is associated with a PDCCH last detected by the terminal among the received PDCCH.

Advantageous Effects

According to the present invention, it is possible to efficiently transmit control information in a wireless communication system. It is possible to provide a channel format for efficiently transmitting control information, signal processing and a device therefor. It is possible to efficiently assign resources for transmitting control information.

The effects of the present invention are not limited to the above-described effects and other effects which are not described herein will become apparent to those skilled in the art from the following description.

DESCRIPTION OF DRAWINGS

FIG. 17 is a diagram showing ACK/NACK channelization of PUCCH formats 1 and 1b;

FIG. 33 is a diagram illustrating resource assignment indicated to a UE according to an embodiment of the present invention;

FIG. 41 is a diagram showing an example of using general DAI information and modified DAI information according to an embodiment of the present invention;

FIG. 42 is a diagram showing an example of using general DAI information and modified DAI information according to another embodiment of the present invention.

BEST MODE

Figure 1:
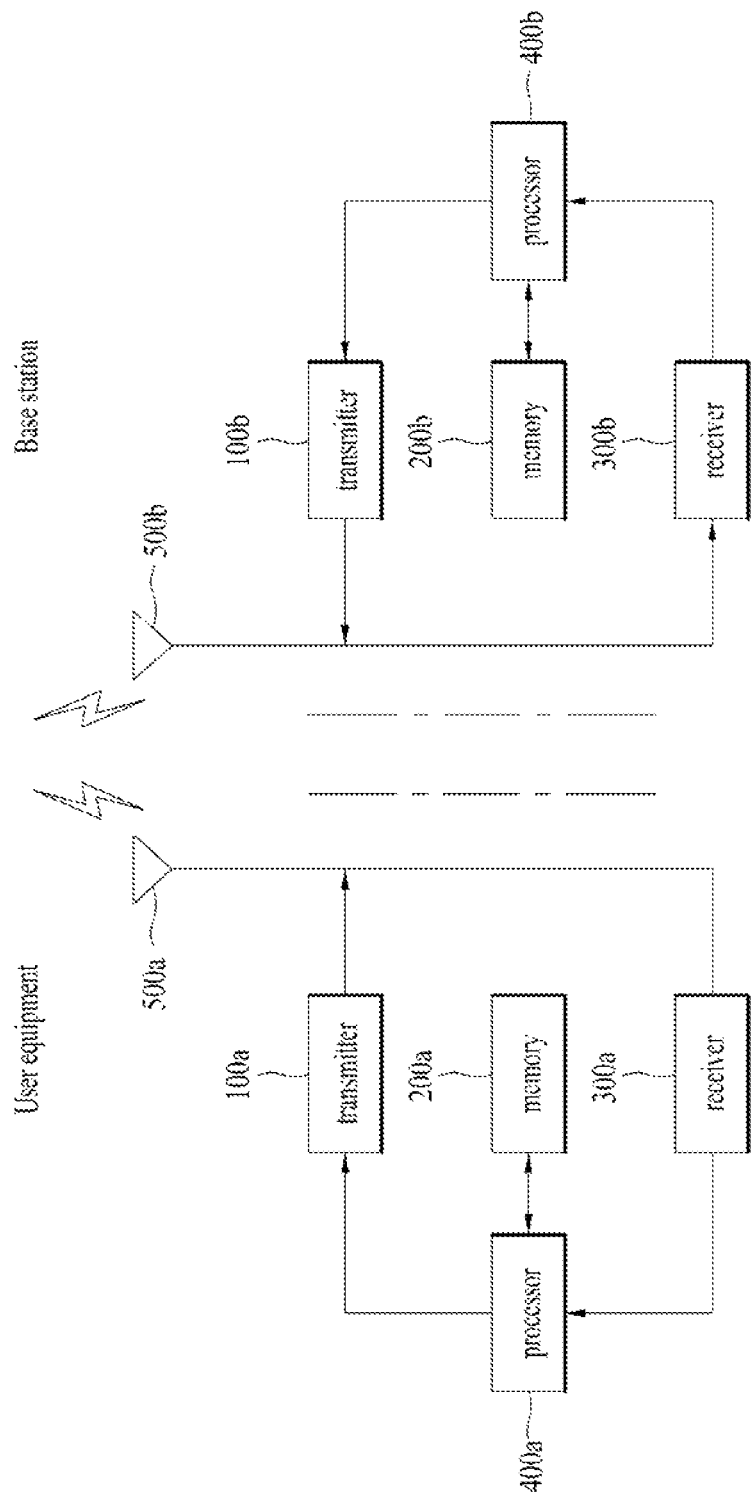
FIG. 1 is a diagram showing the configuration of a user equipment (UE) and a base station to which the present invention is applied.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, device, and system can be applied to a variety of radio multiple access systems. The radio multiple access system may include, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), multi carrier frequency division multiple access (MC-FDMA) system and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRAN is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For convenience of description, assume that the present invention is applicable to 3GPP LTE/LTE-A. However, the technical features of the present invention are not limited thereto. For instance, although the following detailed description is given on the assumption that 3GPP LTE/LTE-A mobile communication system is used, it is applicable to other prescribed mobile communication systems by excluding unique items of 3GPP LTE.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, it is assumed that a terminal is a fixed or mobile terminal and includes devices which communicate with a base station to transmit and receive a variety of data and control information. The terminal may be referred to as the term user equipment (UE), mobile station (MS), mobile terminal (MT), user terminal (UT), subscribe station (SS), wireless device, personal digital assistant (PDA), wireless modem, handheld device, etc.

A base station means a fixed station communicating with a terminal or another base station and communicates with a terminal and another base station to exchange a variety of data and control information. The base station may be referred to as an evolved NodeB (eNB), base transceiver system (BTS), access point, etc.

In the present invention, assigning a specific signal to a frame/subframe/slot/carrier/subcarrier means transmitting the specific signal through the carrier/subcarrier during a period or timing of the frame/subframe/slot.

In the present invention, rank or transmission rank means the number of layers multiplexed or assigned on one OFDM symbol or one resource element.

In the present invention, a physical downlink control channel (PDCCH)/physical control format indicator channel (PCFICH)/physical hybrid automatic retransmit request indicator channel (PHICH)/physical downlink shared channel (PDSCH) means a set of resource elements carrying acknowledgement (ACK)/negative ACK (NACK)/downlink data for downlink control information (DCI)/control format indicator (CFI)/uplink transmission.

In addition, a physical uplink control channel (PUCCH)/physical uplink shared channel (PUSCH)/physical random access channel (PRACH) means a set of resource elements carrying uplink control information (UCI)/uplink data/random access signal.

In particular, a resource element (RE) assigned to or belonging to a PDCCH/PCFICH/PHICH/PDSCH/PUCCH/PUSCH/PRACH may be referred to as a PDCCH/PCFICH/PHICH/PDSCH/PUCCH/PUSCH/PRACH RE or PDCCH/PCFICH/PHICH/PDSCH/PUCCH/PUSCH/PRACH resource.

Accordingly, transmission of a PUCCH/PUSCH/PRACH by a terminal may have the same meaning as transmission of uplink control information/uplink data/random access signal on a PUCCH/PUSCH/PRACH. Transmission of a PDCCH/PCFICH/PHICH/PDSCH by a base station may have the same meaning as transmission of downlink control information/downlink data on a PDCCH/PCFICH/PHICH/PDSCH.

Mapping ACK/NACK information to a specific constellation point may have the same meaning as mapping ACK/NACK information to a specific complex modulation symbol. In addition, mapping ACK/NACK information to a specific complex modulation symbol may have the same meaning as modulating ACK/NACK information into a specific complex modulation symbol FIG. 1 shows the configuration of a user equipment (UE) and a base station (BS) to which the present invention is applied. The UE operates as a transmission apparatus in uplink and operates as a reception apparatus in downlink. In contrast, a base station operates as a reception apparatus in uplink and operates as a transmission apparatus in downlink.

Referring to FIG. 1, the UE and the BS include antennas 500a and 500b for receiving information, data, signals and/or messages, transmitters 100a and 100b for transmitting information, data, signals, and/or messages by controlling the antennas 500a and 500b, receivers 300a and 300b for receiving information, data, signals and/or messages by controlling the antennas 500a and 500b, and memories 200a and 200b for temporarily or permanently storing a variety of information in the wireless communication system. The UE and the BS further include processors 400a and 400b which are operatively connected to components of the transmitters, the receivers and the memories to control the components, respectively.

The transmitter 100a, the memory 200a, the receiver 300a, and the processor 400a in the UE may be configured as independent components by separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver in the UE or the BS.

The antennas 500a and 500b transmit signals generated from the transmitters 100a and 100b to an external device, or transfer radio signals received from an external device to the receivers 300a and 300b. The antennas 500a and 500b can be referred as antenna ports. Each antenna port can correspond to one physical antenna or can be configured by a combination of more than one physical antenna. If the transmitter and the receiver support a Multiple Input Multiple Output (MIMO) function using a plurality of antennas, the transmitter and the receiver may be connected to two or more antennas.

The processors 400a and 400b generally provide overall control to the components or modules of the UE and the BS. Especially, the processors 400a and 400b may carry out a control function for performing the present invention, a Media Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or a combination thereof.

The processor 400a of the UE transmits first control information which has bundled at least a portion of control information for reception of at least one PDCCH and second control information to the BS through the transmitter.

In addition, the processor 400a selects physical uplink control channel (PUCCH) resources for the first control information and the second control information from a plurality of PUCCH resources and transmits a PUCCH signal carrying a modulation value corresponding to the first control information and the second information to the BS through the transmitter using the selected PUCCH resources. At this time, the first control information and the second control information may be identified by a combination of the selected PUCCH resources and the modulation value.

In addition, the processor 400a controls the selected PUCCH resources to be used as preset first PUCCH resources of the plurality of PUCCH resources if the first control information is NACK information and controls the selected PUCCH resources to be used as PUCCH resources excluding the first PUCCH resources of the plurality of PUCCH resources if the first control information is ACK information.

The processor 400a may control the first control information and the second control information to become information about a PDCCH before generating discontinuous transmission (DTX) information of the received at least one PDCCH if control information for reception of at least one PDCCH includes DTX information. At this time, if the first control information is ACK, the processor 400a may control transmission of the first control information and the second control information to the BS.

If the present invention is implemented using hardware, the processors 400a and 400b may include one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention.

If the present invention is implemented using firmware or software, firmware or software may be configured to include a module, a procedure, a function, etc. for performing functions or operations of the present invention. This firmware or software configured to implement the present invention may be provided in the processors 400a and 400b, or may be stored in the memories 200a and 200b and driven by the processors 400a and 400b.

The transmitters 100a and 100b are scheduled by the processors 400a and 400b or schedulers connected to the processors to perform predetermined coding and modulation with respect to a signal or data to be transmitted to an external device and to send the signal or data to the antennas 500a and 500b. The transmitters 100a and 100b and the receivers 300a and 300b of the UE and the BS may be differently configured according to a procedure of processing a transmitted signal or a received signal.

The memories 200a and 200b may store a program for processing and controlling the processors 400a and 400b and temporarily store input/output information. In addition, the memories 200a and 200b may be used as buffers. The memories may include at least one of a flash memory type, hard disk type, multimedia card micro type, or card type memory (e.g., a SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, or an optical disk.

Figure 2:
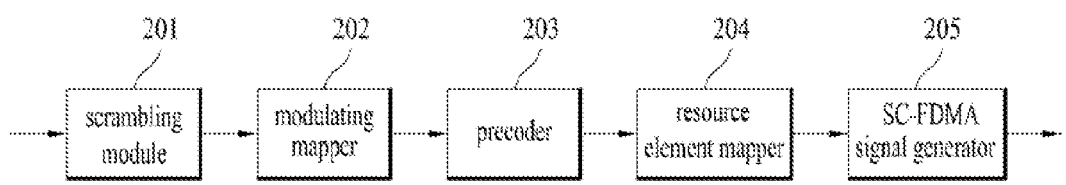
FIG. 2 is a diagram showing a signal processing procedure of transmitting an uplink signal at a UE.

FIG. 2 is a diagram showing a signal processing procedure of transmitting an uplink signal at a UE. Referring to FIG. 2, a transmitter 100a of the UE includes a scrambling module 201, a modulation mapper 202, a precoder 203, a resource element mapper 204 and an SC-FDMA signal generator 205.

In order to transmit an uplink signal, the scrambling module 201 may scramble a transmitted signal using a scramble signal. The scrambled signal is input to the modulation mapper 202 and is modulated into a complex modulation symbol using a binary phase shift keying (BPSK), quadrature phase shift keying (QPSK) or 16 quadrature amplitude modulation (QAM)/64QAM modulation scheme according to the kind of the transmitted signal or the channel state. The modulated complex modulation symbol is processed by the precoder 203 and is input to the resource element mapper 204. The resource element mapper 204 may map the complex modulation symbol to time-frequency resource elements. The processed signal may be transmitted to the BS through the SC-FDMA signal generator 205 and antenna ports.

Figure 3:
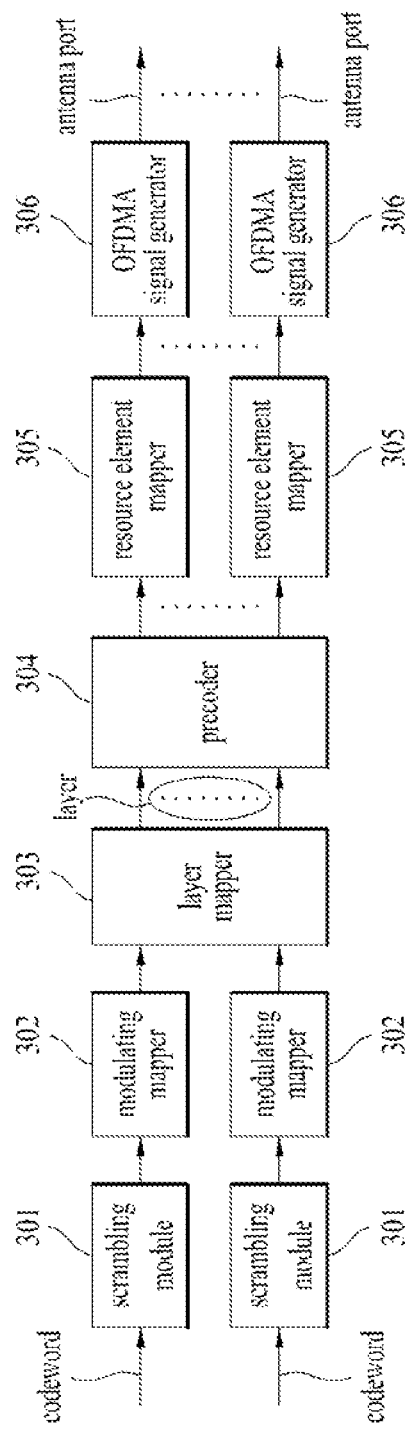
FIG. 3 is a diagram showing a signal processing procedure of transmitting a downlink signal at a base station.

FIG. 3 is a diagram showing a signal processing procedure of transmitting a downlink signal at a BS. Referring to FIG. 3, the transmitter 100b of the BS may include a scrambling module 301, a modulation mapper 302, a layer mapper 303, a precoder 304, a resource element mapper 305 and an OFDMA signal generator 306.

In order to transmit a signal or at least one codeword in downlink, similarly to FIG. 2, the signal or the codeword may be modulated into a complex modulation symbol through the scrambling module 301 and the modulation mapper 302. The complex modulation symbol is mapped to a plurality of layers by the layer mapper 303 and each layer may be multiplied by a precoding matrix using the precoder 304 and may be assigned to each transmit antenna. The processed signals which will respectively be transmitted via antennas may be mapped to time-frequency resource elements by resource element mappers 305, and may respectively be transmitted via OFDM signal generators 306 and antennas.

In a wireless communication system, in a case in which a UE transmits a signal in uplink, a Peak-to-Average Ratio (PAPR) may be more problematic than the case in which a BS transmits a signal in downlink. Accordingly, as described above with reference to FIGS. 2 and 3, an OFDMA scheme is used to transmit a downlink signal, while an SC-FDMA scheme is used to transmit an uplink signal.

Figure 4:
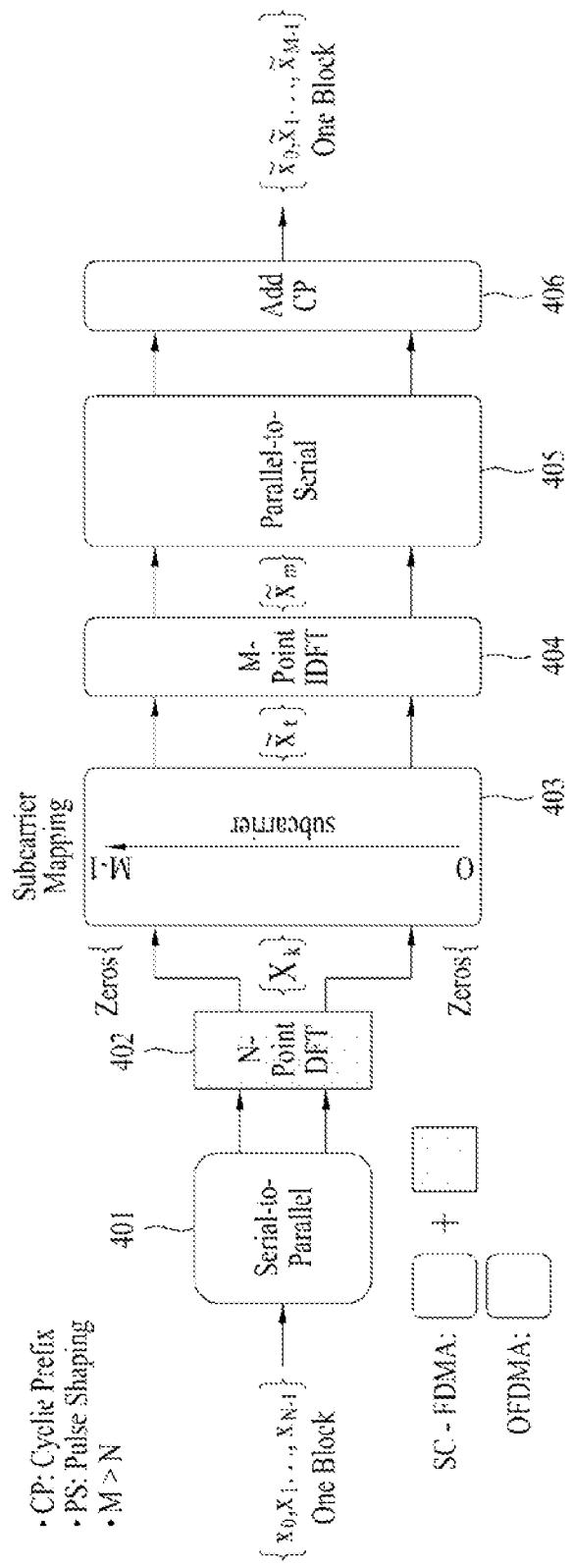
FIG. 4 is a diagram showing an SC-FDMA scheme and an OFDMA scheme to which the present invention is applied.

FIG. 4 is a diagram showing an SC-FDMA scheme and an OFDMA scheme to which the present invention is applied. In the 3GPP system, the OFDMA scheme is used in downlink and the SC-FDMA is used in uplink.

Referring to FIG. 4, a UE for UL signal transmission and a BS for DL signal transmission are identical in that a serial-to-parallel converter 401, a subcarrier mapper 403, an M-point Inverse Discrete Fourier Transform (IDFT) module 404 and a Cyclic Prefix (CP) adding module 406 are included. The UE for transmitting a signal using an SC-FDMA scheme further includes an N-point DFT module 402. The N-point DFT module 402 partially offsets an IDFT process influence of the M-point IDFT module 404 such that the transmitted signal has a single carrier property.

Figure 5:
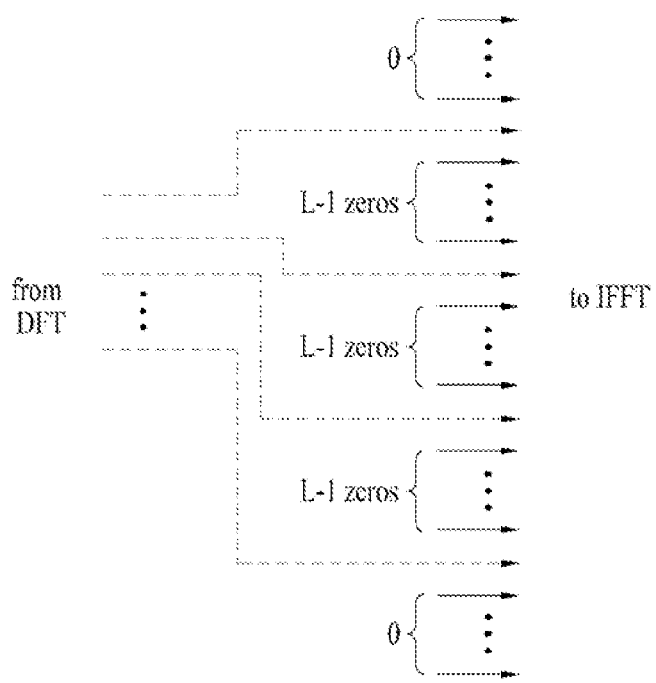
FIG. 5 is a diagram showing examples of mapping input symbols to subcarriers in a frequency domain while satisfying a single carrier property.

SC-FDMA must satisfy a single carrier property. FIG. 5 is a diagram showing examples of mapping input symbols to subcarriers in a frequency domain while satisfying a single carrier property. According to one of FIG. 5(a) and FIG. 5(b), if DFT symbols are assigned to subcarriers, a transmitted signal satisfying a single carrier property may be obtained. FIG. 5(a) shows a localized mapping scheme and FIG. 5(b) shows a distributed mapping scheme.

Figure 6:
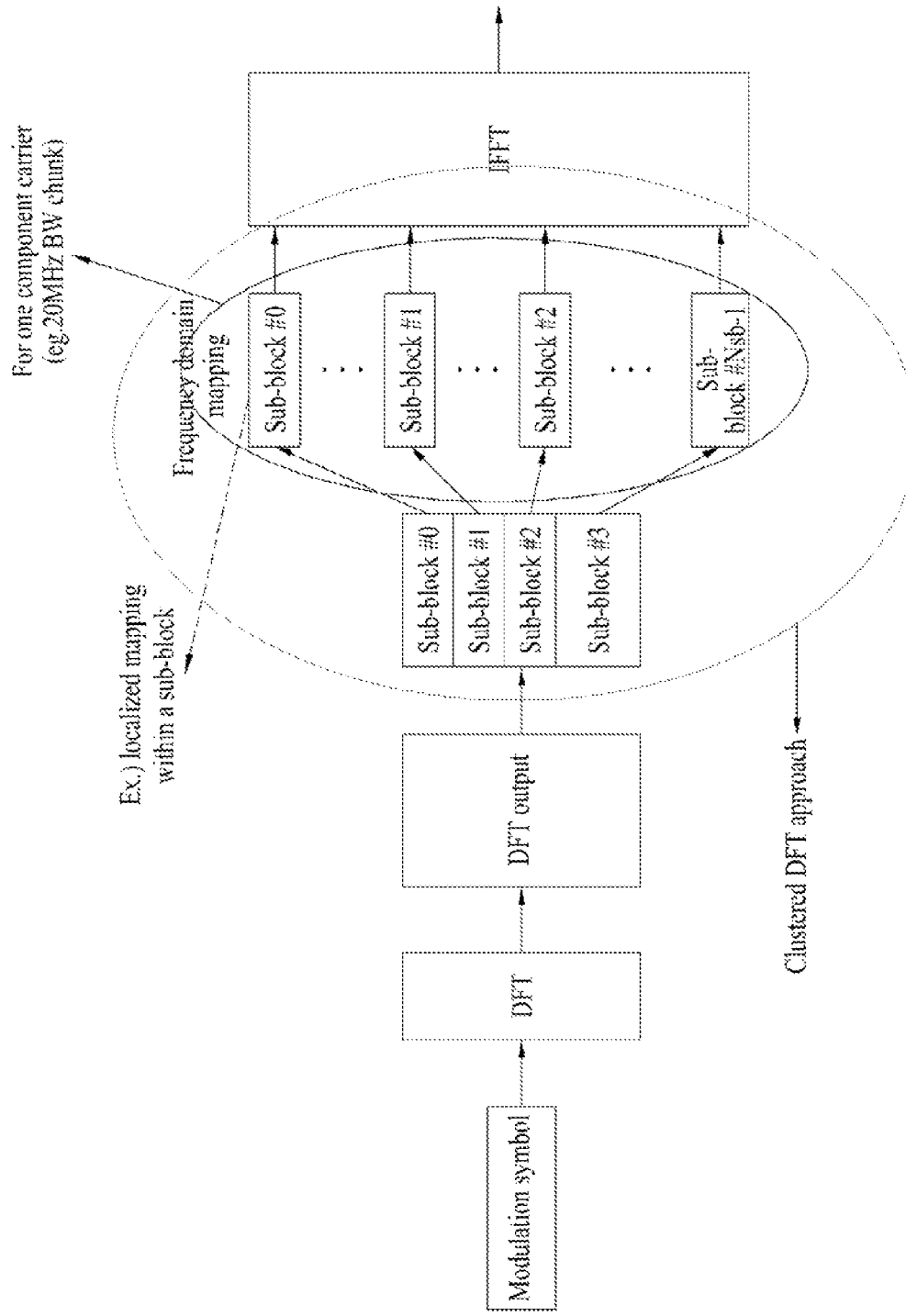
FIG. 6 is a diagram showing a signal processing procedure of mapping DFT process output samples to a single carrier in clustered SC-FDMA.
Figure 7:
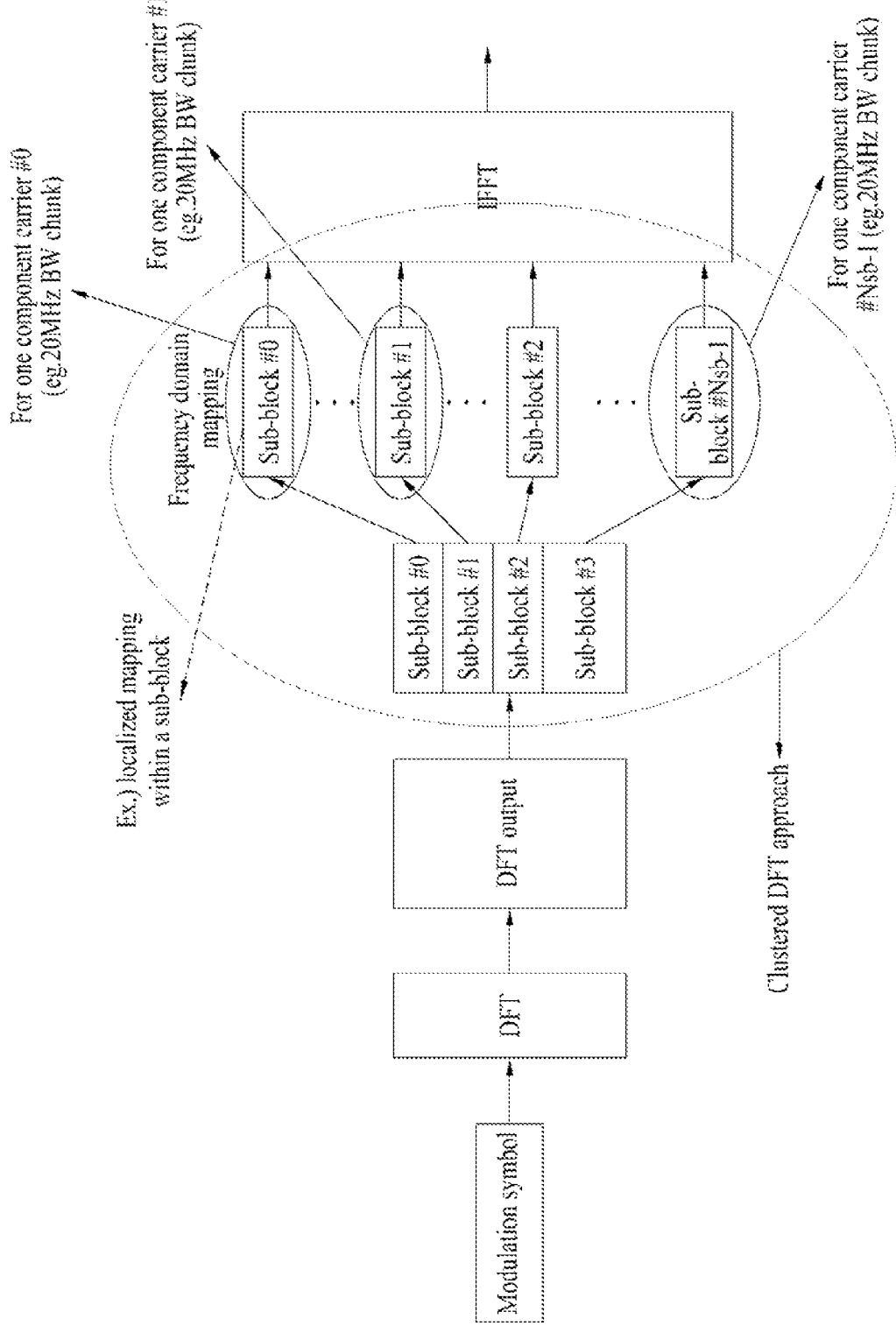
FIGS. 7 and 8 are diagrams showing a signal processing procedure of DFT process output samples to multiple carriers in clustered SC-FDMA.
Figure 8:
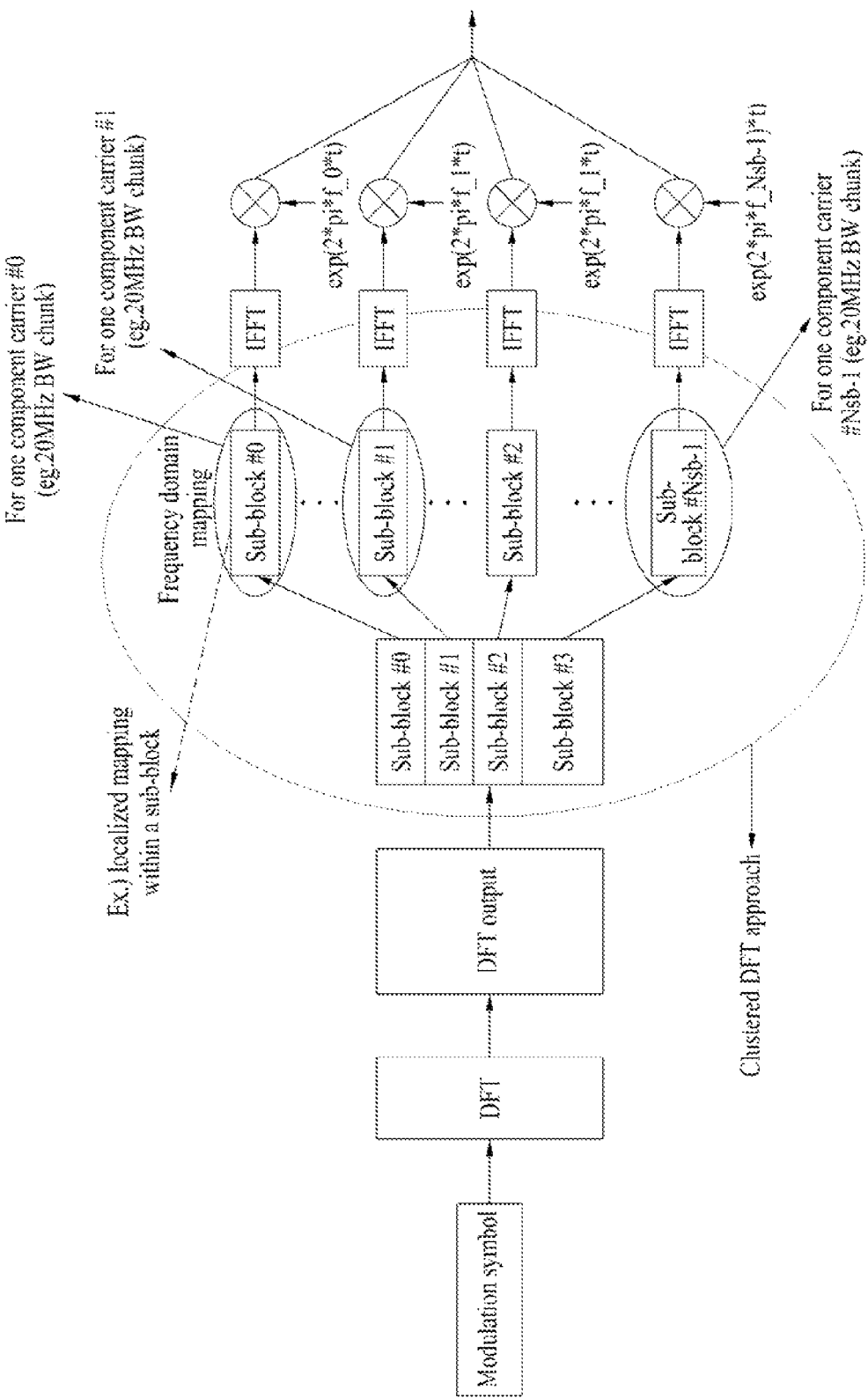

A clustered DFT-s-OFDM scheme may be employed in the transmitters 100a and 100b. In the clustered SC-FDMA scheme which is a modified form of the SC-FDMA scheme, a precoded signal is divided into several subblocks and then is non-contiguously mapped to subcarriers. FIGS. 6 to 8 show examples of mapping input symbols to a single carrier by clustered DFT-s-OFDM.

FIG. 6 is a diagram showing a signal processing procedure of mapping DFT process output samples to a single carrier in clustered SC-FDMA. FIGS. 7 and 8 are diagrams showing a signal processing procedure of DFT process output samples to multiple carriers in clustered SC-FDMA. FIG. 6 shows an example of applying an intra-carrier clustered SC-FDMA scheme and FIGS. 7 and 8 show examples of applying an inter-carrier clustered SC-FDMA scheme. FIG. 7 shows the case in which a signal is generated by a single IFFT block when a subcarrier spacing between contiguous component carriers is aligned in a state in which component carriers are contiguously assigned in a frequency domain and FIG. 8 shows the case in which a signal is generated by a plurality of IFFT blocks in a state in which component carriers are non-contiguously assigned in a frequency domain.

Figure 9:
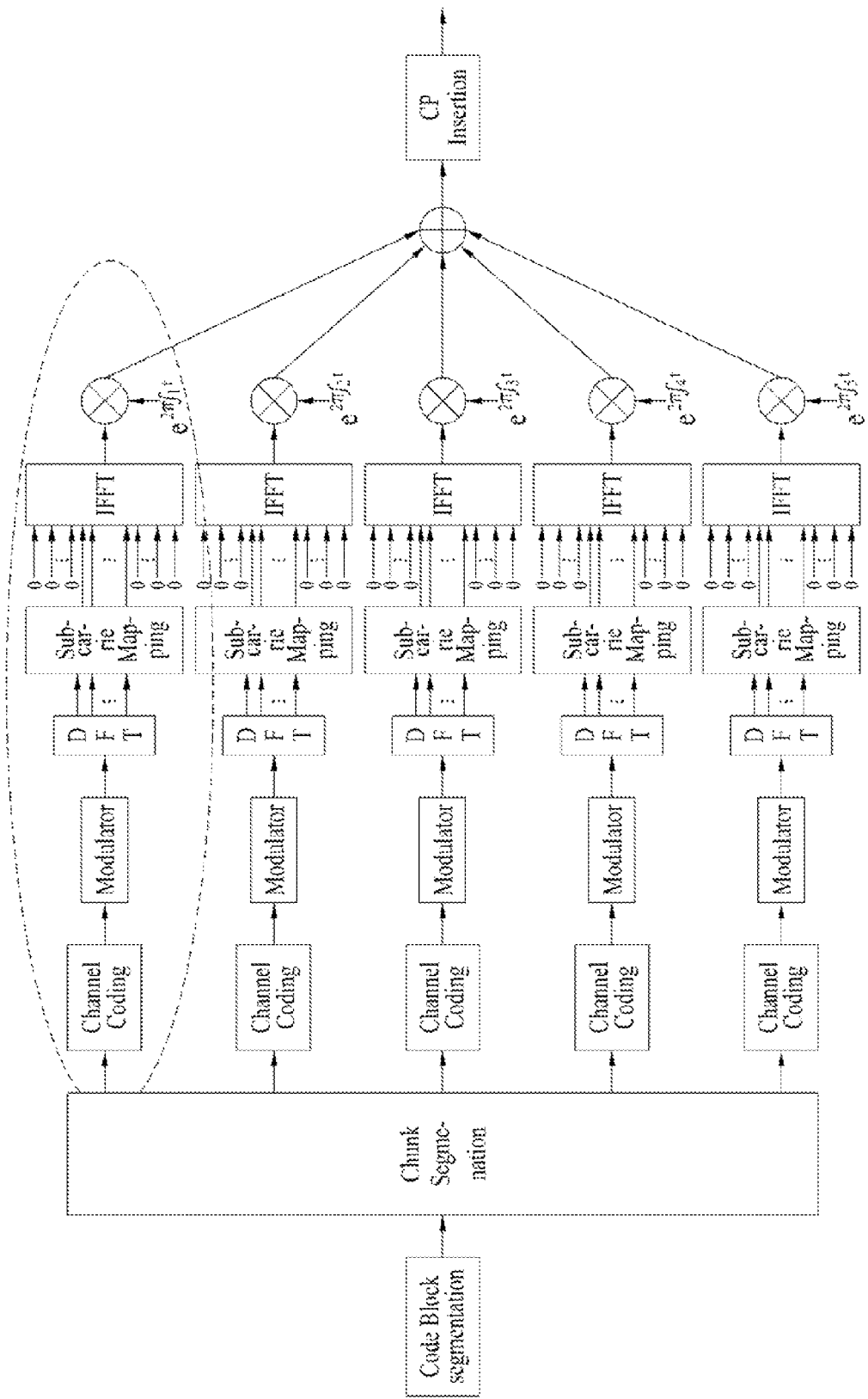
FIG. 9 is a diagram showing a signal processing procedure of segmented SC-FDMA.

FIG. 9 is a diagram showing a signal processing procedure of segmented SC-FDMA.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, the segmented SC-FDMA scheme also referred to as an NxSC-FDMA or NxDFT-s-OFDMA scheme. In the present specification, the generic term "segmented SC-FDMA" is used. Referring to FIG. 9, the segmented SC-FDMA scheme is characterized in that modulation symbols of an entire time domain are grouped into N (N being an integer greater than 1) groups and a DFT process is performed on a group unit basis, in order to reduce a single carrier property condition.

Figure 10:
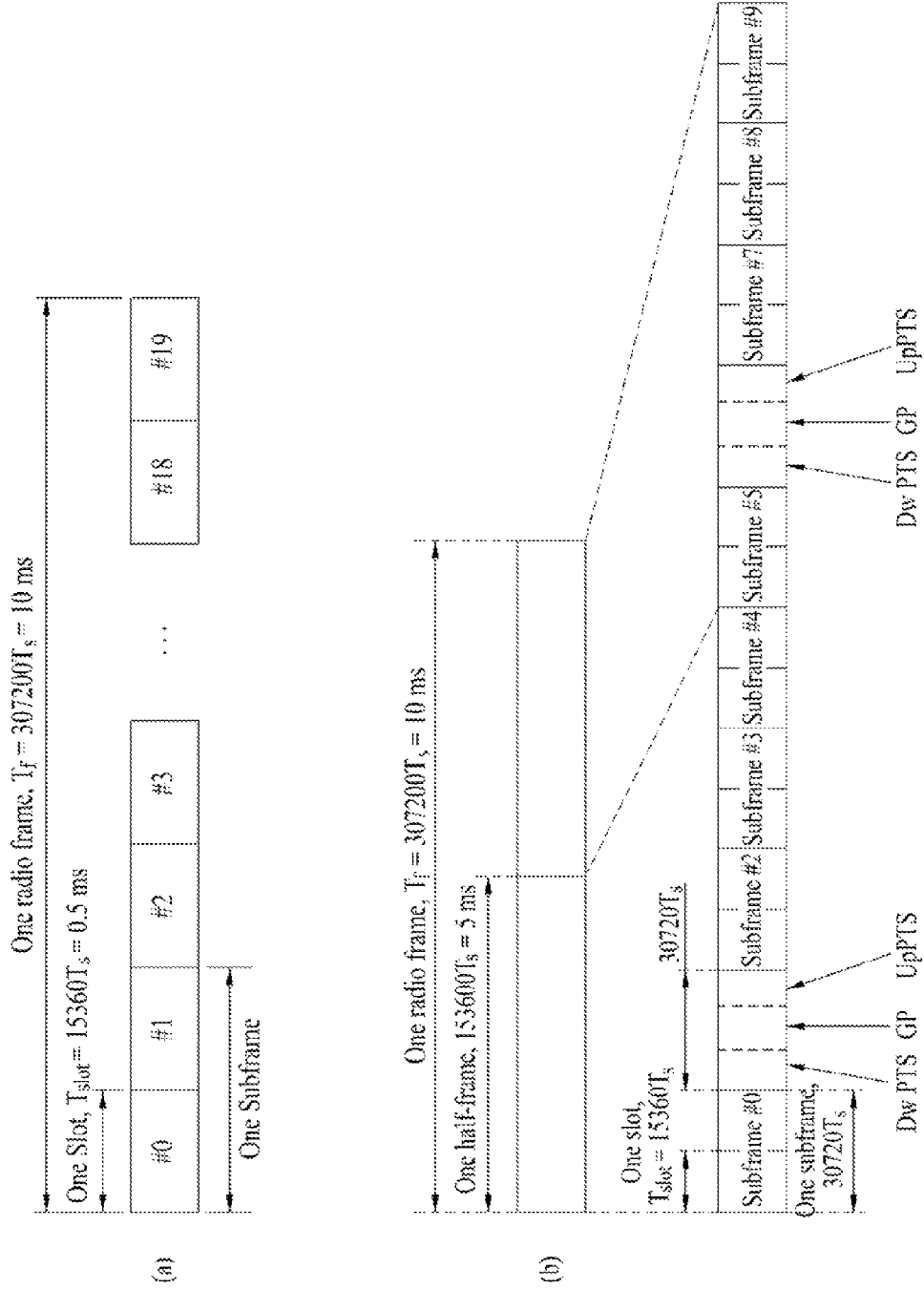
FIG. 10 is a diagram showing examples of a radio frame structure used in a wireless communication system.

FIG. 10 is a diagram showing examples of a radio frame structure used in a wireless communication system. In particular, FIG. 10(a) shows a radio frame according to a frame structure type 1 (FS-1) of a 3GPP LTE/LTE-A system and FIG. 10(b) shows a radio frame according to a frame structure type 2 (FS-2) of a 3GPP LTE/LTE-A system. The frame structure of FIG. 10(a) is applicable to a frequency division duplex (FDD) mode and a half FDD (H-FDD) mode. The frame structure of FIG. 10(b) is applicable to a time division duplex (TDD) mode.

Referring to FIG. 10, the radio frame used in 3GPP LTE/LTE-A has a length of 10 ms (307200$T_s$) and includes 10 subframes having the same size. The 10 subframes of one radio frame may be numbered. Here, $T_s$ denotes a sampling time and is expressed by $T_s$=1/(2048×15 kHz). Each subframe has a length of 1 ms and includes two slots. Within one radio frame, 20 slots are sequentially numbered 0 to 19. Each slot has a length of 0.5 ms. A time required to transmit one subframe is defined as a transmission time interval (TTI). Time resources may be divided by a radio frame number (or a radio frame index), a subframe number (or a subframe number) and a slot number (or a slot index).

The radio frame may be differently configured according to a duplex mode. For example, since downlink transmission and uplink transmission are divided according to a frequency in a FDD mode, the radio frame includes only one of a downlink subframe or an uplink subframe.

Since downlink transmission and uplink transmission are divided according to a time in a TDD mode, a subframe of a frame is divided into a downlink subframe and an uplink subframe.

Figure 11:
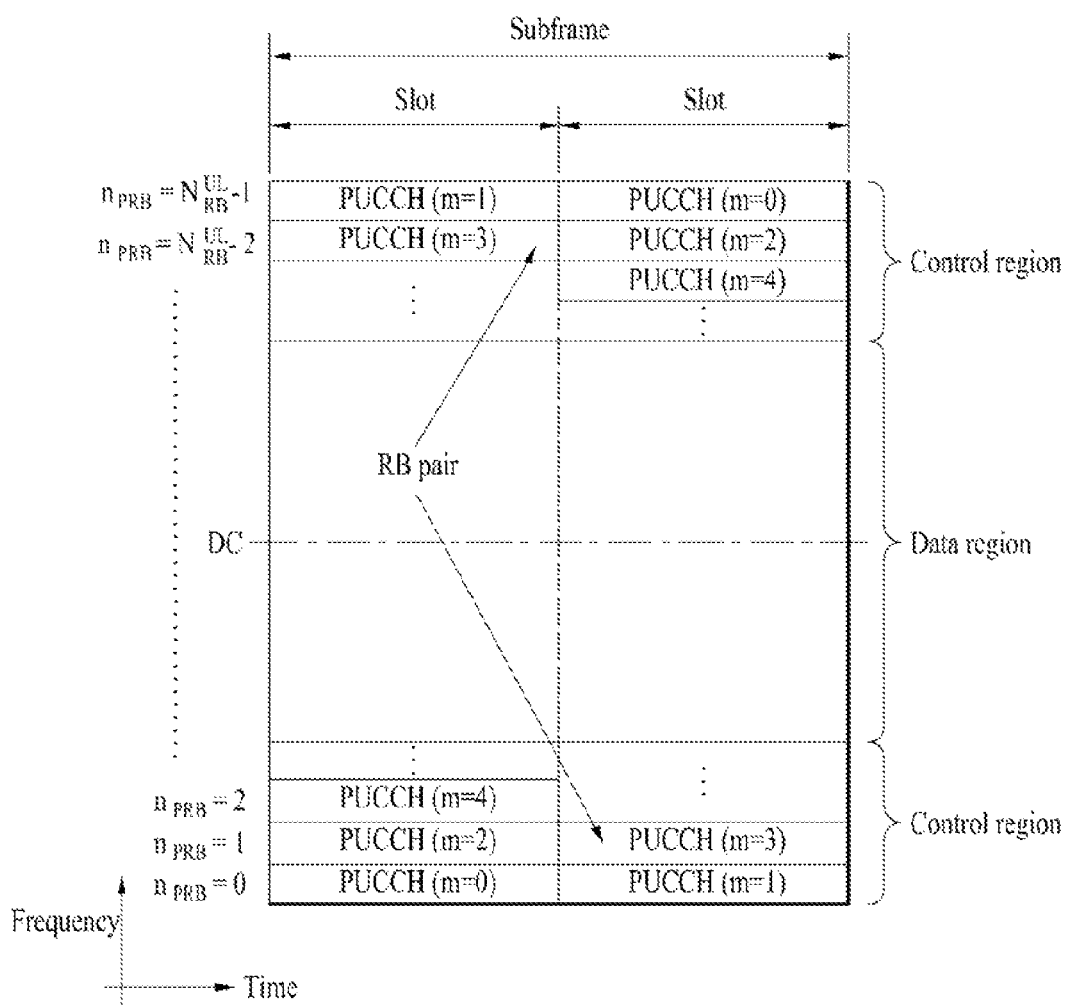
FIG. 11 is a diagram showing an uplink subframe structure.

FIG. 11 is a diagram showing an uplink subframe structure used in the present invention. Referring to FIG. 11, an uplink subframe is divided into a data region and a control region in a frequency domain. At least one physical uplink control channel (PUCCH) may be assigned to the control region in order to transmit uplink control information (UCI). In addition, at least one physical uplink shared channel (PUSCH) may be assigned to a data region in order to transmit user data. Here, if a UE employs an SC-FDMA scheme in LTE release 8 or release 9, the PUCCH and the PUSCH may not be simultaneously transmitted in the same subframe in order to maintain a single carrier property.

The size and usage of the UCI transmitted via the PUCCH differ according to PUCCH format. In addition, the size of the UCI may vary according to a coding rate. For example, the following PUCCH formats may be defined.

(1) PUCCH Format 1: used for on-off keying (OOK) modulation and scheduling request (SR).

(2) PUCCH Format 1a and Format 1b: used for ACK/NACK information transmission.

1) PUCCH Format 1a: 1-bit ACK/NACK modulated using BPSK

2) PUCCH Format 1b: 2-bit ACK/NACK modulated using QPSK (3) PUCCH Format 2: used for QPSK modulation and CQI transmission.

(4) PUCCH Format 2a and Format 2b: used for CQI and ACK/NACK simultaneous transmission.

Table 1 shows a modulation scheme and the number of bits per subframe according to a PUCCH format. Table 2 shows the number of reference signals (RSs) per slot according to a PUCCH format. Table 3 shows SC-FDMA symbol locations of an RS according to a PUCCH format. In Table 1, the PUCCH formats 2a and 2b correspond to the normal CP case.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Extended CP |
|---|---|---|
| 1, 1a, 1b | 3 | 2 |
| 2 | 2 | 1 |
| 2a, 2b | 2 | N/A |

TABLE 3

| | SC-FDMA symbol location of RS | |
|---|---|---|
| PUCCH format | Normal CP | Extended CP |
| 1, 1a, 1b | 2, 3, 4 | 2, 3 |
| 2, 2a, 2b | 1, 5 | 3 |

In an uplink subframe, subcarriers distant from a direct current (DC) subframe are used as a control region. In other words, subcarriers located at both ends of an uplink transmission bandwidth are assigned to UCI transmission. The DC subcarrier is a component remaining after signal transmission and is mapped to a carrier frequency $f_0$ in a frequency up-conversion process by the OFDMA/SC-FDMA signal generator.

A PUCCH for one UE is assigned to an RB pair in a subframe and RBs belonging to the RB pair occupy different subcarriers in two slots. The assigned PUCCH is expressed by frequency hopping of an RB pair, to which the PUCCH is assigned, at a slot edge. If frequency hopping is not applied, the RB pair occupies the same subcarrier in two slots. Regardless of frequency hopping, since the PUCCH for the UE is assigned to the RB pair in the subframe, the same PUCCH is transmitted via one RB in each slot of the subframe once, that is, is transmitted a total of twice.

Hereinafter, an RB pair used for PUCCH transmission within a subframe is referred to as a PUCCH region. In addition, the PUCCH region and a code used in the region are referred to as PUCCH resource. That is, different PUCCH resources may have different PUCCH regions or different codes in the same PUCCH region. For convenience of description, a PUCCH for transmitting ACK/NACK information is referred to as an ACK/NACK PUCCH, a PUCCH for transmitting CQI/PMI/RI information is referred to as channel state information (CSI) PUCCH and a PUCCH for transmitting SR information is referred to as an SR PUCCH.

A BS assigns PUCCH resources for uplink control information transmission to a UE using an explicit method or an implicit method.

Uplink control information (UCI) such as acknowledgement (ACK)/negative ACK (NACK), channel quality indicator (CQI) information, precoding matrix indicator (PMI) information, rank information (RI) information and scheduling request (SR) information may be transmitted in a control region of an uplink subframe.

In a wireless communication system, a UE and a BS transmit and receive a signal or data to and from each other. If the BS transmits data to the UE, the UE decodes the received data and transmits ACK to the BS if data decoding is successfully performed. If data decoding is not successfully performed, the UE transmits NACK to the BS. The same is true when the UE transmits data to the BS. In a 3GPP LTE system, a UE receives a PDSCH from a BS and transmits ACK/NACK for the PDSCH to the BS through an implicit PUCCH determined by a PDCCH carrying scheduling information of the PDSCH. If the UE does not receive data, the UE may be regarded as being in a discontinuous transmission (DTX) state and may be regarded as not receiving data or may be regarded as receiving data but as not successfully decoding the data (NACK) according to a predetermined rule.

Figure 12:
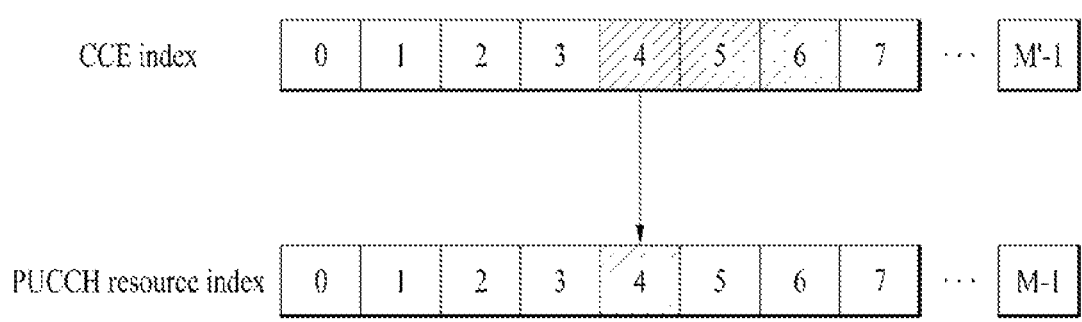
FIG. 12 is a diagram showing a structure for determining a PUCCH for ACK/NACK transmission.

FIG. 12 is a diagram showing a structure for determining a PUCCH for ACK/NACK transmission to which the present invention is applied.

PUCCH resources for ACK/NACK information transmission are not assigned to UEs in advance but a plurality of PUCCH resources is divided and used by a plurality of UEs at each point of time. More specifically, PUCCH resources used to transmit ACK/NACK information by a UE are determined using an implicit method based on a PDCCH carrying scheduling information of a PDSCH for transmitting downlink data. An entire region, in which the PDCCH is transmitted, in a downlink subframe, includes a plurality of control channel elements (CCEs) and a PDCCH transmitted to the UE includes one or more CCEs. The CCE includes a plurality (e.g., 9) of resource element groups (REGs). One REG includes four neighboring resource elements (REs) in a state of excluding a reference signal (RS). The UE transmits ACK/NACK information via implicit PUCCH resources derived or calculated by a function of a specific CCE index (e.g., a first or lowest CCE index) among CCE indices configuring the received PDCCH.

Referring to FIG. 12, the lowest CCE index of the PDCCH corresponds to a PUCCH resource index for ACK/NACK transmission. As shown in FIG. 12, if it is assumed that scheduling information of the PDSCH is transmitted to the UE via a PDCCH including fourth to sixth CCEs, the UE transmits ACK/NACK to the BS via PUCCH resources corresponding to a fourth PUCCH derived or calculated from a fourth CCE index which is a lowest CCE configuring the PDCCH.

FIG. 12 shows the case in which a maximum of M' CCEs is present in a downlink subframe and a maximum of M PUCCH resources is present in an uplink subframe. Although M'=M may be possible, M' and M values may be different and mapping of CCEs and PUCCH resources may overlap. For example, a PUCCH resource index may be determined as follows.

$$n^{(1)}_{PUCCH} = n_{CCE} + N^{(1)}_{PUCCH} \quad \text{[Equation 1]}$$

$n^{(1)}_{PUCCH}$ denotes a PUCCH resource index for transmitting ACK/NACK information, and $N^{(1)}_{PUCCH}$ denotes a signal value received from a higher layer. $n_{CCE}$ denotes a lowest value among CCE indices used for PDCCH transmission.

Figure 13:
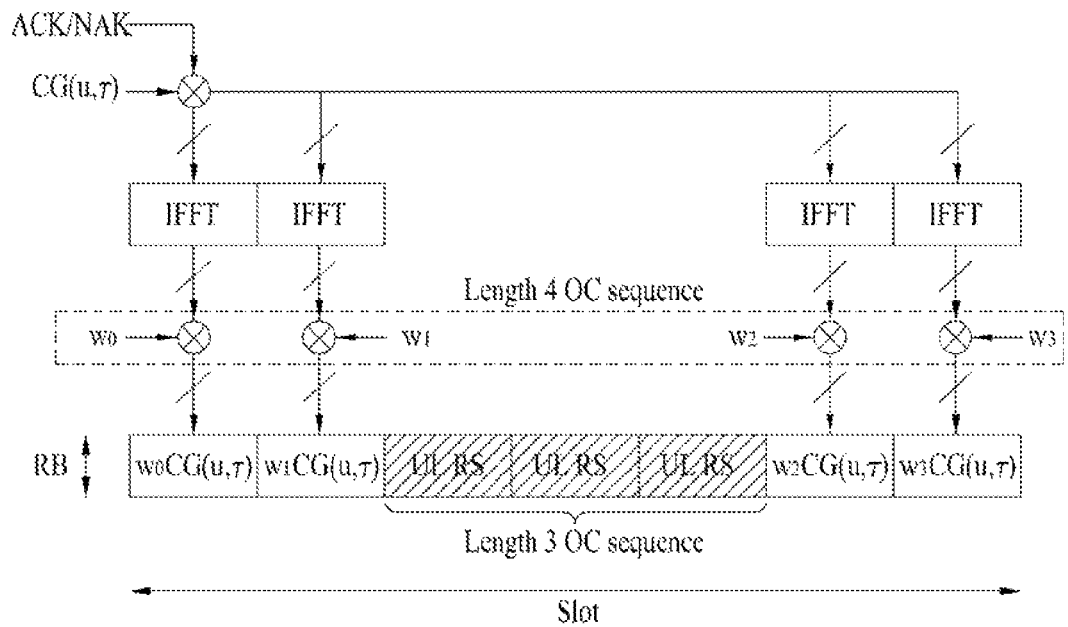
FIGS. 13 and 14 are diagrams showing slot level structures of PUCCH formats 1a and 1b for ACK/NACK transmission.
Figure 14:
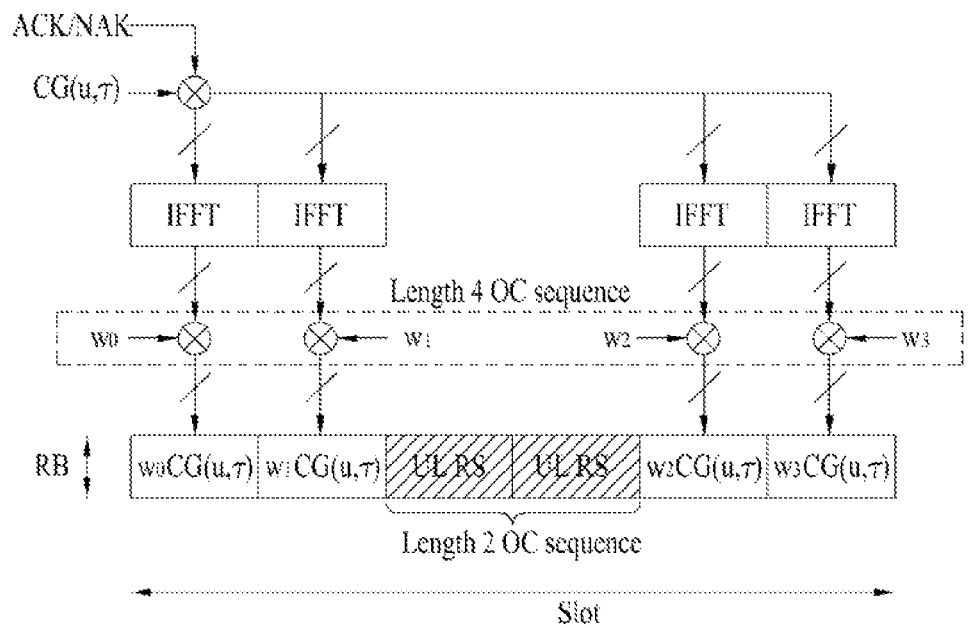

FIGS. 13 and 14 are diagrams showing slot level structures of PUCCH formats 1a and 1b for ACK/NACK transmission.

FIG. 13 shows PUCCH formats 1a and 1b in the normal CP case. FIG. 14 shows PUCCH formats 1a and 1b in the extended CP case. In the PUCCH formats 1a and 1b, the same uplink control information is repeated within a subframe in slot units. Each UE transmits an ACK/NACK signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain spreading codes). The OC includes, for example, a Walsh/DFT orthogonal code. If the number of CSs is 6 and the number of OCs is 3, a total of 18 UEs may be multiplexed in the same physical resource block (PRB) based on a single antenna. Orthogonal sequences w0, w1, w2 and w3 may be applied in an arbitrary time domain (after FFT modulation) or an arbitrary frequency domain (before FFT modulation). The slot level structure of PUCCH format 1 for SR information transmission is equal to that of PUCCH formats 1a and 1b and only a modulation method thereof is different from that of PUCCH formats 1a and 1b.

For ACK/NACK for SR information transmission and semi-persistent scheduling (SPS), PUCCH resources including CSs, OCs, PRBs and RSs may be assigned to a UE through radio resource control (RRC). As shown in FIG. 12, for dynamic ACK/NACK (or ACK/NACK for non-persistent scheduling) feedback and ACK/NACK feedback for a PDCCH indicating SPS release, PUCCH resources may be implicitly assigned to the UE using a lowest CCE index of a PDCCH for SPS release or a PDCCH corresponding to a PDSCH.

Figure 15:
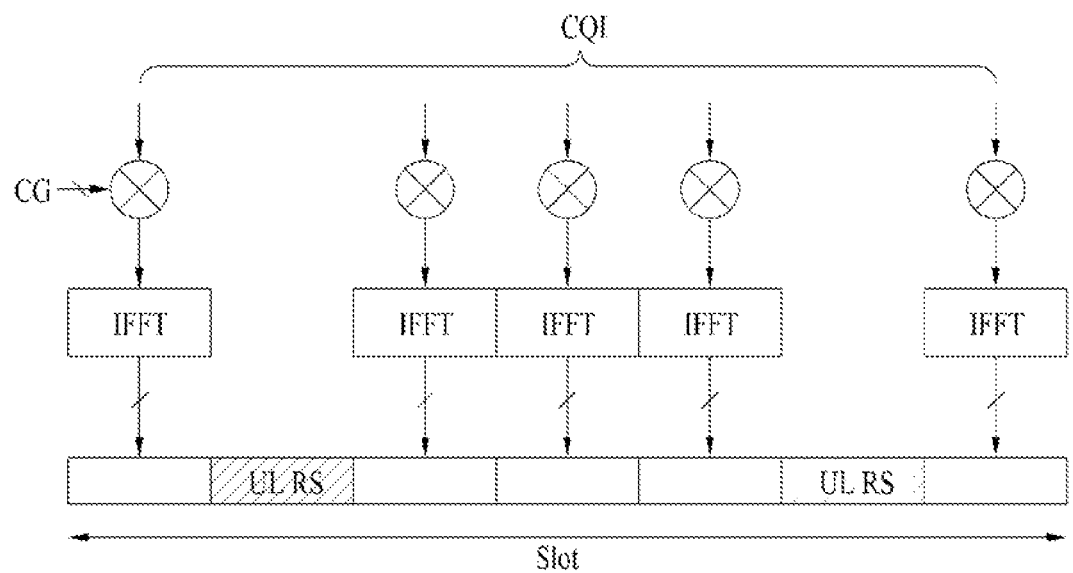
FIG. 15 is a diagram showing PUCCH format 2/2a/2b of a normal cyclic prefix (CP) case.
Figure 16:
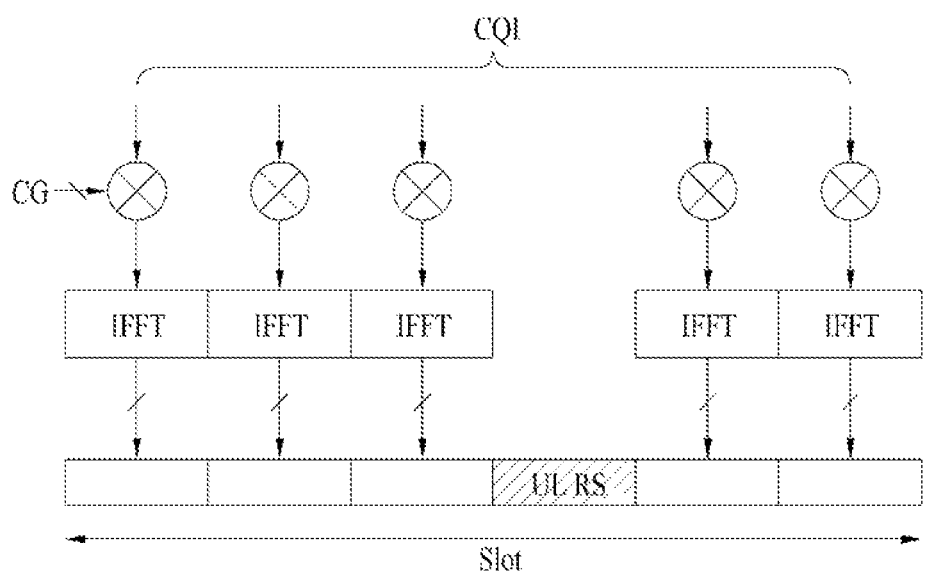
FIG. 16 is a diagram showing PUCCH format 2/2a/2b of an extended CP case.

FIG. 15 shows a PUCCH format 2/2a/2b in the normal CP case. FIG. 16 shows a PUCCH format 2/2a/2b in the extended CP case. Referring to FIGS. 15 and 16, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 OCs for PUCCH formats 1/1a/1b are shown in the following Tables 4 and 5.

TABLE 4

| Sequence index | Orthogonal sequence |
| --- | --- |
| 0 | [+1 +1 +1 +1] |
| 1 | [+1 −1 +1 −1] |
| 2 | [+1 −1 −1 +1] |

TABLE 5

| Sequence index | Orthogonal sequence |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The OCs for the RS in the PUCCH formats 1/1a/1b is shown in Table 6.

TABLE 6

| Sequence index | Normal CP | Extended CP |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 is a diagram showing ACK/NACK channelization of PUCCH formats 1 and 1b. FIG. 14 corresponds to $\Delta^{PUCCH}_{shift} = 2$.

Figure 18:
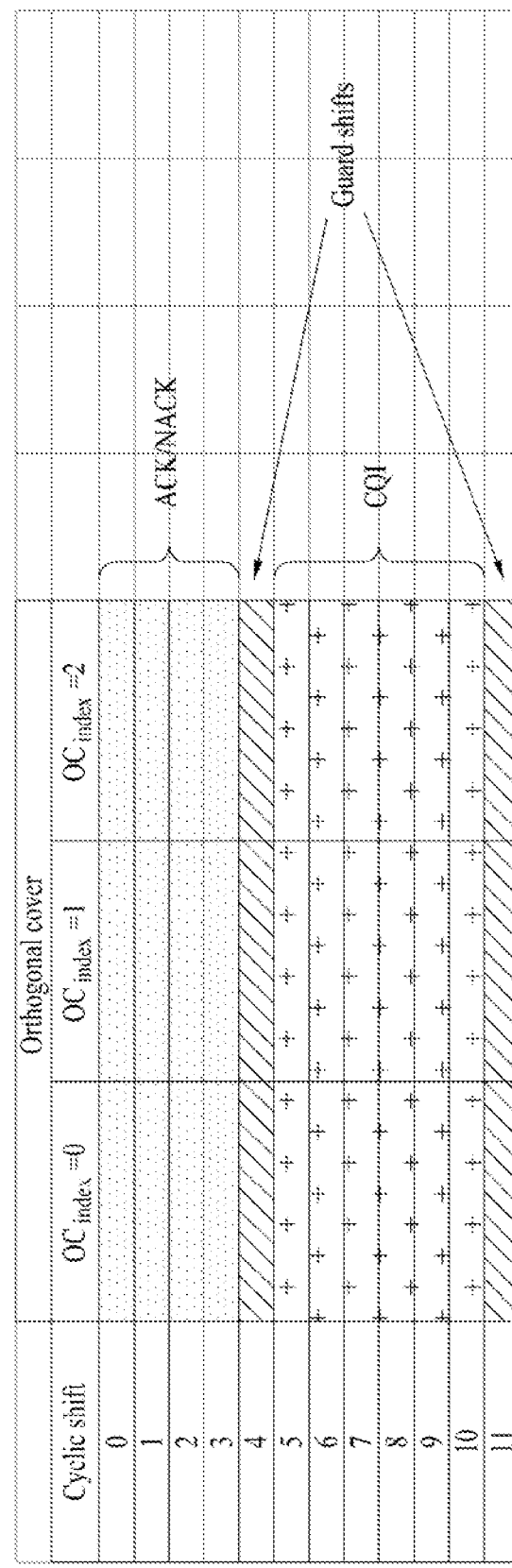
FIG. 18 is a diagram showing channelization of a mixed structure of PUCCH format 1/1a/1b and format 2/2a/2b within the same PRB.

FIG. 18 is a diagram showing channelization of a mixed structure of PUCCH format 1/1a/1b and format 2/2a/2b within the same PRB.

Cyclic shift (CS) hopping and orthogonal cover (OC) remapping may be applied as follows.

(1) Symbol based cell-specific CS hopping for randomization of inter-cell interference (2) Slot level CS/OC remapping 1) For inter-cell randomization 2) Slot based access for mapping between ACK/NACK channel and resource k Meanwhile, resource $n_r$ for PUCCH format 1/1a/1b includes the following combinations.

(1) CS (equal to DFT orthogonal code at a symbol level) $n_{cs}$ (2) OC (orthogonal cover at a slot level) $n_{oc}$ (3) Frequency RB $n_{rb}$ When indices representing CS, OC and RB are respectively $n_{cs}$, $n_{oc}$ and $n_{rb}$, a representative index $n_r$ includes $n_{cs}$, $n_{oc}$ and $n_{rb}$. $N_r$ satisfies $n_r=(n_{cs}, n_{oc}, n_{rb})$.

CQI, PMI, RI, and a combination of CQI and ACK/NACK may be transmitted through PUCCH format 2/2a/2b. Reed Muller (RM) channel coding may be applied.

For example, in an LTE system, channel coding for uplink CQI is described as follows. A bit stream $a_0, a_1, a_2, a_3, \ldots, a_{A-1}$ is channel coded using a (20, A) RM code. Table 7 shows a base sequence for the (20, A) code. $a_0$ and $a_{A-1}$ denote a most significant bit (MSB) and a least significant bit (LSB), respectively. In the extended CP case, a maximum number of transmitted bits is 11 bits except for the case in which CQI and ACK/NACK are simultaneously transmitted. After coding to 20 bits using an RM code, QPSK modulation may be applied. Before QPSK modulation, coded bits may be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 2.

$$b_i = \sum_{n=0}^{A-1} (a_n \cdot M_{i,n}) \bmod 2 \qquad \text{[Equation 2]}$$

where, i=0, 1, 2, ..., B−1.

Table 8 shows a uplink control information (UCI) field for broadband report (single antenna port, transmit diversity or open loop spatial multiplexing PDSCH) CQI feedback.

TABLE 8

| Field | Bandwidth |
|---|---|
| Broadband CQI | 4 |

Table 9 shows a UCI field for broadband CQI and PMI feedback. This field reports closed loop spatial multiplexing PDSCH transmission.

TABLE 9

| | Bandwidth | | | |
|---|---|---|---|---|
| | 2 antenna ports | | 4 antenna ports | |
| Field | Rank = 1 | Rank = 2 | Rank = 1 | Rank > 1 |
| Broadband CQI | 4 | 4 | 4 | 4 |
| Spatial difference CQI | 0 | 3 | 0 | 3 |
| Preceding matrix index (PMI) | 2 | 1 | 4 | 4 |

Table 10 shows a UCI field for RI feedback for broadband report.

TABLE 10

| | Bit widths | | |
|---|---|---|---|
| | | 4 antenna ports | |
| Field | 2 antenna ports | Maximum of 2 antenna ports | Maximum of 4 antenna ports |
| Field | 2 antenna ports | | |
| Rank indication (RI) | 1 | 1 | 2 |

Figure 19:
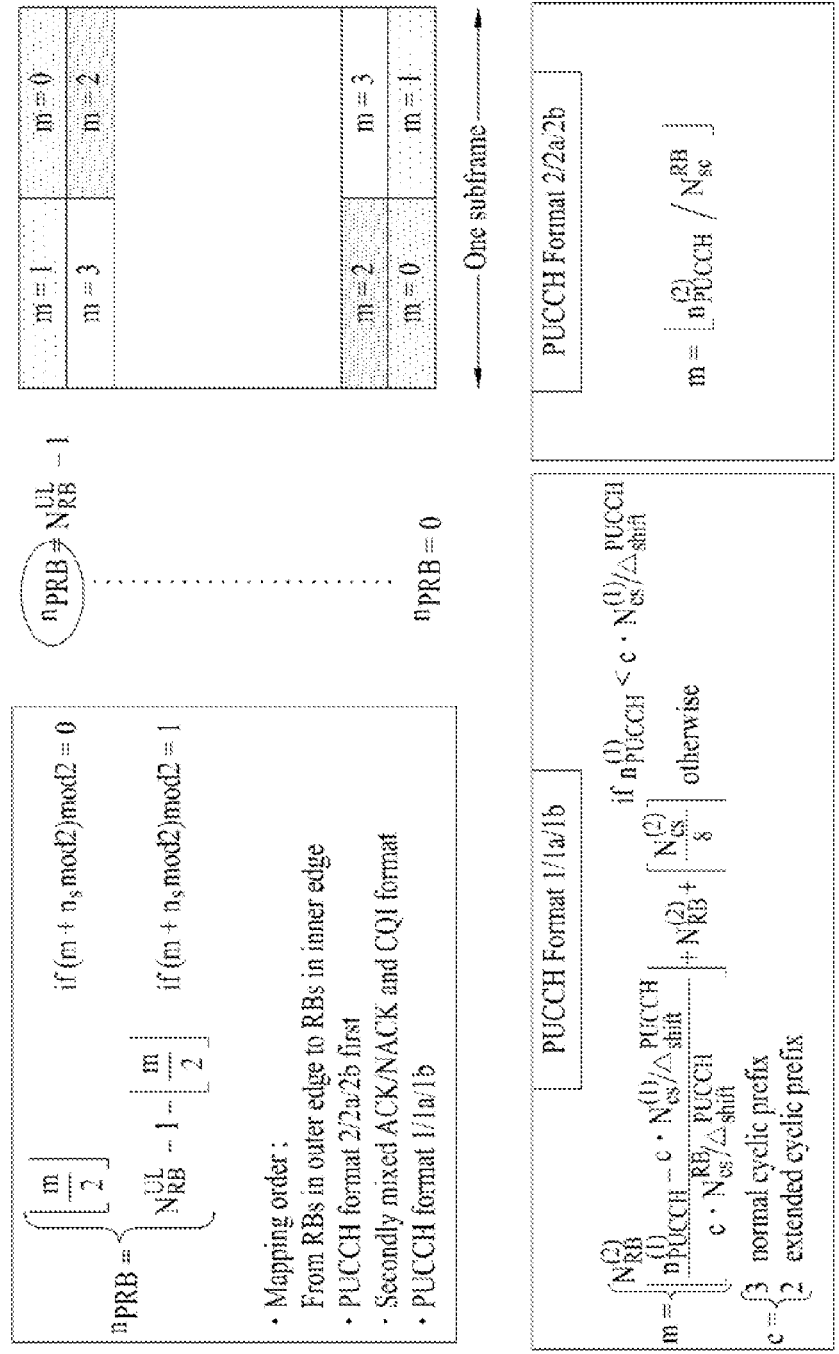
FIG. 19 is a diagram showing assignment of a physical resource block (PRB)

FIG. 19 is a diagram showing assignment of a physical resource block (PRB). As shown in FIG. 19, the PRB may be used to transmit a PUCCH at a slot $n_s$.

A multi-carrier system or a carrier aggregation system refers to a system which uses an aggregate of a plurality of carriers having a bandwidth less than a target bandwidth for broadband support. When a plurality of carriers having a bandwidth less than a target bandwidth is aggregated, the bandwidth of the aggregated carriers may be restricted to a bandwidth used in a conventional system for backward compatibility with the conventional system. For example, the conventional LTE system supports bandwidths of 1.4, 3, 5, 10, 15 and 20 MHz and an LTE_Advanced (LTE_A) system evolved from the LTE system may support a bandwidth greater than 20 MHz using only the bandwidths supported by the LTE system. Alternatively, regardless of the bandwidths used in the conventional system, a new bandwidth may be defined so as to support CA. Multi-carrier may be used interchangeably with carrier aggregation and bandwidth aggregation. Carrier aggregation may include contiguous carrier aggregation and non-contiguous carrier aggregation. In addition, carrier aggregation may include intra-band carrier aggregation and inter-band carrier aggregation.

Figure 20:
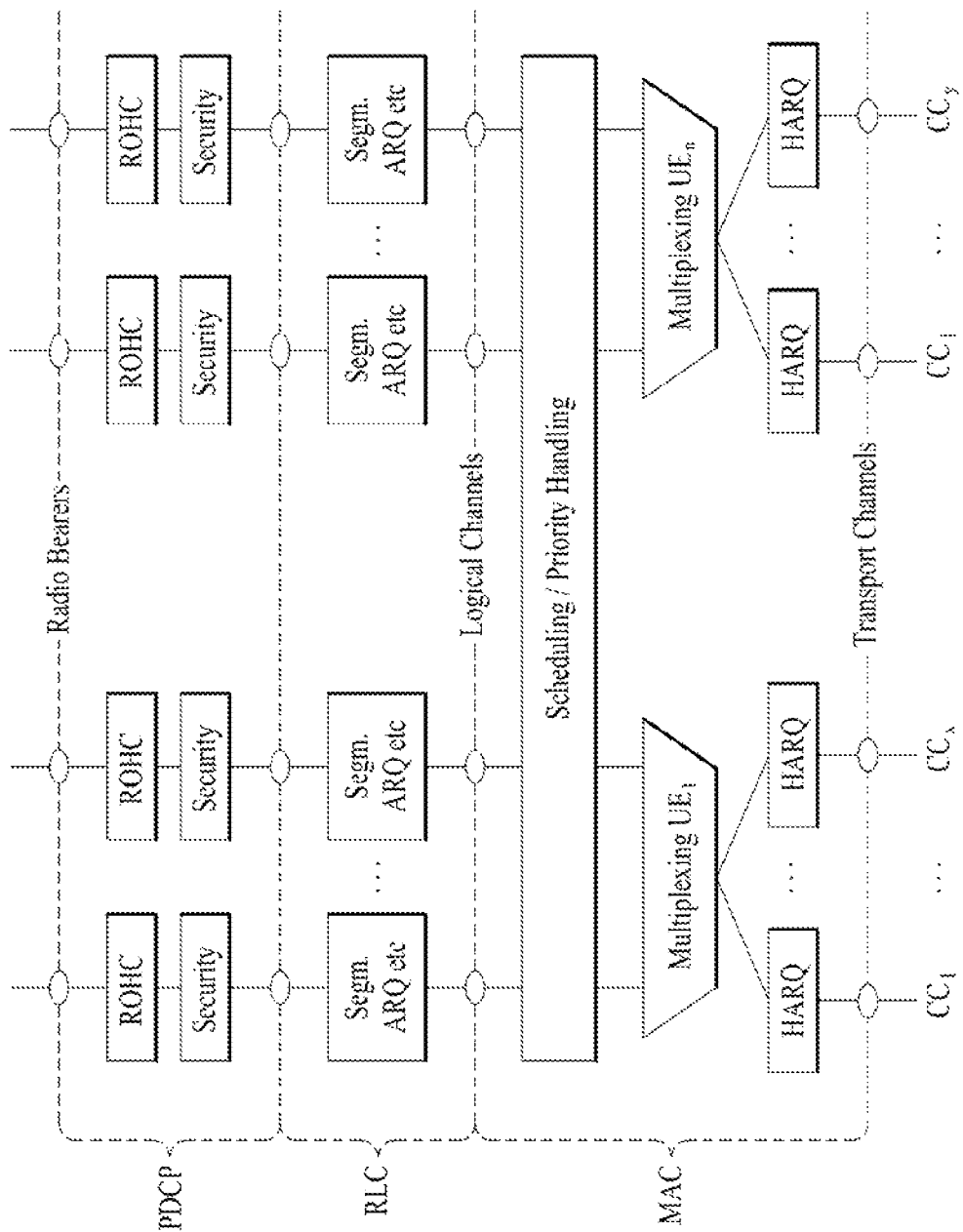
FIG. 20 is a diagram showing a concept for managing downlink component carriers (DL CCs) at a base station.
Figure 21:
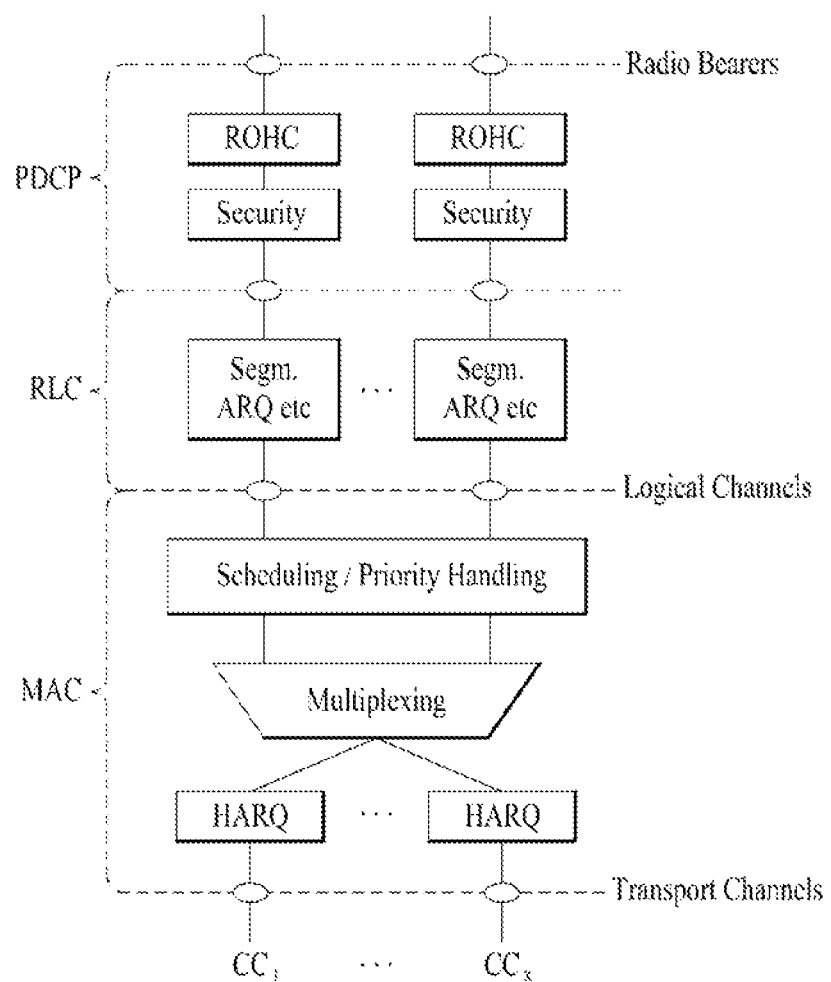
FIG. 21 is a diagram showing a concept for managing uplink component carriers (UL CCs) at a UE.

FIG. 20 is a diagram showing the concept for managing downlink component carriers (DL CCs) at a BS, and FIG. 21 is a diagram showing a concept for managing uplink component carriers (UL CCs) at a BS. For convenience of description, assume that a higher layer is a media access layer (MAC) layer in FIGS. 19 and 20.

Figure 22:
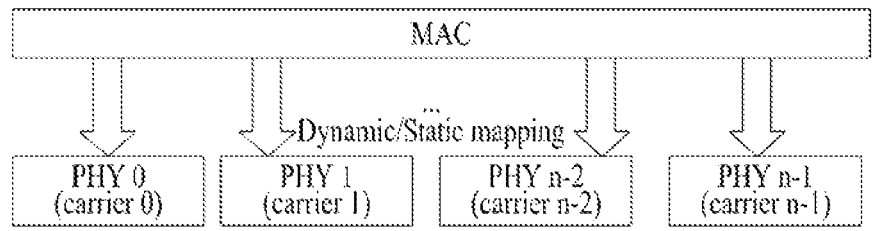
FIG. 22 is a diagram showing a concept in which one media access control (MAC) layer manages multiple carriers at a base station.
Figure 23:
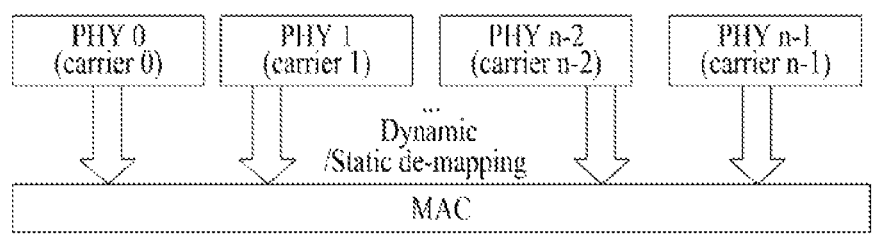
FIG. 23 is a diagram showing a concept in which one MAC layer manages multiple carriers at a UE.

FIG. 22 is a diagram showing a concept in which one media access control (MAC) layer manages multiple carriers at a BS, and FIG. 23 is a diagram showing the concept in which one MAC layer manages multiple carriers at a UE.

Referring to FIGS. 22 and 23, one MAC layer manages one or more frequency carriers so as to perform transmission and reception. Since frequency carriers managed by one MAC layer do not need to be contiguous to each other, resource management is flexible. In FIGS. 22 and 23, one physical (PHY) layer means one component carrier, for convenience. One PHY layer does not necessarily mean an independent radio frequency (RF) device. In general, one independent RF device means one PHY layer, but the present invention is not limited thereto. One RF device may include several PHY layers.

Figure 24:
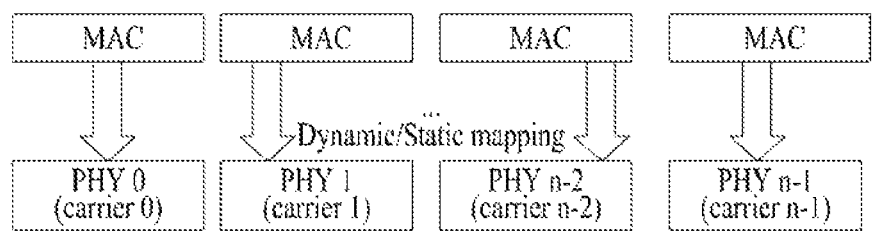
FIG. 24 is a diagram showing a concept in which a plurality of MAC layers manages multiple carriers at a base station.
Figure 25:
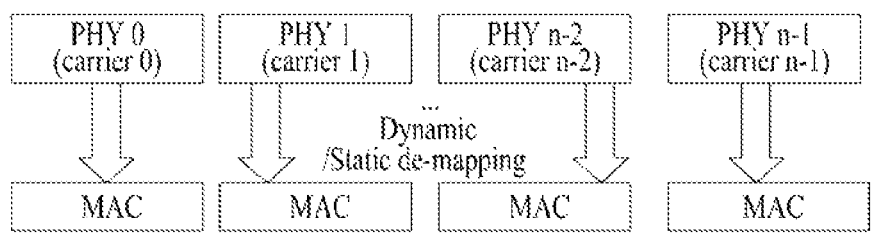
FIG. 25 is a diagram showing a concept in which a plurality of MAC layers manages multiple carriers at a UE.
Figure 26:
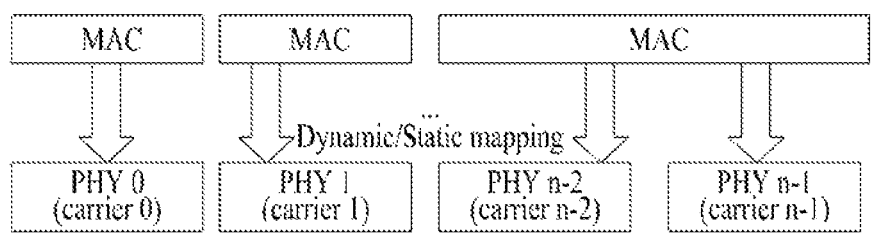
FIG. 26 is a diagram showing another concept in which a plurality of MAC layers manages multiple carriers at a base station.
Figure 27:
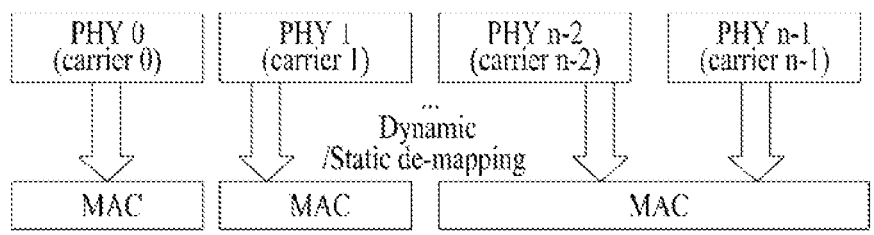
FIG. 27 is a diagram showing another concept in which a plurality of MAC layers manages multiple carriers at a UE.

FIG. 24 is a diagram showing a concept in which a plurality of MAC layers manages multiple carriers at a BS. FIG. 25 is a diagram showing a concept in which a plurality of MAC layers manages multiple carriers at a UE. FIG. 26 is a diagram showing another concept in which a plurality of MAC layers manages multiple carriers at a BS. FIG. 27 is a diagram showing another concept in which a plurality of MAC layers manages multiple carriers at a UE.

In addition to the structures shown in FIGS. 22 and 23, several MAC layers may control several carriers as shown in FIGS. 24 to 27.

For example, each MAC layer may control each carrier in one-to-one correspondence as shown in FIGS. 24 and 25 or each MAC layer may control each carrier in one-to-one correspondence with respect to some carriers and one MAC layer may control one or more carriers with respect to the remaining carriers as shown in FIGS. 26 and 27.

The system includes a plurality of carriers such as carrier one to carriers N and the carriers may be contiguous or non-contiguous, regardless of uplink/downlink. A TDD system is configured to manage a plurality (N) of carriers in downlink and uplink transmission. A FDD system is configured such that a plurality of carriers is used in each of uplink and downlink. In the case of the FDD system, asymmetric CA in which the numbers of carriers aggregated in uplink and downlink and/or the bandwidths of the carriers are different may also be supported.

When the numbers of aggregated component carriers in uplink and downlink are the same, it is possible to configure all component carriers so as to enable backward compatibility with the conventional system. However, component carriers which do not consider compatibility are not excluded from the present invention.

Figure 28:
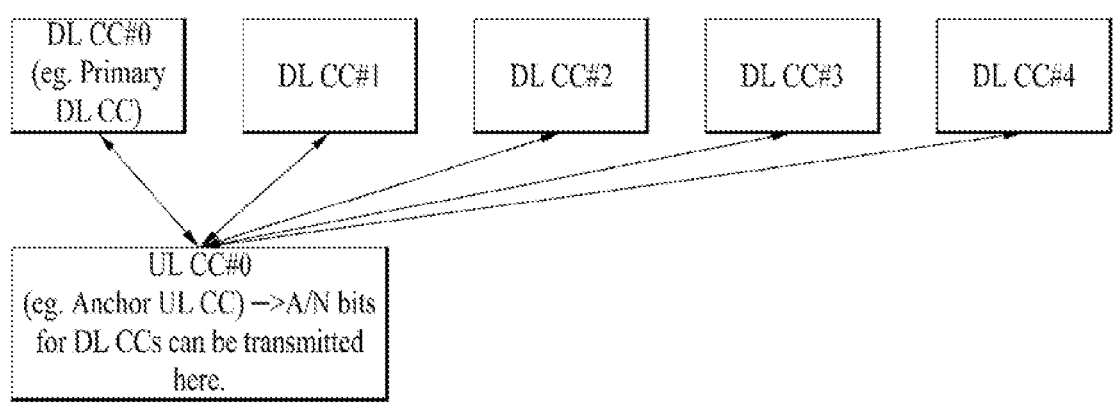
FIG. 28 is a diagram showing asynchronous carrier aggregation (CA) in which five downlink component carriers (DL CCs) are linked with one uplink CC (UL CC)

FIG. 28 is a diagram showing asynchronous carrier aggregation (CA) in which five downlink component carriers (DL CCs) are linked with one uplink CC (UL CC). The shown asymmetric CA is set from the viewpoint of UCI transmission. Specific UCI (e.g., ACK/NACK response) for a plurality of DL CCs is collected at one UL CC and is transmitted. In addition, even when a plurality of UL CCs is configured, specific UCI (e.g., ACK/NACK response for DL CC) is transmitted via a predetermined UL CC (e.g., a primary CC, a primary cell or a PCell). For convenience, if it is assumed that each DL CC may carry a maximum of two codewords and the number of ACK/NACK bits for each CC depends on a maximum number of codewords per CC (e.g., if the maximum number of codewords set from the BS at a specific CC is 2, even when a specific PDCCH uses only one codeword at a CC, the number of ACK/NACK bits therefor is 2 which is the maximum number of codewords at CC), the number of UL ACK/NACK bits is at least two at one subframe per DL CC. In this case, in order to transmit ACK/NACK for data, which is received through five DL CCs, through one UL CC, ACK/NACK of at least 10 bits is necessary for one subframe. In order to distinguish a DTX state of each DL CC, at least 12 bits ($=5^5=3125=11.61$ bits) are necessary for ACK/NACK transmission. Since ACK/NACK of up to 2 bits may be transmitted in the existing PUCCH formats 1a/1b, such a structure cannot transmit extended ACK/NACK information. For convenience, although an example in which the amount of UCI is increased due to CA is described, the amount of UCI may be increased due to increase in the number of antennas, presence of a backhaul subframe in a TDD system and a relay system, etc. Similarly to ACK/NACK, even when control information associated with a plurality of DL CCs is transmitted through one UL CC, the amount of control information to be transmitted is increased. For example, in the case in which CQI/PMI/RI for a plurality of DL CCs must be transmitted, UCI payload may be increased. Meanwhile, although ACK/NACK information for codewords are described in the present invention, transport blocks corresponding to the codewords may be present and ACK/NACK information for the transport blocks may be applied. In addition, although ACK/NACK information for one DL subframe per DL CC for transmission of one UL CC is shown, ACK/NACK information for one or more DL subframes per DL CC for transmission of one UL CC may be applied in a TDD system.

A UL anchor CC (UL primary CC (PCC)) shown in FIG. 28 is used to transmit PUCCH resources or UCI and may be determined in a cell-specific or UE-specific manner. For example, the UE may determine a CC which attempts initial random access as a primary CC. At this time, a DTX state may be explicitly fed back and the same state as NACK may be fed back to be shared.

The LTE-A system uses the concept of a cell in order to manage radio resources. A cell is defined as a combination of downlink resources and uplink resources, and the uplink resources are not mandatory. Accordingly, the cell may be composed of downlink resources alone or both downlink resources and uplink resources. Linkage between a downlink resource carrier frequency (or a DL CC) and a uplink resource carrier frequency (or a UL CC) per cell may be indicated by a system information block (SIB). A cell operating on a primary frequency resource (e.g., PCC) is referred to as a primary cell (PCell) and a cell operating on a secondary frequency resource (e.g., a SCC) is referred to as a secondary cell (SCell). The PCell may indicate a cell used when a UE performs an initial connection establishment process or a connection re-establishment process). The PCell may indicate a cell indicated in a handover process. In LTE-A release 10, only one PCell may be present upon carrier aggregation. The SCell may be configured after radio resource control (RRC) connection establishment and may be used to provide additional radio resources. The PCell and the SCell may be used as a serving cell. In the case of a UE which is in an RRC_connected state but in which CA is not set or a UE which does not support CA, one serving cell composed of only a PCell is present. In contrast, in the case of a UE which is an RRC_connected state and in which CA is set, one or more serving cells may be present and all the serving cells include a PCell and one or more SCells. For carrier aggregation, after an initial security activation process begins, a network may be added to a PCell initially configured in a connection establishment process so as to configure a network including one or more SCells for a UE supporting carrier aggregation. Accordingly, the PCC corresponds to the PCell, primary (radio) resources and primary frequency resources, which are used interchangeably. Similarly, the SCell corresponds to the SCell, secondary (radio) resources and secondary frequency resources, which are used interchangeably.

Hereinafter, methods of efficiently transmitting increased uplink control information will be described with reference to the drawings. More specifically, a new PUCCH format/signal processing procedure/resource assignment method for transmitting increased uplink control information is proposed. For description, the new PUCCH format proposed by the present invention is referred to as PUCCH format 3 from the viewpoint that up to a CA PUCCH format or PUCCH format 2 is defined in the existing LTE release 8/9. The technical features of PUCCH format 3 proposed by the present invention are easily applicable to an arbitrary physical channel (e.g., a PUSCH) for transmitting uplink control information using the same or similar scheme. For example, the embodiments of the present invention are applicable to a periodic PUSCH structure for periodically transmitting control information or an aperiordic PUSCH structure for aperiodically transmitting control information.

The following drawings and embodiments will be described based on the case in which a UCURS symbol structure of PUCCH format 1 (normal CP) of LTE is used as a UCURS symbol structure of a subframe/slot level applied to PUCCH format 3. The UCURS symbol structure of the subframe/slot level in the shown PUCCH format 3 is defined for convenience and the present invention is not limited to a specific structure. In PUCCH format 3 according to the present invention, the number and locations of UCI/RS symbols may be freely changed according to system design. For example, PUCCH format 3 according to the embodiment of the present invention may be defined using an RS symbol structure of PUCCH format 2/2a/2b of LTE.

PUCCH format 3 according to the embodiment of the present invention may be used to transmit uplink control information of an arbitrary kind and/or size. For example, PUCCH format 3 according to the embodiment of the present invention can be used to transmit information, such as HARQ ACK/NACK, CQI, PMI, RI and/or SR, which may have a payload having an arbitrary size. For convenience of description, the drawings and embodiments will be described based on the case in which PUCCH format 3 according to the present invention is used to transmit ACK/NACK information.

FIGS. 29 to 32 are diagrams illustrating a structure of PUCCH format 3 according to the present invention and a signal processing procedure therefor. In particular, FIGS. 29 to 32 show the structure of a DFT-based PUCCH format. According to the DFT-based PUCCH structure, a PUCCH is subjected to DFT precoding and time domain orthogonal cover (OC) at an SC-FDMA level and is transmitted. Hereinafter, the DFT-based PUCCH format is referred to as PUCCH format 3.

Figure 29:
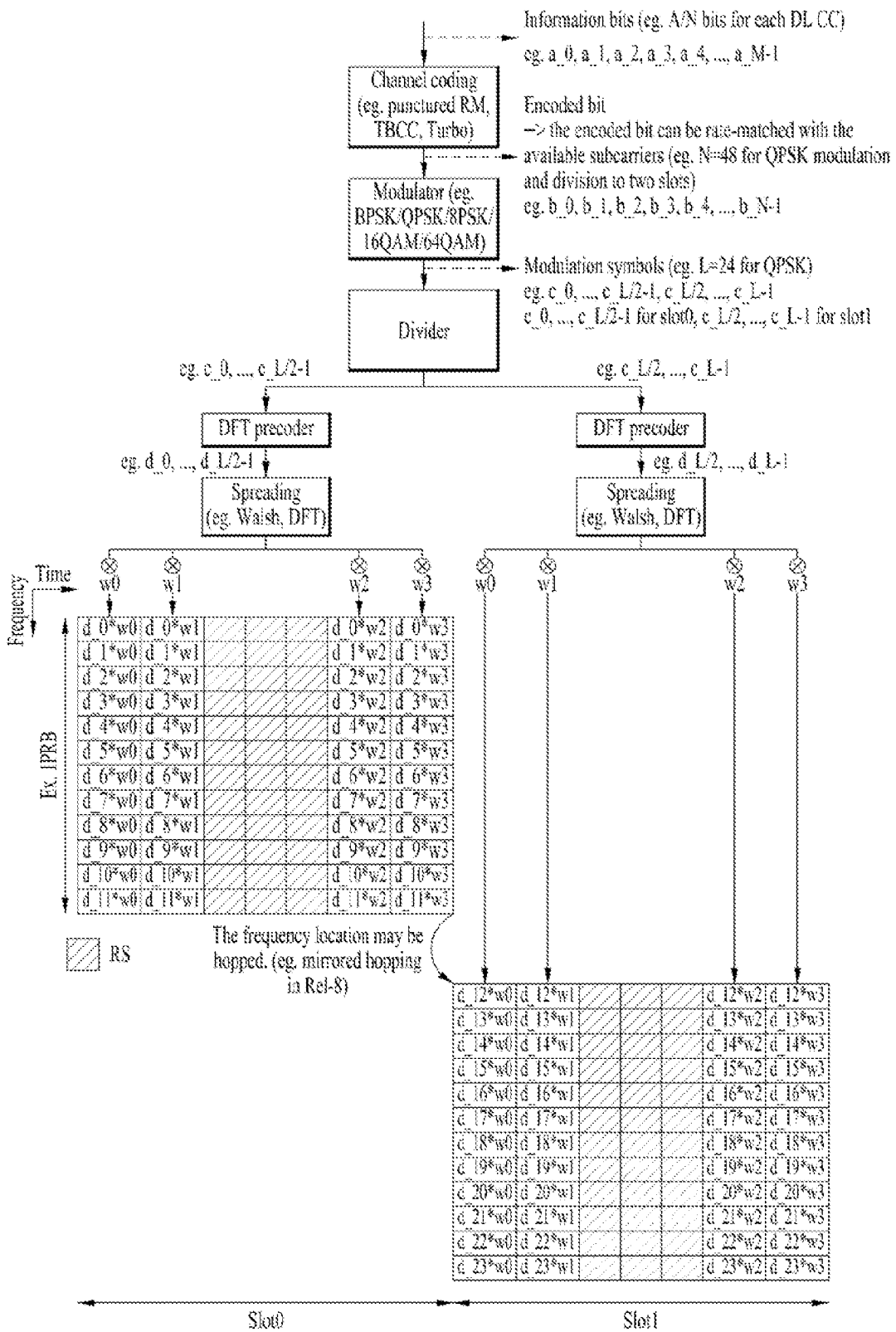
FIGS. 29 to 32 are diagrams illustrating a structure of PUCCH format 3 according to the present invention and a signal processing procedure therefor.

FIG. 29 shows the structure of PUCCH format 3 using an orthogonal code (OC) with SF=4. Referring to FIG. 29, a channel coding block performs channel coding with respect to transmission bits $a\_0, a\_1, \ldots,$ and $a\_M-1$ (e.g., multiple ACK/NACK bits) and generates encoded bits (coded bits or coding bits) (or codewords) $b\_0, b\_1, \ldots,$ and $b\_N-1$. M denotes the size of the transmitted bits and N denotes the size of the encoded bits. The transmitted bits include uplink control information (UCI), for example, multiple ACK/NACK bits for a plurality of pieces of data (or PDSCHs) received through a plurality of DL CCs. The transmitted bits $a\_0, a\_1, \ldots,$ and $a\_M-1$ are joint-coded regardless of the kind/number/size of UCI configuring the transmitted bits. For example, if the transmitted bits include multiple ACK/NACK bits for a plurality of DL CCs, channel coding is performed not with respect to each DL CC or each ACK/NACK bit, but with respect to all bit information. Thus, a single codeword is generated. Channel coding is not limited thereto and includes simplex repetition, simplex coding, Reed Muller (RM) coding, punctured RM coding, tail-biting convolutional coding (TBCC), low-density parity-check (LDPC) and turbo-coding. Although not shown, the encoded bits may be subjected to rate matching in consideration of a modulation order and the amount of resources. The rate matching function may be partially included in the channel coding block or may be performed using a separate functional block. For example, the channel coding block may perform (32, 0) RM coding with respect to a plurality of pieces of control information so as to obtain a single codeword and perform circular buffer rate matching.

A modulator modulates the encoded bits $b\_0, b\_1, \ldots,$ and $b\_N-1$ and generates modulation symbols $c\_0, c\_1, \ldots,$ and $c\_L-1$. L denotes the size of the modulation symbols. The modulation method is performed by changing the size and phase of the transmitted signal. The modulation method includes, for example, n-phase shift keying (PSK) and n-quadrature amplitude modulation (QAM) (n being an integer equal to or greater than 2). More specifically, the modulation method may include binary PSK (BPSK), quadrature PSK (QPSK), 8-PSK, QAM, 16-QAM, 64-QAM, etc.

A divider divides the modulation symbols $c\_0, c\_1, \ldots,$ and $c\_L-1$ to slots. The order/pattern/method of dividing the modulation symbols to slots is not specially limited. For example, the divider may sequentially divide the modulation symbols to slots from the front side (local type). In this case, as shown, the modulation symbols $c\_0, c\_1, \ldots,$ and $c\_L/2-1$ may be divided to a slot 0 and the modulation symbols $c\_L/2, c\_L/2+1, \ldots,$ and $c\_L-1$ may be divided to a slot 1. The modulation symbols may be interleaved (or permutated) when being divided to the slots. For example, even numbered modulation symbols may be divided to slot 0 and odd numbered modulation symbols may be divided to slot 1. The order of the modulation process and the division process may be changed.

A DFT precoder performs DFT precoding (e.g., 12-point DFT) with respect to the modulation symbols divided into the slots in order to generate a single carrier waveform. Referring to FIG. 29, the modulation symbols c_0, C_1, . . . , and c_L/2−1 divided to the slot are DFT-precoded to DFT symbols d_0, d_1, . . . , and d_L/2−1 and the modulation symbols c_L/2, c_L/2+1, . . . , and c_L−1 divided to slot 1 are DFT-precoded to d_1/2, dL/2+1, . . . , and d_L−1. DFT precoding may be replaced with another linear operation (e.g., Walsh precoding) corresponding thereto.

A spreading block spreads a signal subjected to DFT at an SC-FDMA symbol level (time domain). Time domain spreading at the SC-FDMA symbol level is performed using a spreading code (sequence). The spreading code includes a quasi-orthogonal code and an orthogonal code. The quasi-orthogonal code includes, but is not limited to, a pseudo noise (PN) code. The orthogonal code may include, but is not limited to, a Walsh code and/or a DFT code. Although the orthogonal code is described as a representative example of the spreading code for ease of description in the present specification, the orthogonal code is only exemplary and may be replaced with a quasi-orthogonal code. A maximum value of a spreading code size (or a spreading factor (SF)) is restricted by the number of SC-FDMA symbols used to transmit control information. For example, in the case in which four SC-FDMA symbols are used to transmit control information at one slot, orthogonal codes w0, w1, w2 and w3 having a length of 4 may be used per slot. The SF means the spreading degree of the control information and may be associated with the multiplexing order of a UE or the multiplexing order of an antenna. The SF may be changed to 1, 2, 3, 4, . . . according to system requirements and may be defined between a BS and a UE in advance or may be sent to the UE through DCI or RRC signaling. For example, in the case in which one of SC-FDMA symbols for control information is punctured in order to transmit an SRS, a spreading code with a smaller SF (e.g., SF=3 instead of SF=4) may be applied to the control information of the slot.

The signal generated through the above procedure is mapped to subcarriers within a PRB, is subjected to IFFT, and is transformed into a time domain signal. The time domain signal is attached with CP and the generated SC-FDMA symbols are transmitted through a RF stage.

On the assumption that ACK/NACK for five DL CCs is transmitted, the procedure will be described in detail. In the case in which each DL CC may transmit two PDSCHs, the number of ACK/NACK bits may be 12 if a DTX state is included. In the case of assuming QPSK modulation and SF=4 time spreading, a coding block size (after rate-matching) may be 48 bits. The encoded bits may be modulated into 24 QPSK symbols and 12 symbols of the generated QPSK symbols are divided to each slot. In each slot, 12 QPSK symbols are converted into 12 DFT symbols by a 12-point DFT operation. In each slot, 12 DFT symbols are spread and mapped to four SC-FDMA symbols using the spreading code having SF=4 in a time domain. Since 12 bits are transmitted through [2 bits*12 subcarriers+8 SC-FDMA symbols], the coding rate is 0.0625 (=12/192). In case of SF=4, a maximum of four UEs may be multiplexed per PRB.

Figure 30:
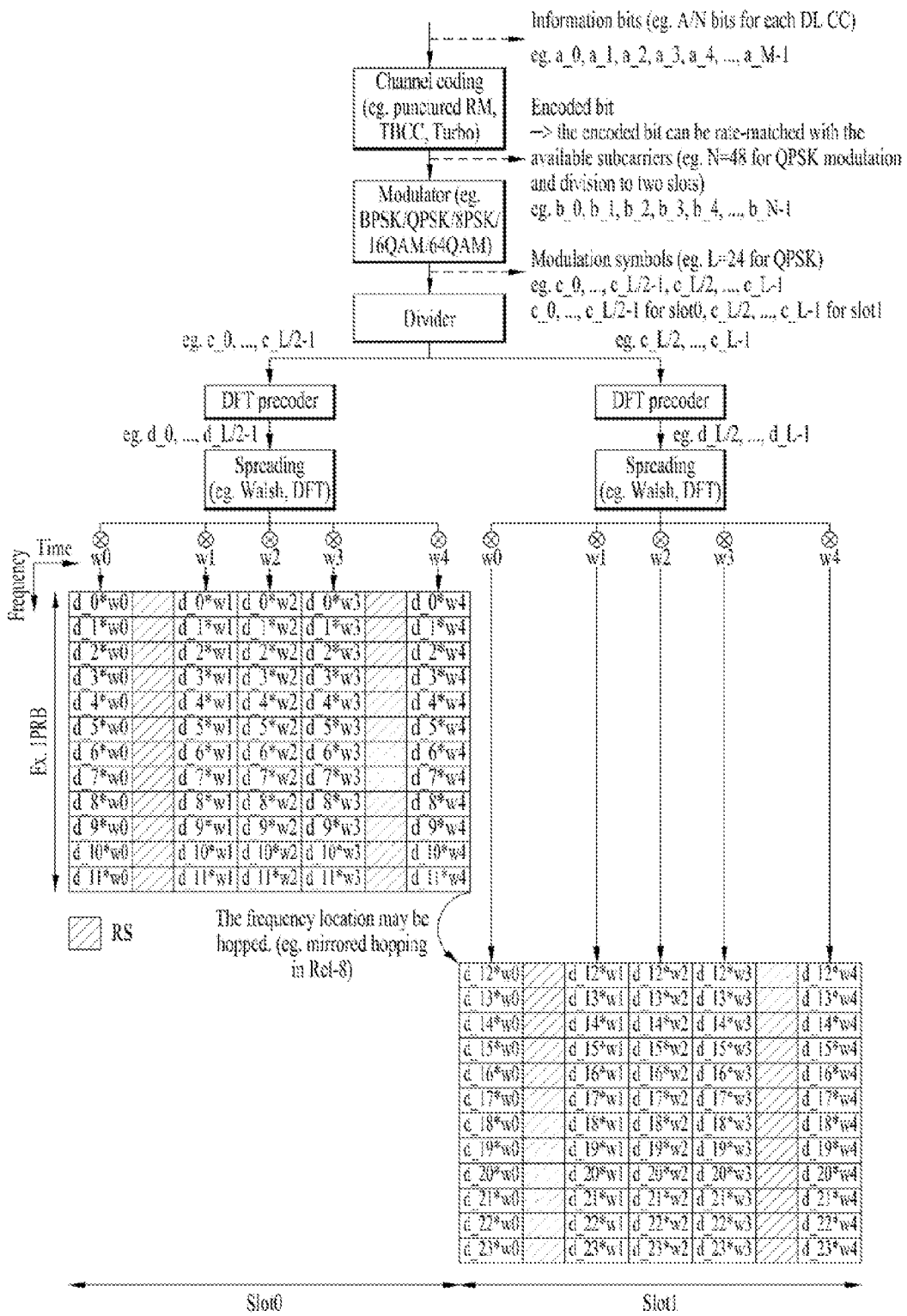

FIG. 30 shows the structure of PUCCH format 3 using orthogonal code (OC) with SF=5.

The basic signal processing procedure is equal to that described with reference to FIG. 29, except that the numbers and locations of UCI SF-FDMA symbols and RS SC-FDMA symbols are different from those of FIG. 29. At this time, a spreading block may be provided at a previous stage of a DFT precoder.

In FIG. 30, an RS may have the structure of an LTE system. For example, cyclic shift is applicable to base sequence. Since a data part has an SF of 5, a multiplexing capacity thereof is 5. A multiplexing capacity of an RS part is determined according to cyclic shift (CS) interval $\Delta_{shift}^{PUCCH}$. That is, the multiplexing capacity of the RS part is $$\frac{12}{\Delta_{shift}^{PUCCH}}.$$

For example, multiplexing capacities are 12, 6 and 4 in the case in which $\Delta_{shift}^{PUCCH}=1$, $\Delta_{shift}^{PUCCH}=2$ or $\Delta_{shift}^{PUCCH}=3$, respectively. In FIG. 30, the multiplexing capacity of the data part is 5 due to SF=5 and the multiplexing capacity of the RS part is 4 in the case in which $\Delta_{shift}^{PUCCH}$ is 3. Thus, the total multiplexing capacity is set to 4 which is the smaller capacity of the two multiplexing capacities.

Figure 31:
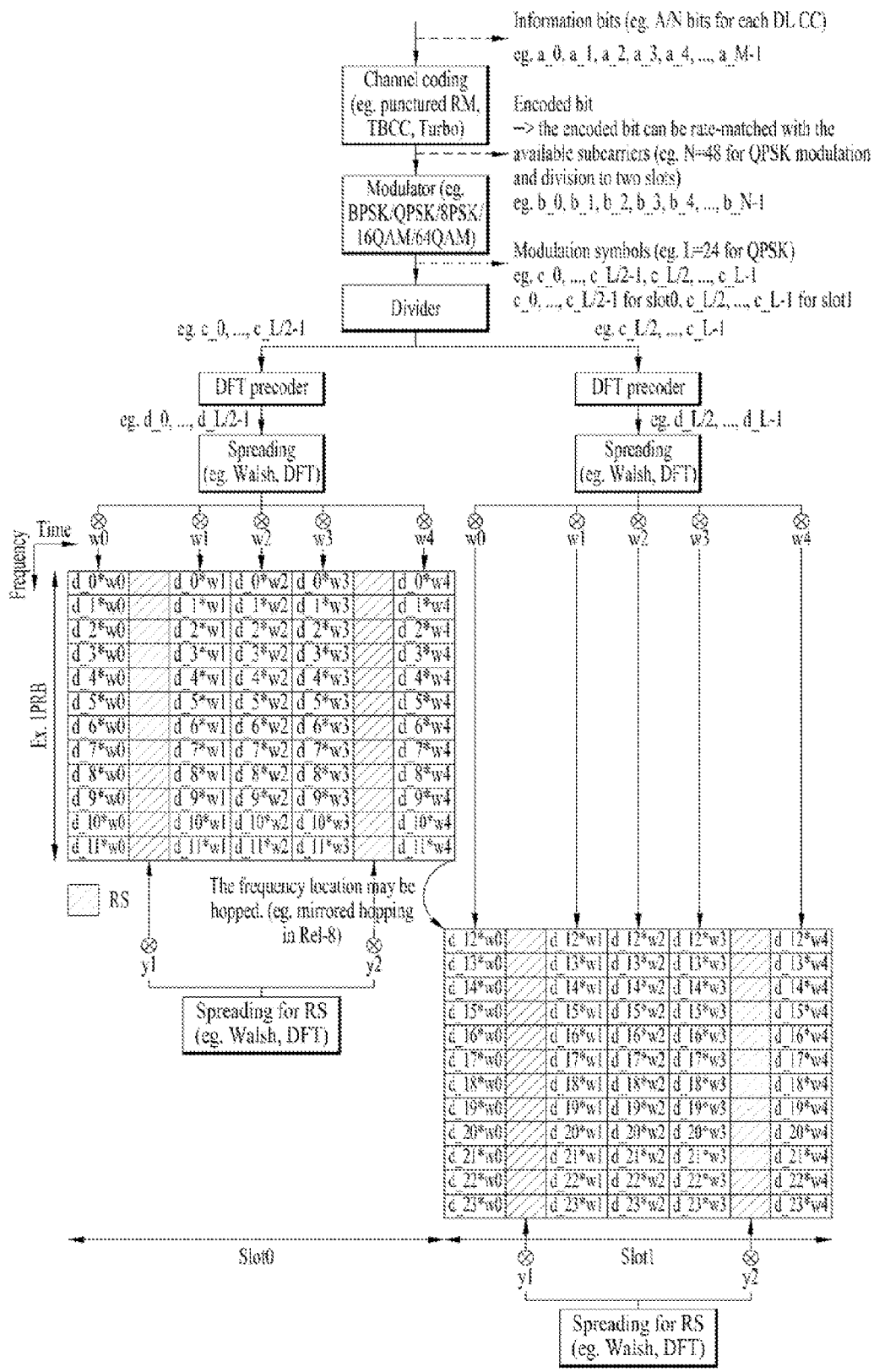

FIG. 31 shows the structure of PUCCH format 3 in which a multiplexing capacity may be increased at a slot level.

Figure 32:
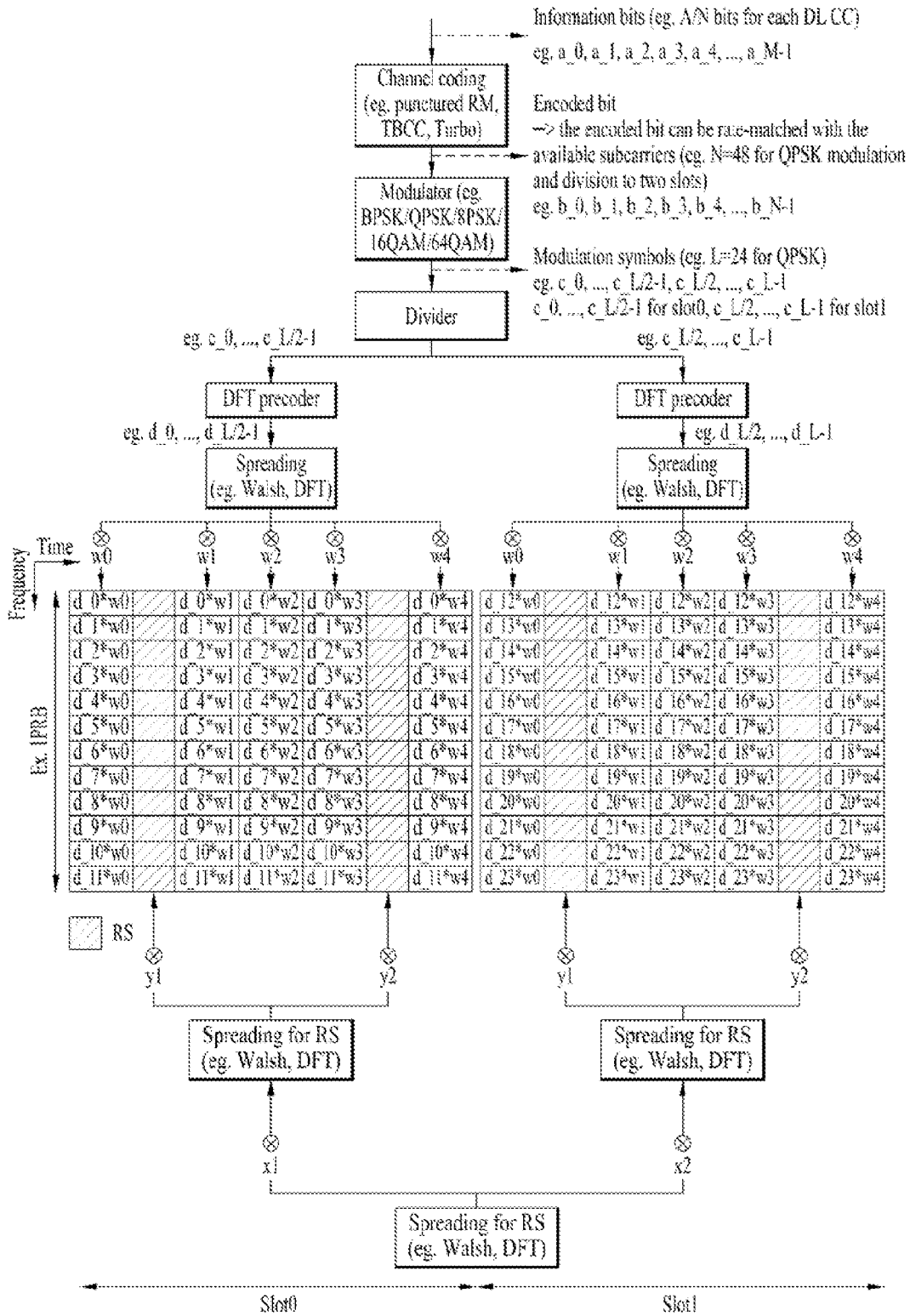

SC-FDMA symbol level spreading described with reference to FIGS. 29 and 30 may be applied to an RS so as to increase a total multiplexing capacity. Referring to FIG. 32, if a Walsh cover (or a DFT code cover) is applied to a slot, the multiplexing capacity doubles. That is, even in the case of $\Delta_{shift}^{PUCCH}$, the multiplexing capacity is 8 and the multiplexing capacity of the data part may not be deteriorated. In FIG. 31, a Walsh cover of [y1 y2]=[1 1], [y1 y2]=[1 −1] or a linearly transformed form thereof may be used as an orthogonal code cover (OCC) for an RS.

FIG. 32 shows the structure of PUCCH format 3 in which a multiplexing capacity may be increased at a subframe level.

If frequency hopping is not applied at a slot level, Walsh cover is applied in slot units and thus the multiplexing capacity may double again. As described above, [x1 x2]=[1 1] or [1 −1] may be used as an orthogonal cover code and a modification thereof may be used.

For reference, the processing procedure of PUCCH format 3 is not limited to the flowcharts shown in FIGS. 29 to 32.

Meanwhile, hereinafter, resource assignment will be described in detail.

FIG. 33 is a diagram illustrating resource assignment indicated to a UE. Control information of resource assignment may be provided to the UE through a PDCCH downlink control information (DCI) format and may indicate assignment of a physical resource block or assignment of a virtual resource block according to a resource assignment type. FIG. 33 shows a method of continuously assigning frequency resources to uplink or downlink transmission scheduled to the UE.

Table 11 shows a method of signaling a compact scheme of informing the UE of a start point S of an RB which is a basic resource assignment unit and the number (=length L) of assigned RBs when the UE is informed of continuous frequency resource assignment as shown in FIG. 33. An information field for resource block assignment may include a resource indication valve (RIV) of Table 11. The start point of the RB and the number (length) of continuously assigned RBs may be derived from the RIV. In Table 11, $\lfloor X \rfloor$ is a floor(x) operation and indicates a maximum integer which is not greater than x.

TABLE 11 if L−1 ≤ ⌊N$_{RB}$/2⌋ then
    RIV = N$_{RB}$(L − 1) + S
else
    RIV = N$_{RB}$(N$_{RB}$ − L + 1) + (N$_{RB}$ − 1 − S)
End
Required bits
    N$_{bit\_required}$ = ⌈log$_2$(RIV$_{max}$ + 1)⌉
    Without limitation
        RIV$_{max}$ = N$_{RB}$ · (N$_{RB}$ + 1)/2 − 1
    With limitation L$^{Limit}$
        RIV$_{max}$ = min{N$_{RB}$ · (N$_{RB}$ + 1)/2 − 1, N$_{RB}$(L$^{Limit}$ − 1) + N$_{RB}$ − L$^{Limit}$}

As shown in FIG. 33, total frequency resources used for scheduling of uplink or downlink transmission may be composed of N$_{RB}$ (0, . . . , N−$_{RB}$1) resource blocks (RBs). It is possible to inform the UE of frequency resources assigned to the UE through the start point (RBstart) S of the RB and the length (RBlength) L of the RB. The number of resource assignment compositions (or the number of hypotheses) is N$_{RB}$(N$_{RB}$+1)/2 and the number of assigned RB expressions (or the number of hypotheses) is ceiling (log$_2$(N$_{RB}$+N$_{RB}$+1)/2). Here, ceiling(x) denotes a minimum integer which is not less than x. As shown in FIG. 33, if S is 0, the possible number (length) of RBs is N$_{RB}$ and, if S is 1, the possible number (length) of RBs is N$_{RB}$−1. If S is N$_{RB}$−1, the possible number (length) of RBs is 1. That is, the start point S of the RB may have a value of 0≤S≤N$_{RB}$−1 and the number (length; L) of assigned RBs may be expressed by N$_{RB}$−S. Alternatively, the length (L) of assigned RBs may have a value of 1≤L≤N$_{RB}$ and the start point S of the RB may be expressed by N$_{RB}$−L.

If a bit field of scheduling control information is configured according to binary numbers of the respective maximum values of the S and L values without considering a combination of the S and L values, since 20<2$^5$ when N$_{RB}$=20, 5 bits are required for each of the S and L values, that is, a total of 10 bits is required. However, the configuration of the bit field includes combinations which do not actually occur and thus unnecessarily increases the number of transmitted bits. Accordingly, only combinations of the S and L values, which may be achieved for reducing the number of transmitted bits, may be represented by the RIV and the RIV may be represented by a binary number and transmitted. For example, in the case of N$_{RB}$=20, the possible combinations of the S and L values may be shown in Table 12. In Table 12, 1≤L≤20 when S=0, 1≤L≤19 when S=1, 1≤L≤18 when S=2, 1≤L≤2 when S=18 and L=1 when S=19. That is, in Table 12, a hatched part corresponds to a combination of the S and L values which does not occur.

If the RIV value is configured in such a manner, the RIV of the hatched part of Table 12 in the case of L−1≤⌊N$_{RB}$/2⌋ may be mapped to the RIV in the case of L−1≤⌊N$_{RB}$/2⌋, thereby preventing the RIV from being wasted. For example, in the case of N$_{RB}$=20, the RIVs of the part of L≤⌊N$_{RB}$/2⌋+1=⌊20/2⌋+1=11 in the hatched region of Table 12 may be reused for the part of L≤⌊N$_{RB}$/2⌋+1=⌊20/2⌋+=11 in the remaining region. At this time, a maximum value of the RIV representing the possible combination of the S and L values becomes 209.

If the RIV value is configured in such a manner, the number of transmitted bits depends on the maximum value of the RIV and the RIV equal to or less than the maximum value of the RIV may be configured not to be mapped to a value which cannot become the actual combination of the S and L values. That is, all values equal to or less than the maximum value of the RIV may correspond to combinations of the S and L values which may occur. Thus, since the possible combinations of the S and L values are represented by 209 (=N$_{RB}$(N$_{RB}$+1)/2−1, N$_{RB}$=20) states, the RIV may be represented by only 8 bits.

TABLE 12

| | S | | | | | | | | | | | | | | | | | | | |
|---|---|---|---|---|---|---|---|---|---|---|---|---|---|---|---|---|---|---|---|---|
| L | 0 | 1 | 2 | 3 | 4 | 5 | 6 | 7 | 8 | 9 | 10 | 11 | 12 | 13 | 14 | 15 | 16 | 17 | 18 | 19 |
| 1 | 0 | 1 | 2 | 3 | 4 | 5 | 6 | 7 | 8 | 9 | 10 | 11 | 12 | 13 | 14 | 15 | 16 | 17 | 18 | 19 |
| 2 | 20 | 21 | 22 | 23 | 24 | 25 | 26 | 27 | 28 | 29 | 30 | 31 | 32 | 33 | 34 | 35 | 36 | 37 | 38 | 39 |
| 3 | 40 | 41 | 42 | 43 | 44 | 45 | 46 | 47 | 48 | 49 | 50 | 51 | 52 | 53 | 54 | 55 | 56 | 57 | 58 | 59 |
| 4 | 60 | 61 | 62 | 63 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 | 96 | 97 | 98 | 99 |
| 6 | 100 | 101 | 102 | 103 | 104 | 105 | 106 | 107 | 108 | 109 | 110 | 111 | 112 | 113 | 114 | 115 | 116 | 117 | 118 | 119 |
| 7 | 120 | 121 | 122 | 123 | 124 | 125 | 126 | 127 | 128 | 129 | 130 | 131 | 132 | 133 | 134 | 135 | 136 | 137 | 138 | 139 |
| 8 | 140 | 141 | 142 | 143 | 144 | 145 | 146 | 147 | 148 | 149 | 150 | 151 | 152 | 153 | 154 | 155 | 156 | 157 | 158 | 159 |
| 9 | 160 | 161 | 162 | 163 | 164 | 165 | 166 | 167 | 168 | 169 | 170 | 171 | 172 | 173 | 174 | 175 | 176 | 177 | 178 | 179 |
| 10 | 180 | 181 | 182 | 183 | 184 | 185 | 186 | 187 | 188 | 189 | 190 | 191 | 192 | 193 | 194 | 195 | 196 | 197 | 198 | 199 |
| 11 | 200 | 201 | 202 | 203 | 204 | 205 | 206 | 207 | 208 | 209 | 210 | 211 | 212 | 213 | 214 | 215 | 216 | 217 | 218 | 219 |
| 12 | 199 | 198 | 197 | 196 | 195 | 194 | 193 | 192 | 191 | 190 | 189 | 188 | 187 | 186 | 185 | 184 | 183 | 182 | 181 | 180 |
| 13 | 179 | 178 | 177 | 176 | 175 | 174 | 173 | 172 | 171 | 170 | 169 | 168 | 167 | 166 | 165 | 164 | 163 | 162 | 161 | 160 |
| 14 | 159 | 158 | 157 | 156 | 155 | 154 | 153 | 152 | 151 | 150 | 149 | 148 | 147 | 146 | 145 | 144 | 143 | 142 | 141 | 140 |
| 15 | 139 | 138 | 137 | 136 | 135 | 134 | 133 | 132 | 131 | 130 | 129 | 128 | 127 | 126 | 125 | 124 | 123 | 122 | 121 | 120 |
| 16 | 119 | 118 | 117 | 116 | 115 | 114 | 113 | 112 | 111 | 110 | 109 | 108 | 107 | 106 | 105 | 104 | 103 | 102 | 101 | 100 |
| 17 | 99 | 98 | 97 | 96 | 95 | 94 | 93 | 92 | 91 | 90 | 89 | 88 | 87 | 86 | 85 | 84 | 83 | 82 | 81 | 80 |
| 18 | 79 | 78 | 77 | 76 | 75 | 74 | 73 | 72 | 71 | 70 | 69 | 68 | 67 | 66 | 65 | 64 | 63 | 62 | 61 | 60 |
| 19 | 59 | 58 | 57 | 56 | 55 | 54 | 53 | 52 | 51 | 50 | 49 | 48 | 47 | 46 | 45 | 44 | 43 | 42 | 41 | 40 |
| 20 | 39 | 38 | 37 | 36 | 35 | 34 | 33 | 32 | 31 | 30 | 29 | 28 | 27 | 26 | 25 | 24 | 23 | 22 | 21 | 20 |

Meanwhile, as shown in the bottom of Table 11, if the maximum value (=L$^{limit}$) of the number of assigned RBs is restricted in the RIV configuration method, that is, if the L value is restricted to be equal to or less than L$^{limit}$, the number of bits necessary to represent the combinations of the S and L values may be reduced. For example, if L$_{limit}$=6 is set in Table 12, the range of the L value is 1≤L≤6 and the range of the L value of 7≤L≤20 is not used. Thus, it can be seen that the maximum value of the RIV is 114. That is, since the range of the generable RIV is 0≤RIV≤114<2$^7$, N$_{bit\_required\_lim}$7 bits.

In addition, semi-persistent scheduling (SPS) will be described in detail.

SPS means a scheduling scheme for setting parameters (a subframe period and an offset) associated with a subframe, in which SPS transmission/reception may be performed in uplink or downlink, through radio resource control (RRC)

signaling with respect to a UE and informing the UE of actual SPS activation and release through a PDCCH. In other words, even when the UE receives information about a subframe, in which SPS transmission/reception will be performed, through RRC signaling, SPS transmission/reception is not immediately performed but SPS transmission/reception is performed after a PDCCH (that is, a PDCCH in which SPS C-RNTI is detected) indicating SPS activation/release is received. In addition, the UE may start to perform SPS transmission/reception according to the subframe period and offset received through RRC signaling by assigning frequency resources to be used for SPS transmission/reception according to resource block assignment information and a modulation and coding scheme (MCS) specified through the PDCCH indicating SPS activation and applying a modulation scheme and a coding rate. In addition, the UE may stop SPS transmission/reception by receiving the PDCCH indicating SPS release. In addition, if the UE receives a PDCCH indicating activation (or reactivation) with respect to the stopped SPS transmission/reception, SPS transmission/reception may be resumed with the subframe period and offset received through RRC signaling according to RB assignment and MCS specified in the PDCCH.

Currently, in a 3GPP LTE system, as a PDCCH DCI format, various formats such as DCI format 0 for uplink resource assignment, DCI formats 1, 1A, 1B, 1C, 1D, 2 and 2A for downlink resource assignment, and DCI formats 3 and 3a for controlling the transmit power of the UE are defined. Such PDCCH DCI formats may include a combination selected from control information such as hopping flag, RB allocation, MCS, redundancy version (RV), new data indicator (NDI), transmit power control (TPC), cyclic shift for demodulation reference signal (DMRS), UL index (for TDD), DL assignment index (DAI) for TDD, channel quality information (CQI) request, DL HARQ process number, transmitted precoding matrix indicator (TPMI), PMI confirmation.

The PDCCH for SPS scheduling may be validated by masking, for example, CRC of the DCI transmitted via the PDCCH with SPS C-RNTI and setting NDI to 0. That is, in the case of SPS activation, by setting a combination of specific bit fields to 0, it is possible to validate SPS activation control information. Table 13 shows specific fields which may be used to validate the PDCCH indicating SPS activation according to DCI format.

TABLE 13

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

A method of determining whether a combination of specific bit fields has a predetermined value so as to determine whether errors occur is represented by a method of using the combination of specific bit fields as virtual CRC. In other words, by using virtual CRC, even when errors which cannot be confirmed by CRC occur, it is possible to detect additional errors by determining whether the bit field value has the predetermined value.

Error detection using a virtual CRC is particularly important in SPS activation/release. For example, if error occurs in PDCCH detection of a certain UE and the certain UE erroneously recognizes DCI, which was assigned to another UE, as a PDCCH indicating SPS activation thereof, the certain UE continuously uses SPS transmission resources and thus causes a continuous problem due to the error. Accordingly, it is possible to prevent erroneous SPS detection using a virtual CRC.

In the case of SRS release, in order to confirm collection of resources assigned to the UE, the UE may transmit ACK/NACK for reception of the PDCCH indicating SPS release. In the case of SRS release, as shown in FIG. 14, the value of the specific bit field may be set according to DCI format and is used as virtual CRC.

TABLE 14

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Next, a downlink assignment index of a TDD system will be described in detail.

PDCCH DCI formats 0, 1, 1A, 1B, 1D, 2 and 2A may include a downlink assignment index (DAI) field. The DAI field includes information about the accumulated number of PDSCHs transmitted by the BS and/or PDCCHs without PDSCHs corresponding thereto within one or more downlink subframes for ACK/NACK transmission in one uplink subframe in a TDD system, and the UE may derive information about the number of PDSCHs transmitted by the BS and/or PDCCHs without PDSCHs corresponding thereto in transmission of uplink ACK/NACK in one uplink subframe for the PDSCHs within one or more downlink subframe and/or PDCCHs without PDSCHs corresponding thereto using the information. The UE may determine whether a transmission which is not detected is present in the PDSCHs transmitted by the BS and/or PDCCHs without PDSCHs corresponding thereto within one or more downlink subframes for ACK/NACK transmission in one uplink subframe. Hereinafter, the DAI field will be described in greater detail.

An FDD scheme refers to a scheme for dividing downlink and uplink according to independent frequency bands to perform transmission and reception. Accordingly, if a BS sends a PDSCH or a PDCCH without a PDSCH corresponding thereto using a DL band, a UE may transmit an ACK/NACK response indicating whether DL data has been received through a PUCCH of a UL band corresponding to the DL band after a specific time. Accordingly, operation is performed in a state in which DL and UL are in one-to-one correspondence.

More specifically, in the example of the conventional 3GPP LTE system, control information of downlink data transmission of a BS is sent to a UE through a PDCCH and the UE which receives data, through the PDCCH, scheduled thereto through a PDSCH may transmit ACK/NACK through a PUCCH which is a channel for transmitting uplink control information (or using a piggyback method on a PUSCH). In contrast, the PDCCH may be used for a special purpose without a PDSCH for data scheduled through the PDCCH. For example, a PDCCH indicating downlink SPS release does not have a PDSCH corresponding thereto. In a 3GPP LTE system, a UE which receives a PDCCH not having a PDSCH corresponding thereto may transmit ACK/NACK through a PUCCH which is a channel for transmitting uplink control information (or a piggyback method on a PUSCH). In addition, in TDD, ACKs/NACKs for PDSCHs which extend over one or more downlink subframes and PDCCHs without PDSCHs corresponding thereto may be collected, processed and transmitted via a PUCCH of one uplink subframe. For clarity of description, in the following description, if the PDCCH does not cause confusion with another PDCCH, the PDCCH means a PDCCH for scheduling a PDSCH. That is, if another meaning is not described, the PDCCH for scheduling the PDSCH is expressed as a PDCCH. In addition, a description of the PDCCH without the PDSCH corresponding to an ACK/NACK response through a PUCCH will be omitted for convenience. In general, a PUCCH for ACK/NACK transmission is not assigned to UEs in advance and a plurality of UEs within a cell may divide and use a plurality of PUCCHs at each point of time. Accordingly, a UE which receives downlink data at an arbitrary point of time may use a PUCCH corresponding to a PDCCH, via which the UE receives scheduling information of downlink data, as a PUCCH for transmitting ACK/NACK.

A PUCCH corresponding to a PDCCH will be described in greater detail. A region in which a PDCCH of each downlink subframe is transmitted is composed of a plurality of control channel elements (CCEs) and a PDCCH transmitted to one UE in an arbitrary subframe is composed of one or a plurality of CCEs configuring a PDCCH region of the subframe. In addition, resources used to transmit a plurality of PUCCHs are present in a region in which a PUCCH of each uplink subframe is transmitted. At this time, the UE may transmit ACK/NACK through PUCCH resources corresponding to an index of a specific (that is, first) CCE among CCEs configuring the PDCCH received by the UE.

Figure 34:
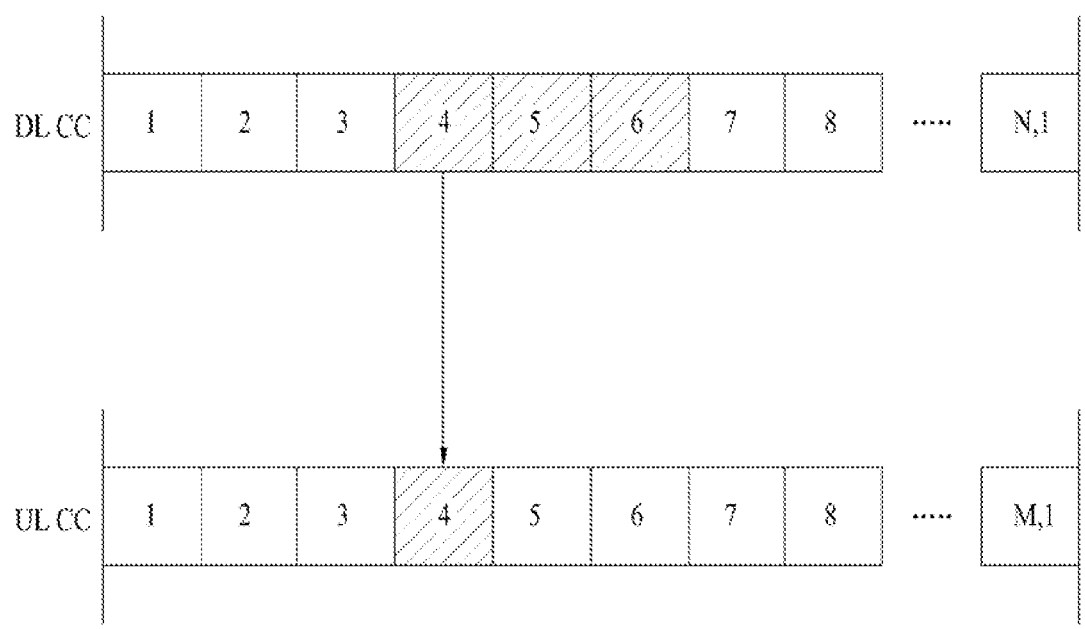
FIG. 34 is a diagram showing ACK/NACK transmission resources according to an embodiment of the present invention.

FIG. 34 is a diagram showing resources used to transmit ACK/NACK for a PDSCH. In FIG. 34, each rectangle of a DL CC denotes a CCE and each rectangle of a UL CC denotes PUCCH resource. As shown in FIG. 34, for example, assume that one UE obtains information about a PDSCH through a PDCCH composed of fourth, fifth and sixth CCEs and receives a PDSCH. In this case, the UE may transmit ACK/NACK information for the PDSCH through a PUCCH corresponding to the fourth CCE which is a first CCE configuring the PDCCH for scheduling the PDSCH, that is, the fourth PUCCH resource.

Unlike the FDD scheme, in a system according to a TDD scheme, the same frequency band is assigned to DL subframes and UL subframes on a time axis. In an asymmetrical data traffic state of DL/UL, DL subframes greater in number than the number of UL subframes are assigned or UL subframes greater in number than the number of DL subframes are assigned. In this case, unlike the FDD scheme, the DL subframes and the UL subframes are not in one-to-one correspondence. In particular, if the number of DL subframes is greater than the number of UL subframes, an ACK/NACK response to a plurality of PDSCHs transmitted on a plurality of DL subframes needs to be processed at one UL subframe.

When a plurality of PDSCHs is transmitted to one UE on a plurality of DL subframes, a BS transmits a plurality of PDCCHs one by one with respect to each PDSCH. At this time, the UE may transmit ACK/NACK through one PUCCH on one UL subframe with respect to the plurality of PDSCHs. A method of transmitting one ACK/NACK with respect to a plurality of PDSCHs may be roughly divided into an ACK/NACK bundling method and a PUCCH selective transmission method.

In the ACK/NACK bundling method, if all of the plurality of PDSCHs received by the UE are successfully decoded, the number of pieces of ACK information is transmitted through one PUCCH. In the other case (that is, if decoding of at least one of the plurality of PDCCHs fails), NACK is transmitted. Hereinafter, in order to prevent confusion, the ACK/NACK bundling method is referred to as a bundling method. The bundling method may be used such that the number of ACKs is transmitted if at least one of a plurality of PDSCHs is successfully decoded and, otherwise (that is, decoding of all a plurality of PDSCHs fails), NACK is transmitted. Alternatively, the bundling method may be used such that the number of continuous ACKs from a first PDSCH is transmitted through one PUCCH if at least one of a plurality of PDSCHs received by the UE is successfully decoded and, otherwise (that is, decoding of a first PDSCH of a plurality of PDSCHs fails), NACK is transmitted.

In the PUCCH selective (or channel selective) transmission method, a UE which receives a plurality of PDSCHs may occupy a plurality of PUCCHs which may be used for ACK/NACK transmission using an arbitrary method, and transmit a plurality of ACKs/NACKs using a combination of information indicating which of the plurality of occupied PUCCHs is used for ACK/NACK transmission (that is, an information bit is used to indicate which channel is selected) and modulated/encoded information of the selected and transmitted PUCCH. For example, if one of two PUCCHs is selected and ACK/NACK information having a bit size of a is transmitted on the selected PUCCH, since information about of a bit size of 1 may be expressed by selecting one of two PUCCHs, ACK/NACK information having a bit size of a+1 may be transmitted.

In transmission of an ACK/NACK signal from a UE to a BS using the above-described methods, assume that the UE does not receive (that is, miss) some of the PDCCHs sent by the BS during several subframes. In this case, since the UE does not know that the PDSCH corresponding to the missing PDCCH is transmitted to the UE, an error may occur in ACK/NACK generation.

In order to solve such an error, in a TDD system, a method of including a downlink assignment index (DAI) in a PDCCH and informing a UE of the number of PDSCHs to be transmitted through ACK/NACK resources of one UL subframe is defined. For example, one UL subframe corresponds to N DL subframes, indices are sequentially assigned (that is, sequentially counted) to PDSCHs transmitted on N DL subframes to carry PDCCHs for scheduling the PDSCHs. Then, the UE may be aware that the previous PDCCHs have been received using the DAI included in the PDCCH.

In a TDD system, DAI information may be used as a pure counter. That is, an assignment order of downlink control channels for a specific UE may be represented by 2 bits. Each UE receives an assignment order of a downlink control channel on a plurality of subframes and confirm a DAI value in the assignment order of the downlink control channel. If previously received DAI values are not continuous, the UE may be aware of missing assignment. Missing assignment means that the UE cannot detect or demodulate a PDCCH assigned thereto.

At this time, the DAI value may be expressed by Equation 3 below.

$$I = \mod(P, N) \quad \text{[Equation 3]}$$

where, I denotes each DAI value, P denotes an assignment order of downlink assignment index information, N denotes $2^n$, and n denotes the number of bits indicating the DAI information.

For example, if the number n of bits indicating the DAI information is 2 and the assignment order P is 0, 1, 2, 3, 4, 5, 6, 7, 8, 9 and 10, N has a value of 4 and each DAI value is 0, 1, 2, 3, 0, 1, 2, 3, 0, 1 and 2.

Figure 35:
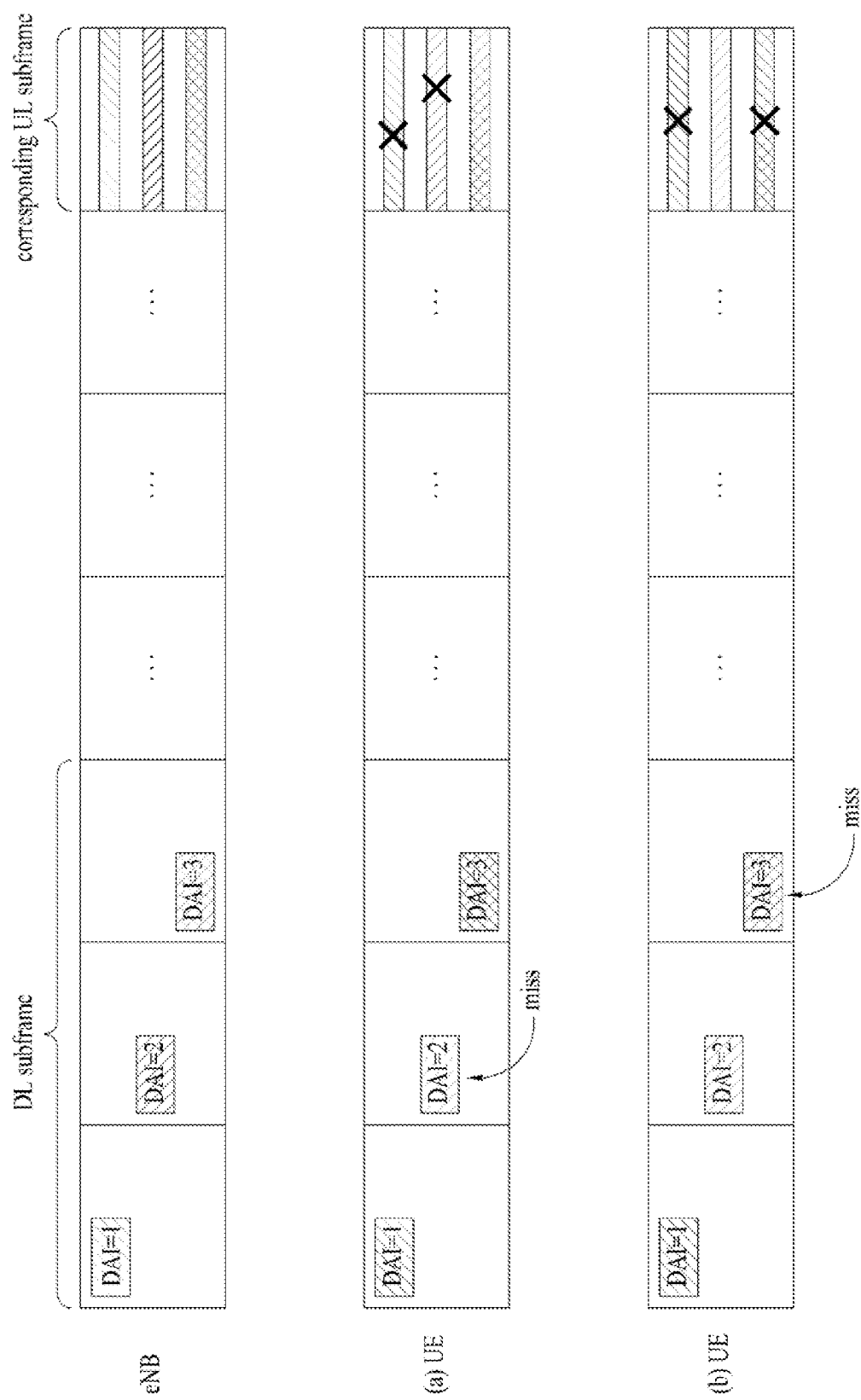
FIG. 35 is a diagram showing ACK/NACK transmission if a UE does not receive one of a plurality of PDCCHs in a TDD system according to an embodiment of the present invention.

Referring to FIG. 35, an ACK/NACK signal transmitted when a UE does not receive one of a plurality of PDCCHs in a TDD system will be described. In FIG. 35, one UL subframe corresponds to three DL subframes.

FIG. 35(b) shows the case in which a UE has missed a second PDCCH. That is, the UE receives a PDCCH having DAI=1 and then receives a PDCCH having DAI=3. At this time, since the DAI (=3) of a third PDCCH which is a last PDCCH and the number (that is, two) of PDCCHs received up to that time is different, the UE recognizes that the second PDCCH has been missed and thus transmits ACK/NACK.

FIG. 35(c) shows the case in which the UE has missed a third PDCCH. That is, the UE receives a PDCCH having DAI=1 and a PDCCH having DAI=2 but does not receive a PDCCH having DAI=3. At this time, since the DAI index of the last received PDCCH and the number of PDCCHs received up to that time are identical, the UE may not recognize that the last PDCCH has been missed. Accordingly, the UE may recognize that only two PDCCH are scheduled during a DL subframe. At this time, since ACK/NACK information is transmitted as PUCCH resources corresponding to DAI=2 instead of PUCCH resources corresponding to DAI=3, a BS may discern that a PDCCH having DAI=3 has been missed.

Hereinafter, various methods of, at a UE, transmitting an ACK/NACK signal with respect to a plurality of PDCCHs scheduled in a multi-carrier system will be described in detail.

When a plurality of PDCCHs for scheduling transmission of a plurality of PDSCHs is transmitted in a multi-carrier system, if the UE has not received (that is, missed) at least one of the plurality of PDCCHs, ACK/NACK generation errors may occur. In order to solve this problem, a method of informing the UE of the total number of PDCCHs for scheduling PDSCHs or order information of PDCCHs may be considered. In order to inform the UE of such information, a DAI field defined in a PDCCH DCI format may be used. Conventionally, DAI information is defined in a TDD system. However, in the present invention, in both TDD and FDD systems, DAI information for PDSCH scheduling may be configured in a multi-carrier system. In the following description, a PDCCH for scheduling a PDSCH is referred to as a PDCCH if it does not have another meaning. An ACK/NACK response is actually a response to a PDCCH and is used interchangeably with a PDCCH for scheduling a PDSCH for convenience. A PDCCH requiring an ACK/NACK response without a PDSCH corresponding thereto and a PDCCH for scheduling a PDSCH are indiscriminately described for convenience.

Figure 36:
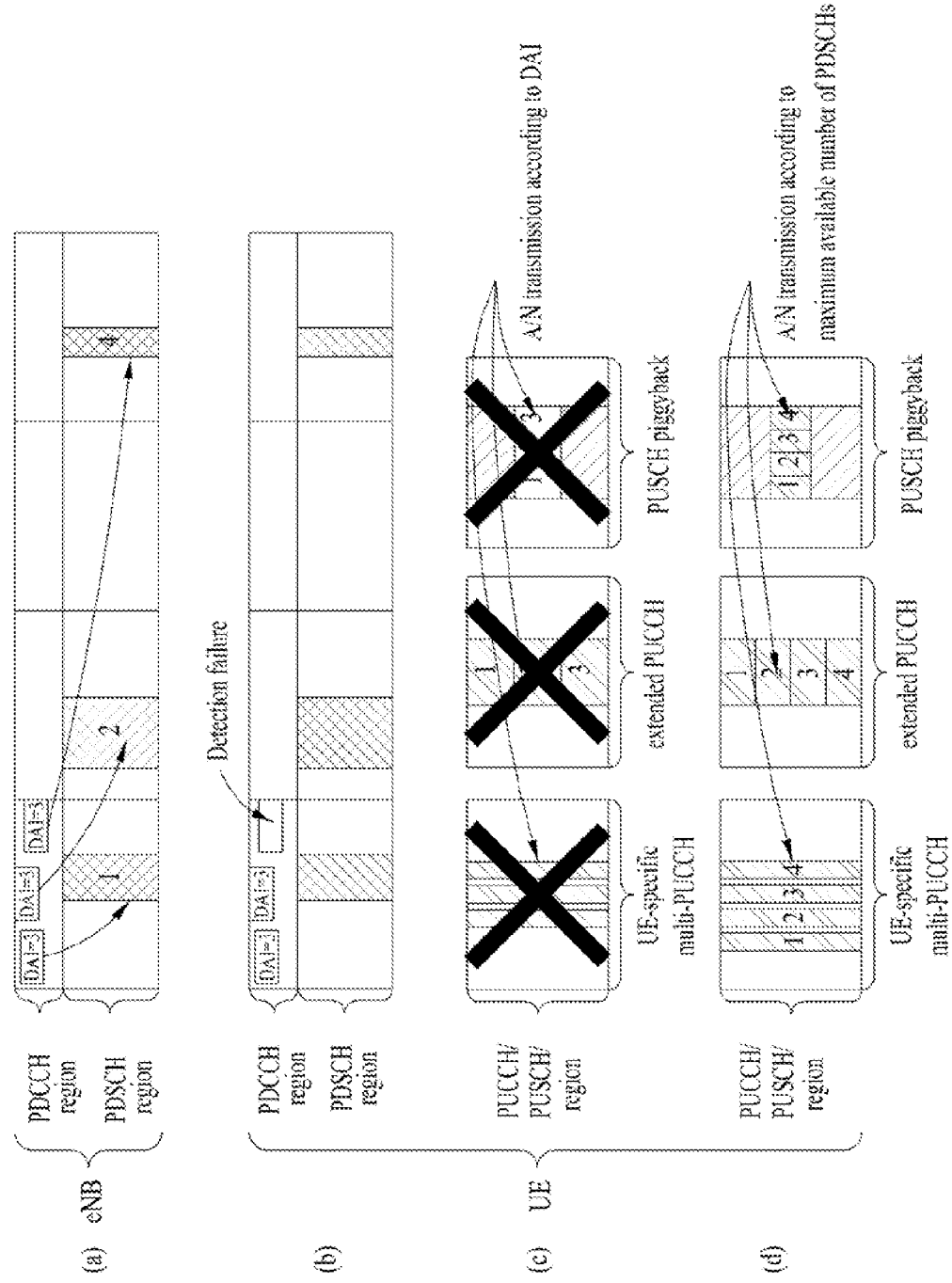
FIG. 36 is a diagram illustrating a method of indicating a total number of PDCCHs according to an embodiment of the present invention.

In addition, a method of including information indicating the number of PDSCHs transmitted to a UE with respect to PDCCHs (that is, the total number of PDSCHs transmitted to the UE) will be described with reference to FIG. 36.

As described above, a PDCCH means a PDCCH for scheduling a PDSCH and one PDCCH schedules one PDSCH transmission. Thus, the number of PDCCHs is equal to the total number of PDSCHs scheduled to the UE. If transmission of a PDCCH without a PDSCH corresponding thereto is included, the number of PDCCHs may be greater than the total number of PDSCHs scheduled to the UE by a predetermined number. For convenience of description, transmission of a PDCCH without a PDSCH corresponding thereto will be omitted. As shown in FIG. 36(a), in PDCCHs and PDSCHs transmitted by a BS (eNB), three PDCCHs may schedule transmission of a total of three PDSCHs, respectively. In addition, when the eNB transmits a plurality of PDCCHs to an arbitrary UE on one subframe (that is, including cross-carrier scheduling), the UE may be informed of information indicating the number of PDCCHs received on the subframe. Alternatively, in TDD, the eNB transmits a plurality of PDCCHs to an arbitrary UE on one or more downlink subframes corresponding to one uplink subframe for an ACK/NACK response, the UE may be informed of information indicating the number of PDCCHs received for an ACK/NACK response on the uplink subframe via each PDCCH. The UE may be informed of the number of PDCCHs through a DAI field of a PDCCH DCI format. FIG. 36(b) shows the case in which the UE fails to detect one of a plurality of PDCCHs. FIGS. 36(c) and 11(d) show various methods of setting a plurality of ACK/NACK resources. FIGS. 36(c) and 36(d) show an example in which a plurality of PUCCHs is set in a UE-specific manner and ACK/NACK information for a plurality of PDSCHs is transmitted via one PUCCH resource, an example in which ACK/NACK information for a plurality of PDSCHs is transmitted through one PUCCH resources on an extended PUCCH, and an example in which ACK/NACK information for a plurality of PDSCHs is transmitted on a PUSCH.

For example, if an eNB transmits three PDCCHs to one UE on one or more DL subframes corresponding to one uplink subframe for an ACK/NACK response, information indicating that three PDCCHs are transmitted may be transmitted to the UE in a state of being included in the three PDCCHs. FIGS. 36(a) and 36(b) show the case that a DAI field included in each PDCCH has a value of 3 (the number of PDCCHs or the number of PDSCHs). In this method, if the UE has missed at least one of the plurality of PDCCHs transmitted thereto, the UE can confirm the fact that the UE has missed the PDCCH through the information about the number of PDCCHs included in other PDCCHs received by the UE.

In this method, if the UE detects only two PDCCHs among three PDCCHs (FIG. 36(b)), the UE may confirm that the eNB has transmitted three PDCCHs but the UE has received only two PDCCHs through the information about the number of PDCCHs. However, the UE may not confirm which of the PDCCHs has been missed. For example, if ACK/NACK for PUCCHs corresponding to CCE indices of PDCCHs is transmitted, since ACK/NACK for a PUCCH corresponding to the CCE index of the missing PDCCH is not transmitted, the eNB may recognize which of the PDCCHs has been missed by the UE. However, if PUCCH resources for ACK/NACK transmission are assigned to the UE in advance independently of PDCCHs and the assigned PUCCH resources are arranged in order of the received PDCCHs, the UE is not aware of the order of the missing PDCCH and thus PUCCH resource assignment is not accurately performed when PDCCH reception errors occur. Similarly, even when ACK/NACK information is transmitted on PUSCH resources using a piggyback method, since the UE is not aware of the order of the missing PDCCH, ACK/NACK resource mapping may not be performed.

More specifically, as shown in FIG. 36(b), if the UE has detected only two of the three PDCCHs and has failed to detect one PDCCH, the UE is aware that a total of three PDCCH has been transmitted (that is, a total of PDSCHs has been scheduled) but is not aware which of the PDCCHs has been missed. In this case, as shown in FIG. 36(c), if three ACK/NACK transmission resources are assigned in advance, a determination as to which ACK/NACK transmission resource corresponds to which PDSCH transmission may not be made. That is, the UE may not determine to which of three ACK/NACK transmission resources ACK/NACK information for PDSCHs scheduled by the two received PDCCHs correspond. Similarly, the eNB may not determine to which of the PDSCHs the ACK/NACK information mapped to any two of the three ACK/NACK transmission resources corresponds.

Accordingly, in preparation for PDCCH detection failure, if the UE may obtain ACK/NACK resources corresponding in number to the number of PDSCHs which may be maximally scheduled by the eNB at a specific time and the ACK/NACK resources are mapped according to the order of CCs at which PDSCHs are located (or the order of subframes or the two-dimensional order of CCs and subframes), the above-described problems may be solved. For example, as shown in FIG. 36(d), the UE which has received two of the three PDCCHs can confirm that the total number of scheduled PDSCHs is 3.

The UE may confirm that transmission of PDSCHs on first and second CCs have been scheduled by the two received PDCCHs (although a determination as to which PDCCH has been missed is not made). For example, the UE may map ACK/NACK information for each PDSCH to a first ACK/NACK transmission resource with respect to a PDSCH on a first CC and map ACK/NACK information for each PDSCH to a second ACK/NACK transmission resource with respect to a PDSCH on a second CC. Similarly, the eNB may confirm a CC on which the PDSCH, to which the ACK/NACK transmitted by the UE corresponds, is transmitted.

Figure 37:
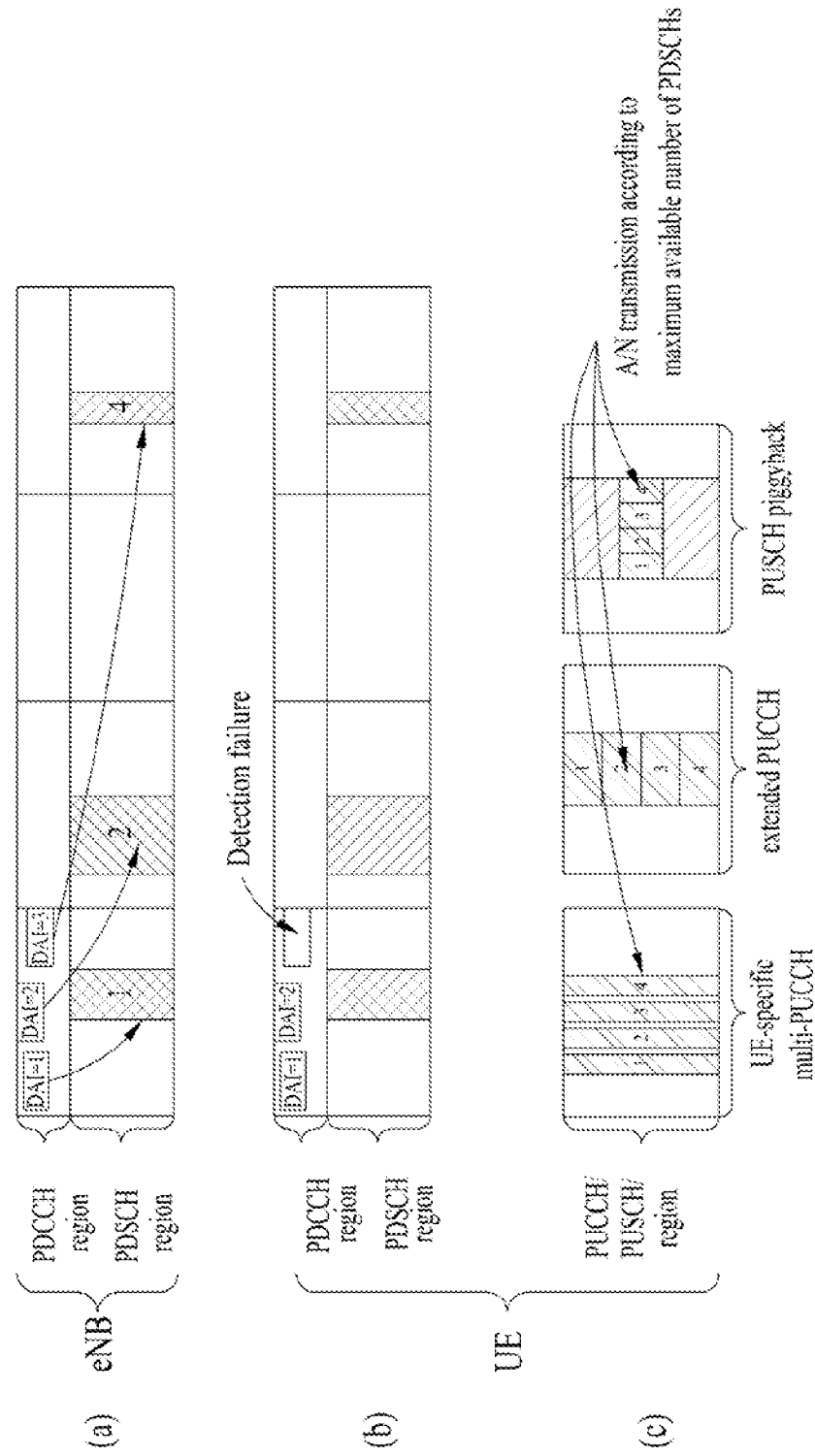
FIG. 37 is a diagram illustrating a method of indicating a PDCCH order value according to an embodiment of the present invention.

A method of including information indicating an order value of a PDCCH transmitted to the UE (that is, an order value of a PDSCH transmitted to the UE) in each PDCCH will be described with reference to FIG. 37.

When the eNB transmits one or a plurality of PDCCHs to an arbitrary UE on one or more DL subframes corresponding to one UL subframe for an ACK/NACK response, the eNB may inform the UE of the order value of the PDCCH transmitted on the subframe. For example, as shown in FIG. 37(a), if the eNB transmits three PDCCHs to one UE on one subframe, each value of 1, 2 or 3 (or 0, 1 or 2) may be included in each PDCCH as the order value of the PDCCH. Such an order value may be transmitted via a DAI field of each PDCCH DCI format. The order of PDCCHs may be determined according to the order of one or more DL subframes corresponding to ACK/NACK transmission of one UL subframe, the size of a CCE index configuring a PDCCH, the frequency order of CCs on which the PDSCHs are transmitted, or the order of carrier indication field (CIF) values of CCs.

For example, if the UE has received only a PDCCH having an order value of 1 and a PDCCH having an order value of 3 on one or more DL subframes corresponding to one UL subframe for an ACK/NACK response, the UE may confirm that a PDCCH having an order value of 2 and a PDSCH corresponding thereto has been missed. That is, unlike the above-described method, the UE may confirm the order of the received PDCCHs and thus confirm the index of the missing PDCCH. However, as shown in FIG. 37(b), if a last PDCH has been missed, since the order values 1 and 2 of the already received PDCCHs match the order of the received PDCCHs, the UE may not confirm that the last PDCCH has been missed. Thus, the eNB cannot confirm how many PDCCHs have been transmitted to the UE.

In addition, the case in which bundled ACK/NACK for all PDSCHs is transmitted through the PUCCH corresponding to the CCE index of the PDCCH which was last received by the UE may be considered. At this time, if the UE has missed the last PDCCH when the eNB has assigned three PDCCHs to the UE, the UE recognizes that two PDSCHs scheduled by the received PDCCHs have been normally received and transmits ACK/NACK information through PUCCH resources corresponding to a second PDCCH. Then, the eNB can confirm that ACK/NACK has been transmitted through the PUCCH corresponding to the second PDCCH, not through the PUCCH corresponding to the last PDCCH, and recognize that the UE has missed the last PDCCH. Meanwhile, if the bundled ACK/NACK is transmitted through PUCCH resources assigned in a UE-specific manner, not through the PUCCH corresponding to the CCE on which the PDCCH is transmitted and the UE transmits the bundled ACK/NACK for the first two PDCCHs through the allocated PUCCHs, the eNB may not confirm whether the ACK/NACK corresponds to two PDSCHs or three PDSCHs.

In addition, if the total number of transmitted PDSCHs (or the number of PDCCHs for scheduling the PDSCHs) is not provided to the UE, ACK/NACK resources corresponding in number to the number of PDSCHs which are maximally scheduled needs to be secured. As shown in FIG. 37(c), for example, if a maximum of four PDSCHs may be scheduled, ACK/NACK resources which may be used to transmit the four PDSCHs must always be secured and transmitted. In this case, since unnecessary resources are secured in advance when multiple ACKs/NACKs are fed back on the PUSCH or when multiple ACKs/NACKs are transmitted via the PUCCH format, ACK/NACK information bits are increased and thus a coding rate may not be efficiently reduced.

Hereinafter, a process of reporting control information at a UE in a multi-carrier system or a carrier aggregation system will be described.

Conventionally, the UE reports control information in consideration of a single layer and a single component carrier for uplink. However, in the multi-carrier or carrier aggregation system, there is a need for an efficient method supporting a plurality of component carriers.

Prior to a detailed description of the present invention, ACK/NACK information reported to an eNB will be described in detail.

First, ACK/NACK information may be information about a PDSCH indicated by a PDCCH transmitted from the eNB to the UE.

Next, ACK/NACK information may be information about a PDCCH indicating semi-persistent scheduling (SPS) release. At this time, ACK/NACK information may not include information about SPS activation. In addition, ACK/NACK information for the PDCCH indicating SPS release may be present only in a primary cell (PCell).

In addition, ACK/NACK information may be information about a PDSCH assigned by SPS. At this time, the ACK/NACK may be present only in a primary cell (PCell).

Accordingly, the ACK/NACK information may be information about a PDCCH, information about a PDSCH indicated by a PDCCH or information about a PDSCH assigned by SPS.

Hereinafter, for convenience of description, assume that ACK/NACK information is information about a PDCCH. The ACK/NACK information may include, but is not limited to, information about a PDSCH indicated by the above-described PDCCH, information about a PDSCH assigned by SPS, etc. The present invention is applicable to a variety of ACK/NACK information.

As described above, a bundling method may be used as a scheme for transmitting one ACK/NACK with respect to a plurality of PDSCHs.

At this time, the bundling method includes a full bundling method and a partial bundling method.

The full bundling method means a scheme for bundling a plurality of subframes and a plurality of component carriers within a predetermined time domain. At this time, the full bundling method may include a spatial bundling method for bundling codewords.

The partial bundling method means a scheme for bundling any one of subframes or component carriers. At this time, any one of the subframes or the component carriers may be bundled.

That is, the partial bundling method includes a CC domain partial bundling method for bundling component carriers on a per subframe basis and a time domain partial bundling method for bundling a plurality of subframes on a per component carrier basis.

A specific system may support any one or both of the full bundling method and the partial bundling method.

Figure 38:
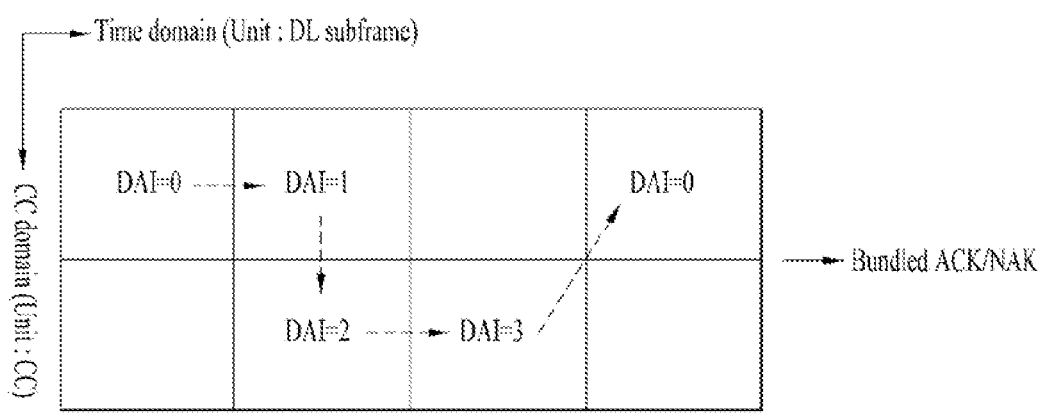
FIG. 38 is a diagram illustrating a full bundling method according to an embodiment of the present invention.

FIG. 38 is a diagram illustrating a full bundling method according to an embodiment of the present invention.

In FIG. 38, a DAI is used as a pure counter. That is, an assignment order of a downlink control channel for a specific UE is represented by 2 bits and is represented by a DAI value obtained by modulo 4 operation using Equation 3.

Referring to FIG. 38, a plurality of subframes and a plurality of component carriers are indiscriminately bundled in a time domain.

Figure 39:
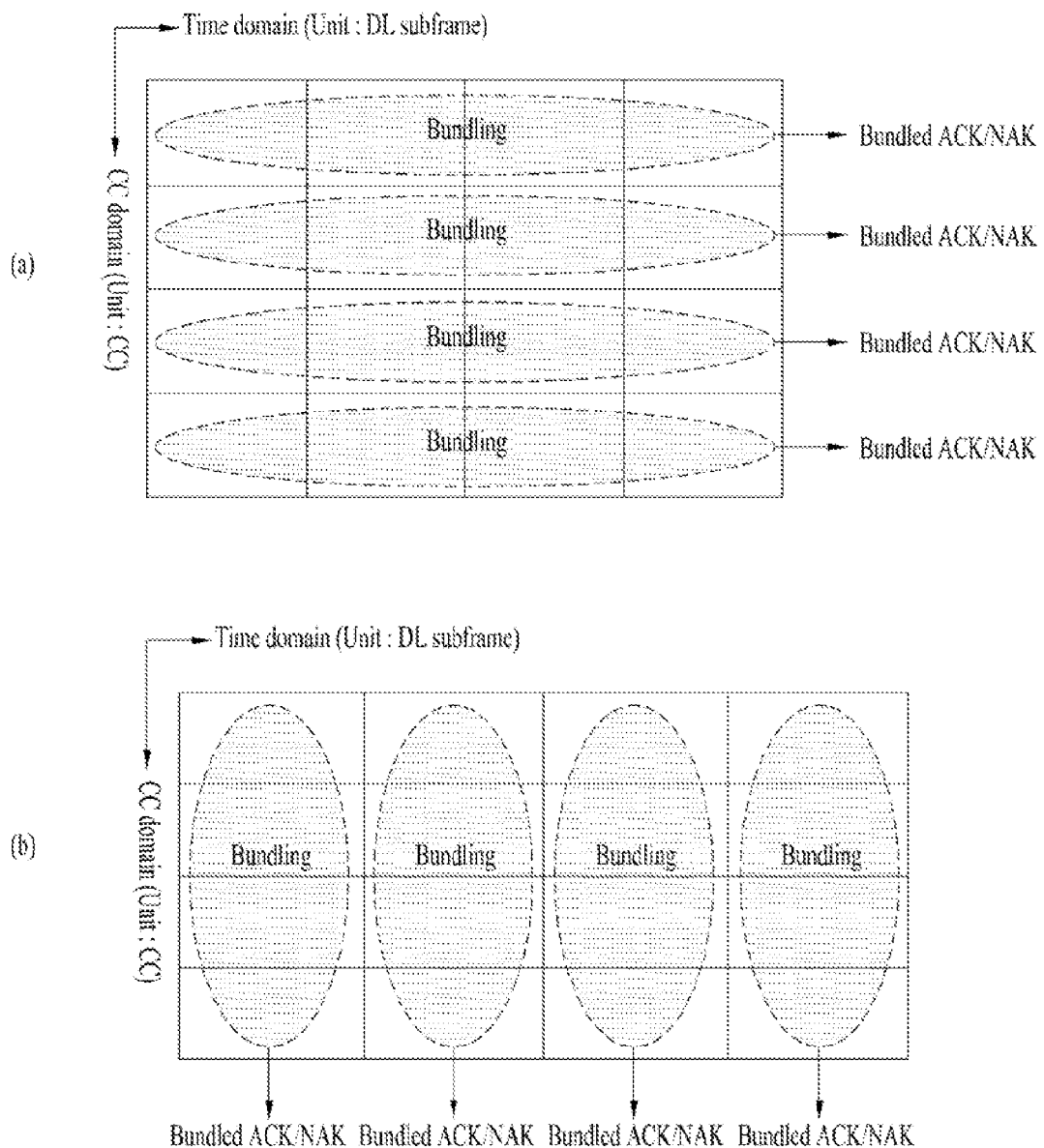
FIG. 39 is a diagram illustrating a partial bundling method according to an embodiment of the present invention.

FIG. 39 is a diagram illustrating a partial bundling method according to an embodiment of the present invention.

FIG. 39(a) shows a time domain partial bundling method. Referring to FIG. 39(a), all or some of the plurality of subframes are bundled on a per component carrier basis.

Next, FIG. 39(b) shows a component carrier partial bundling method. Referring to FIG. 39(b), all or some of component carriers may be bundled on a per subframe basis.

In association with the full bundling method, as shown in FIG. 38, the UE may detect a PDCCH and conform whether there is a missing PDCCH from continuity of the DAI value.

If a last PDCCH has been missed within a subframe, it is difficult for the UE to determine whether there is a missing PDCCH. At this time, last one PDCCH may be missed or a plurality of last consecutive PDCCHs may be missed.

Accordingly, the UE may report information about the last PDCCH detected by the UE (e.g., the DAI value of the last detected PDCCH), the number of PDCCHs detected by the UE, information about the number of ACK responses for the detected PDCCHs, etc. to the eNB in addition to the bundled ACK/NACK information (DTX may be separately identified or may be treated as being equal to NACK). Thus, the eNB may accurately confirm the PDCCH detection state of the UE.

In order to distinguish between the information about the last detected PDCCH, the number of detected PDCCHs or the information about the number of ACK responses for the detected PDCCHs and the bundled ACK/NACK information, the two pieces of information may be composed of separate bits and may be mapped to a constellation point and reported by complexly taking account of the two pieces of information.

For example, if the last detected DAI (2 bits) is reported in addition to the bundled ACK/NACK information, 2 bits for the last detected DAI value may be additionally used in addition to 1 bit for the bundled ACK/NACK information.

In addition, if the bundled ACK/NACK information and the last detected DAI value are complexly mapped to constellation points, mapping may be reported using QPSK through repeated mapping of a specific DAI value. For example, (0, 0) may be transmitted if the bundled ACK/NACK information is NACK, (0, 1) may be transmitted if the bundled ACK/NACK information is ACK and the last DAI value is 0 or 3, (1, 0) may be transmitted if the bundled ACK/NACK information is ACK and the last DAI value is 1, and (1, 1) may be transmitted if the bundled ACK/NACK information is ACK and the last DAI value is 2.

However, in this case, the following problems occur.

That is, if the last DAI value is 0 or 3 and the assignment orders of last three continuous downlink control channels of a plurality of PDCCHs have been missed, since repeated information is mapped to the constellation points, it is difficult for the eNB to recognize this state.

In addition, if the information is transmitted to the eNB using QPSK according to the above-described method, a minimum distance between information is greater than BPSK and thus performance deterioration occurs.

If information is transmitted using QPSK according to the above-described method, since the ACK/NACK state does not have the same part in the constellation (e.g., NACK is located at one place and ACKs are located at three places in the constellation), performance deterioration may occur.

The purpose of the full bundling method is to use fewer transmit bits with respect to the transmit power of the UE. Thus, such performance deterioration through QPSK constellation may cause a problem.

Accordingly, the present invention proposes a method of assigning PUCCH resources to a UE according to information about a last detected PDCCH in order to improve performance of an ACK/NACK full bundling method while efficiently supporting a plurality of component carriers in a mobile communication system.

The below-described bundling means a logical AND operation, which is merely exemplary. Bundling may be performed through other methods such as a logical OR operation. That is, in the following description of the present invention, bundling means a method of representing a plurality of ACK/NACKs using a small bit number (that is, a method of representing ACK/NACK information of M bits using N bits (M=>N)).

In addition, for convenience of description, although the present invention is applicable to TDD or FDD, TDD is assumed.

In addition, although ACK and NACK are described in association with control information, the DTX state may be mapped to NACK in the present invention.

The present invention is not limited to application or application order of the above-described spatial bundling method.

For example, spatial bundling may first be performed within a specific subframe and a specific component carrier (CC) and then full bundling or partial bundling may be performed with respect to the spatial-bundled ACK/NACK information.

As another example, full bundling or partial bundling may be performed with respect to the spatial-bundled ACK/NACK information and then additional spatial bundling may be performed. Hereinafter, for convenience of description, assume that spatial bundling is first performed within a specific subframe and a specific component carrier (CC).

In addition, hereinafter, assume that a primary cell (PCell) can confirm assigned PUCCH resources according to an implicit or explicit method. For example, as an implicit method, assigned PUCCH resources may be determined through a CCE index of a PDCCH. In addition, as an explicit method, PUCCH resources may be assigned in advance through RRC signaling. A method of assigning PUCCH resources to the primary cell is not limited to the above-described examples.

Next, assume that a secondary cell (SCell) can confirm assigned PUCCH resources according to an implicit or explicit method. For example, as an implicit method, assigned PUCCH resources may be determined through a CCE index of a PDCCH. In addition, as an explicit method, assigned PUCCH resources may be determined through a variable such as an assignment resource indicator (ARI) or PUCCH resources may be assigned in advance through RRC signaling. A method of assigning PUCCH resources to the secondary cell is not limited to the above-described examples.

In the present invention, different bundling methods may be used according to the number of codewords included in the PDCCH.

Hereinafter, the bundling method according to the number of codewords included in the PDCCH will be described in detail.

In addition, although it is assumed that the maximum number of codewords which may be included in the PDCCH is two for convenience of description, the present invention is not limited thereto.

(1) Case in which each of a plurality of detected PDCCHs includes one codeword

At this time, the UE may perform full bundling without any particular problem. At this time, the bits of the bundled ACK/NACK information may be transmitted in the form of PUCCH format 1a.

(2) Case in which at least one of a plurality of detected PDCCHs includes two codewords First, the UE may perform spatial bundling with respect to two codewords. Thereafter, the UE performs full bundling with respect to ACK/NACK information for 1 codeword and spatial-bundled ACK/NACK information. The finally bundled ACK/NACK information bits may be transmitted in the form of PUCCH format 1a.

Meanwhile, other methods may be used. That is, if any PDCCH includes one codeword, in order to process the PDCCH as including two codewords, ACK/NACK information may extend to two bits according to a predetermined rule.

At this time, assume that the PDCCH carries a maximum number of transport blocks. If the PDCCH carries a maximum number or less of transport blocks, control information of the transport blocks excluding the transport blocks actually carried by the PDCCH among the maximum number of transport blocks may be regarded as NACK information and may be processed to have the same value as the control information of the actually carried transport blocks.

For example, NACK information may be added to the ACK/NACK information for the PDCCH having one codeword so as to configure virtual 2-bit ACK/NACK information. Thereafter, virtual 2-bit ACK/NACK information is included and full bundling is performed with respect to each of the two codewords.

Thereafter, bits of the bundled ACK/NACK information for the two codewords may be transmitted in the form of PUCCH format 1b. If QPSK constellation to which PUCCH format 1b is used, ACK/NACK information for a first codeword may be mapped to a real value and ACK/NACK information for a second codeword may be mapped to an imaginary value, without a separate mapping table.

(3) Case in which all a plurality of detected PDCCHs includes two codewords

First, the UE may perform spatial bundling with respect to two codewords. Thereafter, the UE performs full bundling with respect to the spatial-bundled ACK/NACK information. The finally bundled ACK/NACK information bits may be transmitted in the form of PUCCH format 1a.

Meanwhile, other methods may be used. That is, the UE performs full bundling with respect to each of the two codewords. Thereafter, the bundled ACK/NACK information bits of the two codewords may be transmitted in the form of PUCCH format 1b.

As described above, different bundling methods may be used according to the number of codewords. Hereinafter, for convenience of description, assume that spatial bundling is first performed and bundled ACK/NACK information bits are transmitted regardless of the number of codewords. The present invention is not limited thereto.

In order to solve the above-described problems, the present invention provides a method of transmitting bundled ACK/NACK information to the eNB using PUCCH resources derived from the information about the last detected PDCCH or the information about the number of last detected PDCCHs, which will now be described in detail.

First, DAI information is a pure counter and an assignment order of a downlink control channel for a specific UE is represented by two bits. This is only exemplary and DAI information may be represented using other methods.

Next, the UE detects a PDCCH and performs full bundling using a DAI.

At this time, in order to prevent a last PDCCH within a subframe from being missed, bundled ACK/NACK information is reported to the eNB using PUCCH resources derived from the information about the last PDCCH or the information about the number of detected PDCCHs.

Here, PUCCH resources may mean physical time resources, physical frequency resources, code resources within physical resources, or a combination of two or more resources. Cyclic shifted codes may be used as different resources. The above-described resources are only examples of the PUCCH resources and the present invention is not limited thereto.

The UE calculate full-bundled ACK/NACK information and determines PUCCH resources derived from information about the last PDCCH or the information about the number of detected PDCCHs, calculated from additional parameters (e.g., ARI) or calculated through RRC signaling. A detailed method of determining PUCCH resources will be described in detail below.

Thereafter, the UE transmits full-bundled ACK/NACK information to the eNB using the determined PUCCH resources. That is, the UE calculates full-bundled ACK/NACK information and transmits the calculated result value in the form of a predetermined transmission format as final transmission information after channel coding. Thereafter, the full-bundled ACK/NACK information is subjected to channel coding (e.g., Reed-Muller coding, convolutional turbo coding, etc.) and is mapped to the final transmission format. At this time, the final transmission format and the channel coding scheme are not restricted by the present invention.

Information about a last detected PDCCH, which is transmitted along with the bundled ACK/NACK information, may be implemented as a variety of information. For example, this information may include a total number of detected PDCCHs, a total number of ACKs for detected PDCCHs, a total number of missing PDCCHs, and a DAI value of a last detected PDCCH. If transmission of ACK/NACK information of SPS is necessary based on a total number of detected PDCCHs, a total number of ACKs for detected PDCCHs, a total number of missing PDCCHs, and a value obtained by adding an additional offset may be used.

In addition, a DAI value, a total number of detected PDCCHs, a total number of ACKs for detected PDCCHs, and a total number of missing PDCCHs may be predetermined and may be subjected to a modulo operation in order to reduce the amount of transmitted information. In this case, the modulo operation of Equation 3 may be applied.

Hereinafter, for convenience of description, assume that information about a last detected PDCCH for determining PUCCH resources used to transmit bundled ACK/NACK information is a DAI value of a last detected PDCCH. This is only exemplary and, as described above, instead of the DAI value, a total number of detected PDCCHs, a total number of ACKs for detected PDCCHs or a total number of missing PDCCHs may be used.

Figure 40:
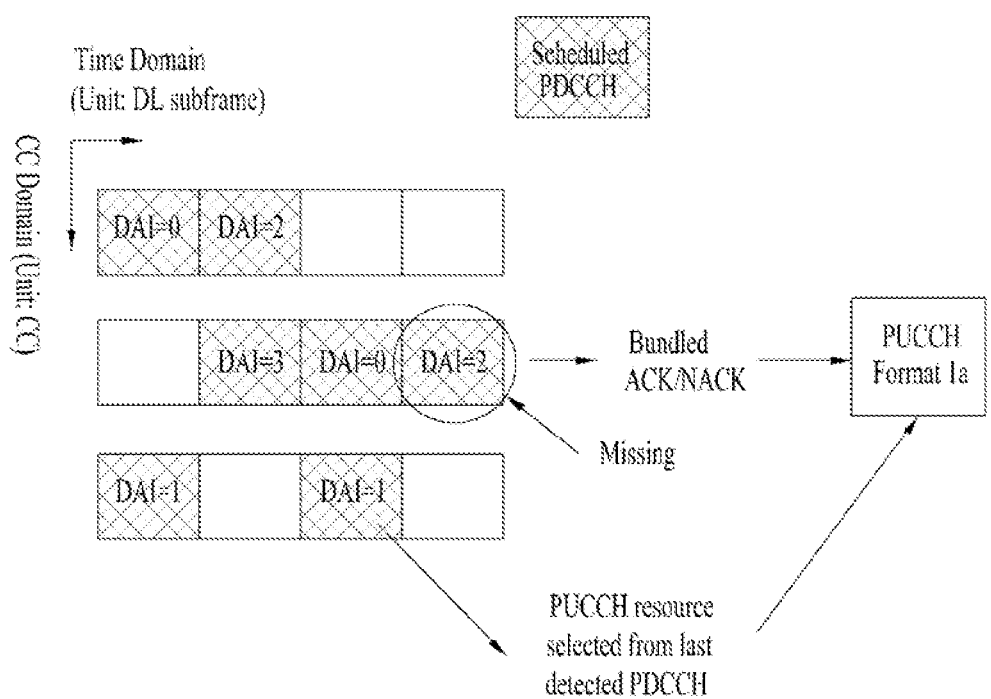
FIG. 40 is a diagram showing an example of transmitting bundled ACK/NACK information via PUCCH resources determined via a last detected DAI value according to an embodiment of the present invention.

FIG. 40 is a diagram showing an example of transmitting bundled ACK/NACK information according to an embodiment of the present invention via PUCCH resources determined via a DAI value of a last detected PDCCH.

In FIG. 40, assume that three component carriers are present and each component carrier includes four subframes.

The UE indiscriminately performs full bundling with respect to a plurality of subframes and a plurality of component carriers in a time domain.

Referring to FIG. 40, since the UE has missed DAI information having a value of "2", the DAI value of the last detected PDCCH becomes "1".

The UE determines PUCCH resources used to transmit bundled ACK/NACK information through "1" which is the DAI value of the last detected PDCCH.

Thereafter, the UE may transmit the bundled ACK/NACK information through the determined PUCCH resources in the form of PUCCH format 1a.

Accordingly, since the eNB can confirm the DAI value of the last PDCCH which is successfully detected by the UE through PUCCH resources used for ACK/NACK information transmission of the UE through the above-described method, the received ACK/NACK information may be accurately interpreted.

Hereinafter, an embodiment of a detailed method of determining PUCCH resources for bundled ACK/NACK information using a DAI value of a last detected PDCCH according to the present invention will be described.

Although it is assumed that information about a PDCCH is a DAI value of a last detected PDCCH, this is only exemplary and a total number of detected PDCCHs, a total number of ACKs for detected PDCCHs or a total number of missing PDCCHs may be used instead of the DAI value.

First, according to one embodiment of the present invention, if the DAI information of the PDCCH which was last detected by the UE is DAI information of a primary cell, PUCCH resources for bundled ACK/NACK information are determined using an implicit method. In addition, if the DAI information of the PDCCH which was last detected by the UE is DAI information of a secondary cell, PUCCH resources are determined using an explicit method. Here, PUCCH resources determined using the explicit method may differ according to the DAI information of the PDCCH.

The case in which the DAI information of the PDCCH which was last detected by the UE is DAI information of a primary cell will be described first.

At this time, a representative example of an implicit method includes a method of using a CCE index.

More specifically, PUCCH resources used by the UE to transmit ACK/NACK information are determined using an implicit method based on a PDCCH carrying scheduling information of a PDSCH for transmitting downlink data. In a downlink subframe, the entire region in which the PDCCH is transmitted is composed of a plurality of CCEs and the PDCCH transmitted to the UE is composed of one or more CCEs. The CCE includes a plurality (e.g., 9) of resource element groups (REGs). One REG is composed of four neighboring resource elements (REs) in a state of excluding a reference signal (RS). The UE transmits ACK/NACK information through implicit PUCCH resources derived or calculated by a function of a specific CCE index (e.g., a first or lowest CCE index) among CCE indices configuring the received PDCCH.

The PUCCH resource index is determined by Equation 1 below.

$$n^{(1)}_{PUCCH} = n_{CCE} + N^{(1)}_{PUCCH} \quad \text{[Equation 1]}$$

where, $n^{(1)}_{PUCCH}$ denotes a PUCCH resource index for transmitting ACK/NACK information and $N^{(1)}_{PUCCH}$ denotes a signal value received from a higher layer. $n_{CCE}$ denotes the smallest value of CCE indices used for PDCCH transmission.

In addition, the PUCCH resource index may be determined by Table 15 and Equation 4.

TABLE 15

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, | — | — |
| 3 | — | — | 7, 6, 11 | 6, 5 | 5, | — | — | — | — | — |
| 4 | — | — | 12, 8, 7, 11 | 6, 5, 4, 7 | — | — | — | — | — | — |

TABLE 15-continued

| UL-DL Configuration | 0 | 1 | 2 | 3 | 4 | 5 | 6 | 7 | 8 | 9 |
|---|---|---|---|---|---|---|---|---|---|---|
| 5 | — | — | 13, 12, 9, 8, 7, 5, 4, 11, 6 | — | — | — | — | — | — | — |
| 6 | — | — | 7 | 7 | — | 5 | — | — | 7 | 7 | — |

$$n^{(1)}_{PUCCH,i} = (M-i-1) \times N_p + i \times N_{p+1} + n_{CCE,i} + N^{(1)}_{PUCCH} \quad \text{[Equation 4]}$$

where, Table 15 shows a downlink association set index K for TDD.

In Equation 4, $n^{(1)}_{PUCCH,i}$ denotes a PUCCH resource index for transmitting ACK/NACK information, M denotes the number of elements within the set index K defined in Table 15, i (i=0, 1, . . . , M−1) denotes a subframe index of a PDCCH within the set index K, and p is selected from {0, 1, 2, 3} in $N_p \le n_{CCE,i} < N_{p+1}$. Here, $N_p = \max\{0, \lfloor [N_{RB}^{DL} \times (N_{sc}^{RB} \times p - 4)]/36 \rfloor\}$. $N_{sc}^{RB}$ denotes the size of a resource block in a frequency domain, $N_{RB}^{DL}$ denotes a downlink bandwidth configuration, $n_{CCE,i}$ denotes the number of first indices used for PDCCH transmission within the subframe, and $N^{(1)}_{PUCCH}$ denotes a signal value received from a higher layer.

That is, Equation 4 is used to stack resources and select independent resources on a per TDD subframe basis.

The case in which DAI information of a PDCCH which was last detected by the UE is DAI information of a secondary cell will now be described.

At this time, a representative example of an explicit method includes a method of using additional signaling with respect to an ACK resource indicator (ARI).

At this time, the ARI of the secondary cell may reuse a transmit power control (TPC) field of downlink assignment. In addition, the ARI may directly indicate PUCCH resources or an offset for a parameter associated with other PUCCH resources. A detailed method of using additional signaling with respect to the ARI will now be described.

First, the ARI may represent a specific resource among a few PUCCH resources configured from a higher layer. For example, four resources, that is, $n^{(1)}_{PUCCH}$ of Equation 1 or $n^{(1)}_{PUCCH,i}$ of Equation 4, may be configured from a higher layer. Thereafter, the ARI may indicate which of the four PUCCH resources is actually used using 2 bits. As another example, four resources, that is, $n^{(1)}_{PUCCH,i}$ of Equation 4, may be configured according to i. Thereafter, the ARI may indicate which of the four PUCCH resources corresponding to i is actually used using 2 bits. Here, the index i may indicate a subframe index within the set index k defined in Table 15 or a last detected DAI value.

The ARI may directly represent PUCCH resources. For example, the ARI may directly indicate any one of resource indices defined in 3GPP TS 36.211. In association with this, Equation 5 or 6 is applicable.

That is, at least one n'($n_s$) of a plurality of n'($n_s$) shown in Equation 5 or 6 may be specified (e.g., n'(0)).

As another example, PUCCH resources may be directly indicated as shown in Table 16.

TABLE 16

| Value of 'TPC command for PUCCH' | $n_{PUCCH}^{(1)}$ |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

At this time, a table for SPS may be equally reused. In addition, a separate table and RRC signaling are configured and PUCCH resources different from SPS may be used.

In addition, the ARI may indicate a CCE index for calculating or deriving PUCCH resources or an offset for a CCE index of a PDCCH for determining PUCCH resources.

In addition, the ARI may mean an offset for PUCCH resources based on a CCE index of a PDCCH for determining PUCCH resources.

That is, the UE may determine whether DAI information of a last detected PDCCH is for a primary cell or a secondary cell and determine PUCCH resources using an implicit method or an explicit method according to the determination. At this time, the eNB may confirm the DAI value of the last PDCCH which is successfully detected by the UE using PUCCH resources used to transmit the received ACK/NACK information and thus accurately interpret the received ACK/NACK information.

According to another embodiment of the present invention, if DAI information of a PDCCH which was last detected by the UE is DAI information of a primary cell, PUCCH resources for bundled ACK/NACK information are determined according to an implicit method. If DAI information of a PDCCH which was last detected by the UE is DAI information of a secondary cell, PUCCH resources corresponding to the DAI information of the last detected PDCCH among a plurality of PUCCH resources assigned in advance may be determined to be used.

$$n'(n_s) = \begin{cases} n^{(1)}_{PUCCH} & \text{if } n^{(1)}_{PUCCH} < c \cdot N^{(1)}_{cs} / \Delta^{PUCCH}_{shift} \\ (n^{(1)}_{PUCCH} - c \cdot N^{(1)}_{cs} / \Delta^{PUCCH}_{shift}) \bmod (c \cdot N^{RB}_{sc} / \Delta^{PUCCH}_{shift}) & \text{otherwise} \end{cases} \quad \text{[Equation 5]}$$

$$n'(n_s) = \begin{cases} [c(n'(n_s-1)+1)] \bmod (cN^{RB}_{sc} / \Delta^{PUCCH}_{shift} + 1) - 1 & n^{(1)}_{PUCCH} \ge c \cdot N^{(1)}_{cs} / \Delta^{PUCCH}_{shift} \\ \lfloor \frac{h}{c} \rfloor + (h \bmod c) N' / \Delta^{PUCCH}_{shift} & \text{otherwise} \end{cases} \quad \text{[Equation 6]}$$

That is, if DAI information of a PDCCH which was last detected by the UE is DAI information of a primary cell, similarly to the above-described embodiment, PUCCH resources for ACK/NACK information are determined using a method of using a CCE index of the PDCCH.

If DAI information of a PDCCH which was last detected by the UE is DAI information of a secondary cell, a plurality of PUCCH resources which is assigned through RRC signaling in advance is used.

More specifically, the UE is assigned PUCCH resources through RRC signaling in advance. At this time, PUCCH resources may be shared by a plurality of UEs.

That is, PUCCH resources assigned through RRC signaling in advance may be resources for a specific UE, resources for a specific UE group or broadcast resources for all UEs.

At this time, the PUCCH resources assigned in advance may be assigned regardless of serving cells set with respect to the UE and may be differently assigned according to serving cells.

Hereinafter, a detailed method of assigning PUCCH resources to a UE through RRC signaling in advance will be described.

First, separate PUCCH resources for DAI values (e.g., 2 bits) or separate resources associated with PUCCH resources may be assigned through RRC signaling. That is, different PUCCH resources mapped to DAI values are assigned through RRC signaling in advance.

For example, if 2-bit DAI information is used, four PUCCH resources mapped to the 2-bit DAI information in one-to-one correspondence may be assigned to the UE through RRC signaling in advance.

In addition, separate PUCCH resources for a total number of detected PDCCHs or separate resources associated with PUCCH resources may be assigned through RRC signaling.

In addition, as described above, the PUCCH resources assigned in advance may be assigned by specifying PUCCH resources or an associated variable for calculating or deriving PUCCH resources may be assigned. For example, resources may be assigned through an ACK resource indicator (ARI). Hereinafter, although an associated variable for calculating or deriving PUCCH resources is an ARI for convenience of description, the present invention is not limited thereto.

As described above, the ARI may directly indicate PUCCH resources. As an example thereof, at least one $n'(n_s)$ of a plurality of $n'(n_s)$ may be specified using Equation 5 or 6 (e.g., $n'(0)$).

In addition, as shown in Table 16, PUCCH resources may be directly indicated. At this time, a table for SPS may be equally reused. In addition, a separate table and RRC signaling are configured and PUCCH resources different from SPS may be used.

In addition, the ARI may indicate a CCE index for calculating or deriving PUCCH resources or an offset for a CCE index of a PDCCH for determining PUCCH resources.

In addition, the ARI may mean an offset for PUCCH resources based on a CCE index of a PDCCH for determining PUCCH resources.

That is, the UE may determine whether DAI information of a last detected PDCCH is for a primary cell or a secondary cell and determine PUCCH resources using an implicit method or an explicit method according to the method of assigning the PUCCH resources in advance. At this time, the eNB may confirm the last DAI value which has been successfully detected by the UE using PUCCH resources used to transmit the received ACK/NACK information and thus accurately interpret the received ACK/NACK information.

According to another embodiment of the present invention, regardless of whether DAI information of a PDCCH which was last detected by the UE is DAI information of a primary cell or a secondary cell, the same rule may be applied to determine PUCCH resources for ACK/NACK information.

More specifically, the UE is assigned PUCCH resources through RRC signaling in advance. At this time, PUCCH resources may be shared by a plurality of UEs.

That is, PUCCH resources assigned through RRC signaling in advance may be resources for a specific UE, resources for a specific UE group or broadcast resources for all UEs.

At this time, the PUCCH resources assigned in advance may be assigned regardless of serving cells set with respect to the UE and may be differently assigned according to serving cells.

Hereinafter, a detailed method of assigning PUCCH resources to a UE through RRC signaling in advance will be described.

First, separate PUCCH resources for DAI values (e.g., 2 bits) or separate resources associated with PUCCH resources may be assigned through RRC signaling. That is, different PUCCH resources mapped to DAI values are assigned through RRC signaling in advance.

For example, if 2-bit DAI information is used, four PUCCH resources mapped to the 2-bit DAI information in one-to-one correspondence may be assigned to the UE through RRC signaling in advance.

In addition, separate PUCCH resources for a total number of detected PDCCHs or separate resources associated with PUCCH resources may be assigned through RRC signaling.

In addition, as described above, the PUCCH resources assigned in advance may be assigned by specifying PUCCH resources or an associated variable for calculating or deriving PUCCH resources is assigned. For example, resources may be assigned through an ACK resource indicator (ARI). Hereinafter, although an associated variable for calculating or deriving PUCCH resources is an ARI for convenience of description, the present invention is not limited thereto.

As described above, the ARI may directly indicate PUCCH resources. As an example thereof, at least one $n'(n_s)$ of a plurality of $n'(n_s)$ may be specified using Equation 5 or 6 (e.g., $n'(0)$).

In addition, as shown in Table 16, PUCCH resources may be directly indicated. At this time, a table for SPS may be equally reused. In addition, a separate table and RRC signaling are configured and PUCCH resources different from SPS may be used.

In addition, the ARI may indicate a CCE index for calculating or deriving PUCCH resources or an offset for a CCE index of a PDCCH for determining PUCCH resources.

In addition, the ARI may mean an offset for PUCCH resources based on a CCE index of a PDCCH for determining PUCCH resources.

That is, the UE may determine PUCCH resources through RRC signaling according to the method of assigning the PUCCH resources in advance, regardless of whether DAI information of a last detected PDCCH is for a primary cell or a secondary cell. At this time, the eNB may confirm the last DAI value which is successfully detected by the UE using PUCCH resources used to transmit the received ACK/NACK information and thus accurately interpret the received ACK/NACK information.

Although the example of applying the present invention to a plurality of PDCCHs included in a plurality of component carriers is described, the present invention is not limited thereto. The present invention is applicable to a PDCCH within at least one downlink subframe in TDD. That is, the present invention is applicable to a method of bundling ACK/NACK information for a PDCCH within at least one downlink subframe including a plurality of component carriers and transmitting the bundled ACK/NACK information to an eNB. The downlink subframe which is a bundling unit may be referred to as a bundling window (M).

Meanwhile, the present invention may be implemented by a full bundling method using a modified DAI.

Hereinafter, a method of setting a modified DAI value will be described in detail.

First, a DAI value is determined in units of a predetermined subframe. That is, the DAI values of a plurality of component carriers located in a specific subframe are identical.

At this time, the DAI value within a specific subframe is determined by a function from a DAI value used in a previous subframe. That is, the DAI value is set to mean a total number of PDCCHs scheduled in a plurality of component carriers in a specific subframe. If a scheduled PDCCH is not present in an immediately previous first subframe, a DAI value of a previous subframe of the first subframe is used.

In addition, an offset may be added to a DAI value of a previous subframe, a total number of assigned PDCCHs or a calculated DAI. Even when the DAI value is represented by the restricted bit number by adding the offset, it is possible to prevent PDCCHs from being continuously missed. In addition, a modulo operation may be performed with respect to the calculated DAI value. For example, a modulo 4 operation may be performed in order to use a 2-bit DAI value.

By using the above-described modified DAI value, the UE may confirm a total number of PDCCHs assigned thereto within a current subframe by comparing the DAI value of a previous subframe with the DAI value of a current subframe. Accordingly, the UE may determine whether there is a missing PDCCH within the subframe.

That is, if the UE successfully detects one or more PDCCHs in a specific subframe, a determination as to whether a missing PDCCH is present over all component carriers is made from the DAI value.

Therefore, it is possible to prevent a last PDCCH from being missed with respect to a plurality of component carriers in advance and accurately perform ACK/NACK bundling. In addition, like the above-described method, it is not necessary to report the DAI value of the last detected PDCCH to an eNB.

Since an additional report is not required, 1-bit information for ACK or NACK is mapped to a BPSK constellation point so as to improve performance.

In addition, unlike the conventional method, without performing spatial bundling, each codeword may be bundled to transmit bundled ACK/NACK information for two codewords through QPSK or channel selection.

The method of determining the modified DAI may be expressed by Equation 7 below.

$$DAI_i = \mathrm{mod}\{\mathrm{function}(DAI_{i-1}, N_i) + \mathrm{offset}, M\} \quad \text{[Equation 7]}$$

where, $DAI_i = 0$, and $N_i$ denotes the number of scheduled PDCCHs of a plurality of component carriers located within an i-th subframe for a specific UE. In addition, mod { } means a modulo operation, which is used to restrict the number of bits of the DAI value. For example, for a 2-bit DAI, M included in Equation 7 may become 4. The setting the value of M does not restrict the present invention. For convenience, although $DAL_1$ is 0, the value may be an arbitrary fixed value.

In Equation 7, an offset is used to prevent errors due to continuous PDCCH missing. For convenience, although the offset is described next to a function, the offset is applicable to another variable. This is expressed by Equations 8 and 9 below.

$$DAI_i = \mathrm{mod}\{\mathrm{function}(DAI_{i-1} + \mathrm{offset}, N_i), M\} \quad \text{[Equation 8]}$$

$$DAI_i = \mathrm{mod}\{\mathrm{function}(DAI_{i-1}, N_i + \mathrm{offset}), M\} \quad \text{[Equation 9]}$$

where, the offset may be a predetermined fixed value or a predetermined function (e.g., floor{function($DAI_{i-1}$, $N_i$+offset/$DAI_i$}) associated with a certain function (e.g., a subframe index, etc.) or a modulo operation associated with a subframe. That is, the offset may be determined by at least one of various values, equations and functions which do not require separate signaling.

For convenience of description, assume that Equations 7 to 9 are expressed by Equation 10 below and are applied to the present invention.

$$DAI_i = \mathrm{mod}\{DAI_{i-1} + N_i, 4\} \quad \text{[Equation 10]}$$

where, $DAI_i$ denotes a DAI value transmitted on an i-th subframe, $DAL_1 = -1$, $N_i$ denotes the number of scheduled PDCCHs of a plurality of component carriers located within the i-th subframe, and a modulo 4 function is applied. Assume that the subframe index i is sequentially increased from 0.

A detailed embodiment to which Equation 10 is applied will be described with reference to FIGS. 41 and 42.

FIG. 41 is a diagram showing an example of using general DAI information and modified DAI information according to an embodiment of the present invention.

In FIG. 41, assume that the UE has missed all PDCHs for component carriers within a second subframe of a plurality of subframes.

The DAI is a pure counter and indicates an assignment order of a downlink control channel for a specific UE.

First, referring to FIG. 41(*a*), since 1 which is a last DAI of a first subframe and 1 which is a first DAI of a third subframe are not continuous to each other, the UE can confirm that there is a missing PDCCH. However, a problem that it is difficult for the UE to confirm the location of the missing PDCCH remains.

Next, referring to FIG. 41(*b*), a modified DAI value to which Equation 10 is applied is applied.

That is, two scheduled PDCCHs are present in a first subframe and the DAI value becomes mod(−1+2, 4)=1 by applying Equation 10. This value 1 is equally assigned to each of a plurality of component carriers included in the first subframe.

Next, three scheduled PDCCHs are present in a second subframe and the DAI value becomes mod(1+3, 4)=0 by applying Equation 10. This value 0 is equally assigned to each of a plurality of component carriers included in the second subframe.

Next, one scheduled PDCCH is present in a third subframe and the DAI value becomes mod(0+1, 4)=1 by applying Equation 10. This value 1 is equally assigned to each of a plurality of component carriers included in the third subframe.

Finally, two scheduled PDCCHs are present in a fourth subframe and the DAI value becomes mod(1+2, 4)=3 by applying Equation 10. This value 3 is equally assigned to each of a plurality of component carriers included in the fourth subframe.

At this time, the UE can confirm that two scheduled PDCCHs are present in the first subframe and the set DAI value is 1. In addition, the UE can confirm that one scheduled PDCCH is present in the third subframe and the set DAI value is 1.

Accordingly, the UE can confirm that a missing PDCCH is present and the missing PDCCH is present in the second subframe.

Next, FIG. 42 is a diagram showing an example of using general DAI information and modified DAI information according to another embodiment of the present invention.

In FIG. 42, assume that the UE has missed a PDCCH for a last component carrier in a fourth subframe which is the last subframe of a plurality of subframes.

Here, the DAI is a pure counter and indicates an assignment order of a downlink control channel for a specific UE.

First, referring to FIG. 42(a), since 1 which is a last DAI of a third subframe and 2 which is a first DAI of a fourth subframe are continuous to each other, it is difficult for the UE to confirm that there is a missing PDCCH.

Accordingly, in order to solve such a problem, the UE must report information about the last detected PDCCH, that is, information about 2 which is the first DAI of the fourth subframe of FIG. 42(a), along with bundled ACK/NACK information.

Next, referring to FIG. 42(b), a modified DAI value, to which Equation 10 is applied, is applied. The DAI value applied to each subframe is used equally to FIG. 40(b).

That is, since the UE knows that two scheduled PDCCHs are present in the fourth subframe and the set DAI value is 3, the UE may recognize that one PDCCH has been missed in the received fourth subframe. Accordingly, since the bundled ACK/NACK information is reported to the eNB in consideration of the above fact, additional information transmission is not required. Therefore, it is possible to simplify the procedure.

In addition, the DAI value is expressed by Equation 11 below and is applicable to the present invention.

$$DAI_i = \mod\{(DAI_{i-1} + N_i) + \text{offset}, 4\} \quad [\text{Equation 11}]$$

where, $DAI_i$ denotes a DAI value transmitted on an i-th subframe, $DAL_1 = -1$, $N_i$ denotes the number of scheduled PDCCHs of a plurality of component carriers located within the i-th subframe, and a modulo 4 function is applied. Assume that offset=1 and the subframe index i is sequentially increased from 0.

A detailed embodiment to which Equation 11 is applicable will be described with reference to FIG. 43.

Figure 43:
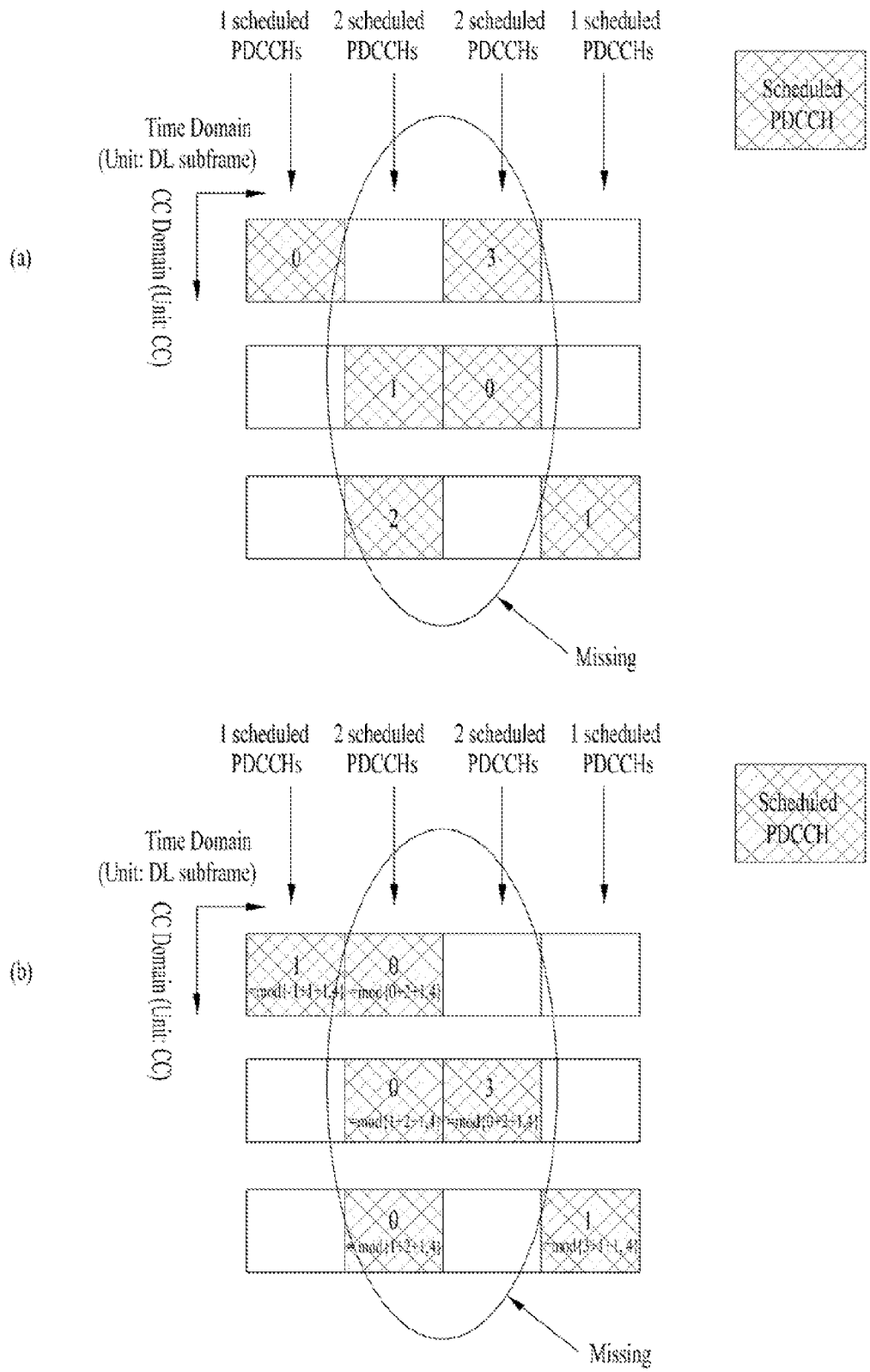
FIG. 43 is a diagram showing an example of using general DAI information and modified DAI information according to another embodiment of the present invention.

FIG. 43 is a diagram showing an example of using general DAI information and modified DAI information according to another embodiment of the present invention.

In FIG. 43, assume that the UE has missed all PDCCHs for component carriers in second and third subframes of a plurality of subframes.

Here, the DAI is a pure counter and indicates an assignment order of a downlink control channel for a specific UE.

First, referring to FIG. 43(a), since 0 which is a last DAI of a first subframe and 1 which is a first DAI of a fourth subframe are continuous to each other, it is determined that a missing PDCCH is not present. Thereafter, the erroneous result may be reported to the eNB, causing errors.

Next, referring to FIG. 43(b), a modified DAI value, to which Equation 10 is applied, is applied.

That is, one scheduled PDCCH is present in a first subframe and the DAI value becomes mod(-1+1+1, 4)=1 by applying Equation 11. This value 1 is equally assigned to each of a plurality of component carriers included in the first subframe.

Next, two scheduled PDCCHs are present in a second subframe and the DAI value becomes mod(1+2+1, 4)=0 by applying Equation 11. This value 0 is equally assigned to each of a plurality of component carriers included in the second subframe.

Next, two scheduled PDCCHs are present in a third subframe and the DAI value becomes mod(0+2+1, 4)=3 by applying Equation 11. This value 3 is equally assigned to each of a plurality of component carriers included in the third subframe.

Finally, one scheduled PDCCH is present in a fourth subframe and the DAI value becomes mod(3+1+1, 4)=1 by applying Equation 11. This value 1 is equally assigned to each of a plurality of component carriers included in the fourth subframe.

At this time, the UE can confirm that one scheduled PDCCH is present in the first subframe and the set DAI value is 1. In addition, the UE can confirm that one scheduled PDCCH is present in the fourth subframe and the set DAI value is 1.

Accordingly, if no scheduled PDCCH is present in second and third subframes according to the rule of Equation 11, since the value of mode(1+1+1, 4)=3 must be set in the fourth subframe, the UE can confirm that a missing PDCCH is present and the missing PDCCH is present in the second and/or third subframe.

Accordingly, since the bundled ACK/NACK information is reported to the eNB in consideration of the above fact, additional information transmission is not required. Therefore, it is possible to simplify the procedure.

In the present invention, if all PDCCHs of all component carriers of the last subframe have been missed, the UE cannot confirm that all PDCCHs have been missed.

In consideration of this case, the UE may use a method of reporting where the last subframe detected by the UE is located using different PUCCH resources which depend on the subframe in which the last detected PDCCH is present.

In addition, the method of using the DAI of the present invention (e.g., methods to which Equations 7 to 11 are applicable) is applicable to only full bundling or both full bundling and partial bundling.

In particular, if CC-domain partial bundling is performed, the method of using the DAI of the present invention is equally applicable to full bundling and CC-domain bundling.

In addition, in association with the present invention, the DAI value of the last detected PDCCH used for feedback or a total of detected PDCCHs may include SPS feedback if necessary.

Even in the method of performing full bundling using the DAI value described with reference to FIGS. 41 to 43, the method of assigning the above-described PUCCH resources according to information about the PDCCH which was last detected by the UE is applicable.

That is, the above-described method is equally applicable to PUCCH resource assignment except for the method of using the DAI information and the meaning thereof.

As described with reference to FIGS. 42 and 43, if the modified DAI value is used, the problem that the last PDCCH is missed is solved by the method of using the DAI.

That is, if a plurality of PDCCHs in the same subframe is assigned, the UE which successfully detects one or more PDCCHs can confirm that a missing PDCCH is present in the subframe from the DAI value.

Accordingly, if the modified DAI value is used, an element for determining PUCCH resources is changed. That is, if such a DAI is used, the PUCCH derived from the last detected PDCCCH or a total number of PDCCHs is not used but the PUCCH derived from the last subframe in which one or more PDCCH is detected, a total number of detected PDCCHs or a total number of subframes in which the detected PDCCH is present may be used.

Hereinafter, for convenience of description, assume that information for determining PUCCH resources used to transmit bundled ACK/NACK information is a last subframe in which at least one PDCCH is detected.

However, this is only exemplary and, as described above, a total number of detected PDCCHs or a total number of subframes in which the detected PDCCH is present may be used instead of the last subframe in which one or more PDCCHs are detected.

First, according to one embodiment of the present invention, if information about a last subframe in which one or more PDCCHs are detected is information about a primary cell, the UE determines PUCCH resources for bundled ACK/NACK information according to an implicit method.

In addition, if information about a last subframe in which one or more PDCCHs are detected is information about a secondary cell, the UE determines PUCCH resources according to an explicit method.

The case in which information about a last subframe in which one or more PDCCHs are detected is information about a primary cell will first be described.

At this time, a representative example of an implicit method includes a method of using a CCE index of a PDCCH.

That is, as described above, the UE may transmit ACK/NACK information through implicit PUCCH resources derived or calculated from a function a specific CCE index (e.g., a first or lowest CCE index) among CCE indices configuring the received PDCCH.

The indices of the PUCCH resources may be determined by Equations 1 and 4.

Meanwhile, the case in which information about a last subframe in which one or more PDCCHs are detected is information about a secondary cell will be described.

At this time, a representative example of an explicit method includes a method of using additional signaling with respect to an ACK resource indicator (ARI).

At this time, the ARI of the secondary cell may reuse a transmit power control (TPC) field of downlink assignment. In addition, the ARI may directly indicate PUCCH resources or an offset for a parameter associated with other PUCCH resources. A detailed method of using additional signaling with respect to the ARI may be implemented by directly indicating any one of resource indices defined using Equations 5 and 6 as described above. In addition, as shown in Table 16, PUCCH resources may be directly indicated. At this time, a table for SPS may be equally reused.

In addition, a separate table and RRC signaling are configured and PUCCH resources different from SPS may be used.

In addition, the ARI may indicate a CCE index for calculating or deriving PUCCH resources or an offset for a CCE index of a PDCCH for determining PUCCH resources.

In addition, the ARI may mean an offset for PUCCH resources based on a CCE index of a PDCCH for determining PUCCH resources.

That is, the UE may determine whether information about a last subframe in which one or more PDCCHs are detected is information about a primary cell or a secondary cell and determine PUCCH resources using an implicit method or an explicit method according to the determination. At this time, the eNB may confirm information about the last subframe which is successfully detected by the UE using PUCCH resources used to transmit the received ACK/NACK information and thus accurately interpret the received ACK/NACK information.

According to another embodiment of the present invention, if information about a last subframe in which one or more PDCCHs are detected is information about a primary cell, the UE determines PUCCH resources for bundled ACK/NACK information according to an implicit method. If information about a last subframe in which one or more PDCCHs are detected is information about a secondary cell, the UE determines use of PUCCH resources corresponding to the information about the last detected subframe of the plurality of PUCCH resources assigned in advance through RRC signaling.

That is, if information about a last subframe in which one or more PDCCHs are detected is DAI information of a primary cell, PUCCH resources for ACK/NACK information are determined through a method of using a CCE index of a PDCCH, similarly to the above-described embodiment.

However, if information about a last subframe in which one or more PDCCHs are detected is DAI information of a secondary cell, a plurality of PUCCH resources assigned through RRC signaling in advance is used.

More specifically, the UE is assigned PUCCH resources through RRC signaling. At this time, PUCCH resources may be shared by a plurality of UEs.

That is, PUCCH resources assigned through RRC signaling in advance may be resources for a specific UE, resources for a specific UE group or broadcast resources for all UEs.

At this time, the PUCCH resources assigned in advance may be assigned regardless of serving cells set with respect to the UE and may be differently assigned according to serving cells.

Hereinafter, a detailed method of assigning PUCCH resources to a UE through RRC signaling in advance will be described.

First, separate PUCCH resources for the last detected subframe information or separate resources associated with PUCCH resources may be assigned through RRC signaling. That is, different PUCCH resources mapped to the last detected subframe information are assigned through RRC signaling in advance.

For example, if 2-bit last detected subframe information is used, four PUCCH resources mapped to the 2-bit last detected subframe information in one-to-one correspondence may be assigned to the UE through RRC signaling in advance.

In addition, separate PUCCH resources for a total number of detected PDCCHs or separate resources associated with PUCCH resources may be assigned through RRC signaling.

In addition, as described above, the PUCCH resources assigned in advance may be assigned by specifying PUCCH resources or an associated variable for calculating or deriving PUCCH resources may be assigned. For example, resources may be assigned through an ACK resource indicator (ARI). Hereinafter, although an associated variable for calculating or deriving PUCCH resources is an ARI for convenience of description, the present invention is not limited thereto.

As described above, the ARI may directly indicate PUCCH resources. As an example thereof, at least one $n'(n_s)$ of a plurality of $n'(n_s)$ may be specified using Equation 5 or 6 (e.g., $n'(0)$).

In addition, as shown in Table 16, PUCCH resources may be directly indicated. At this time, a table for SPS may be equally reused. In addition, a separate table and RRC signaling are configured and PUCCH resources different from SPS may be used.

In addition, the ARI may indicate a CCE index for calculating or deriving PUCCH resources or an offset for a CCE index of a PDCCH for determining PUCCH resources.

In addition, the ARI may mean an offset for PUCCH resources based on a CCE index of a PDCCH for determining PUCCH resources.

That is, the UE may determine whether DAI information of last detected subframe information is for a primary cell or a secondary cell and determine PUCCH resources using an implicit method or an explicit method or through RRC signaling according to the method of assigning the PUCCH resources in advance. At this time, the eNB may confirm the last subframe information which is successfully detected by the UE using PUCCH resources used to transmit the received ACK/NACK information and thus accurately interpret the received ACK/NACK information.

According to another embodiment of the present invention, regardless of whether the subframe information which was last detected by the UE is for a primary cell or a secondary cell, the same rule may be applied to determine PUCCH resources for ACK/NACK information.

More specifically, the UE is assigned PUCCH resources through RRC signaling in advance. At this time, PUCCH resources may be shared by a plurality of UEs.

That is, PUCCH resources assigned through RRC signaling in advance may be resources for a specific UE, resources for a specific UE group or broadcast resources for all UEs.

At this time, the previously assigned PUCCH resources may be assigned regardless of serving cells set with respect to the UE and may be differently assigned according to serving cells.

Hereinafter, a detailed method of assigning PUCCH resources to a UE through RRC signaling in advance will be described.

First, separate PUCCH resources for last subframe information (e.g., 2 bits) or separate resources associated with PUCCH resources may be assigned through RRC signaling. That is, different PUCCH resources mapped to the last detected subframe information are assigned through RRC signaling in advance.

For example, if 2-bit last detected subframe information is used, four PUCCH resources mapped to the 2-bit subframe information in one-to-one correspondence may be assigned to the UE through RRC signaling in advance.

In addition, separate PUCCH resources for a total number of detected PDCCHs or separate resources associated with PUCCH resources may be assigned through RRC signaling.

In addition, as described above, the PUCCH resources assigned in advance may be assigned by specifying PUCCH resources or an associated variable for calculating or deriving PUCCH resources is assigned. For example, resources may be assigned through an ACK resource indicator (ARI). Hereinafter, although an associated variable for calculating or deriving PUCCH resources is an ARI for convenience of description, the present invention is not limited thereto.

As described above, the ARI may directly indicate PUCCH resources. As an example thereof, at least one $n'(n_s)$ of a plurality of $n'(n_s)$ may be specified using Equation 5 or 6 (e.g., $n'(0)$).

In addition, as shown in Table 16, PUCCH resources may be directly indicated. At this time, a table for SPS may be equally reused. In addition, a separate table and RRC signaling are configured and PUCCH resources different from SPS may be used.

In addition, the ARI may indicate a CCE index for calculating or deriving PUCCH resources or an offset for a CCE index of a PDCCH for determining PUCCH resources.

In addition, the ARI may mean an offset for PUCCH resources based on a CCE index of a PDCCH for determining PUCCH resources.

That is, the UE may determine whether the last detected subframe information is for a primary cell or a secondary cell and determine PUCCH resources through RRC signaling according to the method of assigning the PUCCH resources in advance. At this time, the eNB may confirm the last subframe information which is successfully detected by the UE using PUCCH resources used to transmit the received ACK/NACK information and thus accurately interpret the received ACK/NACK information.

Although a plurality of PDCCHs included in a plurality of component carriers is described in the above description, the present invention is not limited thereto. The present invention is applicable to a PDCCH within at least one downlink subframe in TDD. That is, the present invention is applicable to a method of bundling ACK/NACK information for a PDCCH within at least one downlink subframe including a plurality of component carriers and transmitting the bundled ACK/NACK information to an eNB. The downlink subframe which is a bundling unit may be referred to as a bundling window (M).

The present invention is applicable by instructing the UE through a higher layer configuration or according to a specific state of the UE.

The above-described embodiment are applied for transmission of a variety of uplink control information and the same principle may be applied to make the number of pieces of SR information and ACK/NACK information various. In addition, a plurality of embodiments may be combined to obtain another control information transmission method. In addition, the transmission bit of the embodiment is applicable to control information transmission of various embodiments.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a terminal Such a communication relationship is equally/similarly extended to signal communication between a terminal and a relay or a base station and a relay. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with a fixed station, Node-B, eNode-B (eNB), or an access point as necessary. The term "terminal" may also be replaced with a user equipment (UE), a mobile station (MS), a mobile subscriber station (MSS) or a mobile terminal as necessary.

The embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

[Industrial Applicability]

Although a method and device for transmitting control information in a wireless communication system is applied to a 3GPP LTE system, this is applicable to a various wireless communication systems in addition to the 3GPP LTE system.

The invention claimed is:

1. A method of transmitting a signal by a terminal to a base station in a wireless communication system supporting a plurality of serving cells, the method comprising:
   receiving, from the base station, at least one physical channel including at least one physical downlink control channel (PDCCH) on the plurality of serving cells; and
   transmitting, to the base station, first control information resulting from performing a bundling on at least a portion of control information on reception of the at least one physical channel,
   wherein the first control information is transmitted using a physical uplink control channel (PUCCH) resource corresponding to second control information,
   wherein the second control information is associated with a PDCCH last detected by the terminal among the at least one PDCCH,
   wherein, when the last detected PDCCH is received on a primary cell (PCell) of the plurality of serving cells, the PUCCH resource is determined using ACK least one control channel element (CCE) index configuring the last detected PDCCH, and
   wherein, when the last detected PDCCH is received on a secondary cell (SCell) of the plurality of serving cells, the PUCCH resource is determined using ACK resource indicator (ARI) information received from the base station.

2. The method according to claim 1,
   wherein the first control information is acknowledgement (ACK) or negative acknowledgement (NACK) information, and the second control information is downlink assignment index (DAI) information last detected by the terminal from at least one DAI information of the at least one PDCCH, and
   wherein the at least one DAI information indicates an assignment order of a corresponding PDCCH.

3. The method according to claim 1, wherein the ARI information includes PUCCH resource information corresponding to the second control information, parameter information for determining the PUCCH resource corresponding to the second control information, or offset information of the parameter information.

4. The method according to claim 1, wherein when the last detected PDCCH is received on a secondary cell (SCell) of the plurality of cells, the PUCCH resource is determined using a value of transmit power control (TPC) field included in the last detected PDCCH.

5. The method according to claim 1, wherein information about the PUCCH resource corresponding to the second control information is configured by the base station in advance through RRC signaling.

6. The method according to claim 1, wherein the bundling is full bundling.

7. The method according to claim 1, wherein:
   the at least one physical channel further includes at least one physical downlink shared channel (PDSCH) each of which carries one or more transport blocks or indicates a PDSCH carrying one or more transport blocks, and
   the first control information and the second control information include information about the one or more transport blocks included in the PDSCH.

8. The method according to claim 7, wherein the first control information includes information about a maximum number of transport blocks carried by the PDSCH, and
   when the number of transport blocks carried by the PDSCH is less than the maximum number of transport blocks,
   the first control information of transport blocks excluding the transport blocks actually carried by the PDCCH or the PDSCH indicated by the PDCCH among the maximum number of transport blocks carried by the PDSCH is negative acknowledgement (NACK) information.

9. The method according to claim 7, wherein the first control information includes information about a maximum number of transport blocks carried by the PDSCH, and
   if the number of transport blocks carried by the PDSCH is less than the maximum number of transport blocks,
   the first control information of transport blocks excluding the transport blocks actually carried by the PDSCH among the maximum number of transport blocks carried by the PDSCH is equal to the first control information of the actually carried transport blocks.

10. A method of receiving a signal by a base station from a terminal in a wireless communication system supporting a plurality of serving cells, the method comprising:
    transmitting, to the terminal, at least one physical channel including at least one physical downlink control channel (PDCCH) on the plurality of serving cells; and
    receiving, from the terminal, first control information resulting from performing a bundling on at least a portion of control information on the terminal's reception of the at least one physical channel,
    wherein the first control information is received using a physical uplink control channel (PUCCH) resource corresponding to second control information,
    wherein the second control information is associated with a PDCCH last detected by the terminal among the at least one PDCCH,
    wherein, when the last detected PDCCH is transmitted on a primary cell (PCell) of the plurality of serving cells, the PUCCH resource is determined using at least one control channel element (CCE) index configuring the last detected PDCCH, and wherein, when the last detected PDCCH is transmitted on a secondary cell (SCell) of the plurality of serving cells, the PUCCH resource is determined using ACK resource indicator (ARI) information transmitted by the base station.

11. The method according to claim 10, wherein the first control information is acknowledgement (ACK) or negative acknowledgement (NACK) information, and the second control information is downlink assignment index (DAI) information last detected by the terminal from at least one of DAI information of the at least one PDCCH, and wherein the at least one DAI information indicates an assignment order of a corresponding PDCCH.

12. The method according to claim 10, wherein the ARI information includes PUCCH resource information corresponding to the second control information, parameter information for determining the PUCCH resource corresponding to the second control information, or offset information of the parameter information.

13. A terminal for transmitting control information to a base station in a wireless communication system supporting a plurality of serving cells, the terminal comprising:

a receiver for receiving, from the base station, at least one physical channel including at least one physical downlink control channel (PDCCH) on the plurality of serving cells;

a transmitter for transmitting, to the base station, first control information resulting from performing a bundling on at least a portion of control information on reception of the at least one physical channel; and a processor for controlling transmission of the first control information to the base station using a physical uplink control channel (PUCCH) resource corresponding to second control information, wherein the second control information is associated with a PDCCH last detected by the terminal among the at least one PDCCH, wherein, when the last detected PDCCH is received on a primary cell (PCell) of the plurality of serving cells, the PUCCH resource is determined using at least one control channel element (CCE) index configuring the last detected PDCCH, and wherein, when the last detected PDCCH is received on a secondary cell (SCell) of the plurality of serving cells, the PUCCH resource is determined using ACK resource indicator (ARI) information received from the base station.

14. The terminal according to claim 13, wherein the first control information is acknowledgement (ACK) or negative acknowledgement (NACK) information, and the second control information is downlink assignment index (DAI) information last detected by the terminal from at least one DAI information of the at least one PDCCH, and wherein the at least one DAI information indicates an assignment order of a corresponding PDCCH.

15. The terminal according to claim 13, wherein when the last detected PDCCH is received on a secondary cell (SCell) of the plurality of cells, the PUCCH resource is determined using a value of transmit power control (TPC) field included in the last detected PDCCH.

16. The terminal according to claim 13, wherein information about the PUCCH resource corresponding to the second control information is configured by the base station in advance through RRC signaling.

17. A base station for receiving a signal from a terminal in a wireless communication system supporting a plurality of serving cells, the base station comprising:

a transmitter for transmitting, to the terminal, at least one physical channel including at least one physical downlink control channel (PDCCH) on the plurality of serving cells;

a receiver for receiving, from the terminal, first control information resulting from performing a bundling on at least a portion of control information on the terminal's reception of the at least one physical channel; and a processor for controlling transmission of the first control information to the base station using a physical uplink control channel (PUCCH) resource corresponding to second control information, wherein the second control information is associated with a PDCCH last detected by the terminal among the at least one PDCCH, wherein, when the last detected PDCCH is transmitted on a primary cell (PCell) of the plurality of serving cells, the PUCCH resource is determined using at least one control channel element (CCE) index configuring the last detected PDCCH, and wherein, when the last detected PDCCH is transmitted on a secondary cell (SCell) of the plurality of serving cells, the PUCCH resource is determined using ACK resource indicator (ARI) information transmitted by the base station.

18. The base station according to claim 17, wherein the first control information is acknowledgement (ACK) or negative acknowledgement (NACK) information, and the second control information is downlink assignment index (DAI) information last detected by the terminal from at least one DAI information of the at least one PDCCH, and wherein each DAI information indicates an assignment order of a corresponding PDCCH.

19. The base station according to claim 17, wherein the ARI information includes PUCCH resource information corresponding to the second control information, parameter information for determining the PUCCH resource corresponding to the second control information, or offset information of the parameter information.

* * * * *